(12) United States Patent
Yivgi Ohana et al.

(10) Patent No.: US 12,502,408 B2
(45) Date of Patent: Dec. 23, 2025

(54) MITOCHONDRIAL AUGMENTATION THERAPY FOR PRIMARY MITOCHONDRIAL DISEASES

(71) Applicant: Minovia Therapeutics Ltd., Tirat Hacarmel (IL)

(72) Inventors: Natalie Yivgi Ohana, Haifa (IL); Uriel Halavee, Tel Aviv (IL); Shmuel Bukshpan, Ramat Hasharon (IL); Noa Sher, Haifa (IL); Moriya Blumkin, Tel Aviv (IL)

(73) Assignee: Minovia Therapeutics Ltd., Tirat Hacarmel (IL)

(*) Notice: Subject to any disclaimer, the term of this patent is extended or adjusted under 35 U.S.C. 154(b) by 1004 days.

(21) Appl. No.: 17/253,455

(22) PCT Filed: Jul. 22, 2019

(86) PCT No.: PCT/IL2019/050823
§ 371 (c)(1),
(2) Date: Dec. 17, 2020

(87) PCT Pub. No.: WO2020/021536
PCT Pub. Date: Jan. 30, 2020

(65) Prior Publication Data
US 2021/0260137 A1    Aug. 26, 2021

Related U.S. Application Data

(60) Provisional application No. 62/753,947, filed on Nov. 1, 2018, provisional application No. 62/701,783, filed on Jul. 22, 2018.

(51) Int. Cl.
*A61K 35/545* (2015.01)
*A61K 35/28* (2015.01)

(52) U.S. Cl.
CPC ............ *A61K 35/545* (2013.01); *A61K 35/28* (2013.01)

(58) Field of Classification Search
CPC ......... A61K 35/545; A61K 35/28; A61P 7/00; C12N 5/0647
See application file for complete search history.

(56) References Cited

U.S. PATENT DOCUMENTS

| 6,590,141 B1 | 7/2003 | Frohberg |
| 6,616,926 B1 | 9/2003 | Burkly et al. |
| 6,929,806 B2 | 8/2005 | Toba et al. |
| 7,238,727 B2 | 7/2007 | Satomi et al. |
| 7,279,326 B2 | 10/2007 | Weissig et al. |
| 7,339,090 B2 | 3/2008 | Christmann |
| 7,407,800 B1 | 8/2008 | Benton et al. |
| 9,603,872 B2 | 3/2017 | Cataldo et al. |
| 10,213,459 B2 | 2/2019 | Yivgi-Ohana et al. |
| 10,738,278 B2 | 8/2020 | Mohler et al. |
| 2001/0021526 A1 | 9/2001 | Davis et al. |
| 2003/0113389 A1 | 6/2003 | Wang et al. |
| 2004/0122301 A1 | 6/2004 | Fujii et al. |
| 2004/0192627 A1 | 9/2004 | Weissig et al. |
| 2005/0153381 A1 | 7/2005 | Marusich et al. |
| 2005/0164933 A1 | 7/2005 | Tymianski et al. |
| 2006/0024277 A1 | 2/2006 | Sivak et al. |
| 2006/0241034 A1 | 10/2006 | Chauvier et al. |
| 2008/0057039 A1 | 3/2008 | Newell Rogers et al. |
| 2010/0278790 A1 | 11/2010 | Prockop et al. |
| 2011/0008310 A1 | 1/2011 | Cataldo et al. |
| 2011/0105359 A1 | 5/2011 | Czerwinski |
| 2012/0058091 A1 | 3/2012 | Rogers et al. |
| 2012/0107285 A1 | 5/2012 | Hyde et al. |
| 2012/0107937 A1 | 5/2012 | Hyde et al. |
| 2013/0022666 A1 | 1/2013 | Brzezinska |
| 2013/0034527 A1 | 2/2013 | Hyde et al. |
| 2013/0149778 A1 | 6/2013 | Chang et al. |
| 2014/0193511 A1 | 7/2014 | Yivgi-Ohana et al. |
| 2015/0045403 A1 | 2/2015 | Shanler et al. |
| 2015/0079193 A1 | 3/2015 | Yivgi-Ohana et al. |
| 2015/0313950 A1 | 11/2015 | Gammelsaeter et al. |
| 2015/0344844 A1 | 12/2015 | Better et al. |
| 2015/0374736 A1 | 12/2015 | Lee |
| 2015/0374756 A1 | 12/2015 | Frank et al. |
| 2016/0346333 A1* | 12/2016 | Hariri ................. A61K 35/545 |

(Continued)

FOREIGN PATENT DOCUMENTS

AU      2012201710 B2     1/2014
CN      102266350 A       12/2011
(Continued)

OTHER PUBLICATIONS

Cherry AB et al. Induced pluripotent stem cells with a mitochondrial DNA deletion. Stem Cells. Jul. 2013;31(7):1287-97. doi: 10.1002/stem.1354. PMID: 23400930; PMCID: PMC3692613 (Year: 2013).*

Ahmad T. et al. Miro1 regulates intercellular mitochondrial transport & enhances mesenchymal stem cell rescue efficacy. EMBO J. May 2, 2014;33(9):994-1010. Epub Jan. 15, 2014. PMID: 24431222; PMCID: PMC4193933. (Year: 2014).*

Caicedo A et al. Artificial Mitochondria Transfer: Current Challenges, Advances, and Future Applications. Stem Cells Int. 2017;2017:7610414. Epub Jul. 2, 2017. PMID: 28751917; PMCID: PMC5511681 (Year: 2017).*

(Continued)

*Primary Examiner* — Maria G Leavitt
*Assistant Examiner* — Vyoma Shubham Tiwari
(74) *Attorney, Agent, or Firm* — The Roy Gross Law Firm, LLC; Roy D. Gross

(57) ABSTRACT

The present invention provides human stem cells enriched with functional mitochondria, wherein the healthy functional exogenous mitochondria constitute at least 3% and less than 33% of the total mitochondria in the mitochondrially-enriched human stem cells. Further disclosed are methods for the production of such cells, and uses thereof for the treatment of primary mitochondrial diseases.

7 Claims, 29 Drawing Sheets

(56) References Cited

U.S. PATENT DOCUMENTS

| | | |
|---|---|---|
| 2017/0015287 A1 | 1/2017 | Sander et al. |
| 2017/0065635 A1 | 3/2017 | Cataldo et al. |
| 2017/0080030 A1 | 3/2017 | Peirce-Cottler et al. |
| 2017/0151287 A1 | 6/2017 | Von Maltzahn et al. |
| 2017/0204372 A1 | 7/2017 | Mohler et al. |
| 2018/0007913 A1 | 1/2018 | Sceats et al. |
| 2018/0030413 A1* | 2/2018 | Yivgi-Ohana ....... C12N 5/0656 |
| 2020/0009198 A1 | 1/2020 | Choi et al. |
| 2020/0054682 A1 | 2/2020 | Gojo et al. |
| 2020/0239850 A1 | 7/2020 | Yivgi-Ohana et al. |
| 2020/0246379 A1 | 8/2020 | Yivgi-Ohana et al. |
| 2020/0377951 A1 | 12/2020 | Bettoun |
| 2021/0260137 A1 | 8/2021 | Yivgi-Ohana et al. |
| 2023/0338427 A1 | 10/2023 | Yivgi-Ohana et al. |

FOREIGN PATENT DOCUMENTS

| | | |
|---|---|---|
| CN | 102293178 A | 12/2011 |
| CN | 103976935 A | 8/2014 |
| CN | 106795490 A | 5/2017 |
| DE | 102013225588 A1 | 4/2014 |
| GB | 2350565 A | 12/2000 |
| JP | 2002523434 A | 7/2002 |
| JP | 2004500409 A | 1/2004 |
| JP | 2006131600 A | 5/2006 |
| JP | 2008545779 A | 12/2008 |
| JP | 2014501764 A | 1/2014 |
| JP | 2017105729 A | 6/2017 |
| JP | 2018002736 A | 1/2018 |
| JP | 2018-507690 | 3/2018 |
| JP | 2018505228 A | 4/2020 |
| WO | WO 2003/014317 A2 | 2/2003 |
| WO | WO-2004100773 A2 | 11/2004 |
| WO | WO-2008000001 A1 | 1/2008 |
| WO | WO-2008137035 A1 | 11/2008 |
| WO | WO-2008152640 A2 | 12/2008 |
| WO | WO-2011059547 A2 | 5/2011 |
| WO | WO-2013002880 A1 | 1/2013 |
| WO | WO-2013035101 A1 | 3/2013 |
| WO | WO 2013/082243 A1 | 6/2013 |
| WO | WO-2013171752 A1 | 11/2013 |
| WO | WO 2014/130518 A1 | 8/2014 |
| WO | WO-2016008937 A1 * | 1/2016 ............. A61K 35/28 |
| WO | WO-2016049867 A1 | 4/2016 |
| WO | WO 2016/076434 A1 | 5/2016 |
| WO | WO 2016/113544 A1 | 7/2016 |
| WO | WO 2016/135723 A1 | 9/2016 |
| WO | WO-2016138420 A1 | 9/2016 |
| WO | WO-2017124037 A1 | 7/2017 |
| WO | WO 2018/083700 A1 | 5/2018 |
| WO | WO-2018088874 A1 | 5/2018 |
| WO | WO 2018/101708 | 6/2018 |
| WO | WO 2018/101708 A1 | 6/2018 |
| WO | WO-2018178970 A1 | 10/2018 |
| WO | WO 2020/021535 A1 | 1/2020 |
| WO | WO 2020/021537 A1 | 1/2020 |
| WO | WO 2020/021538 A1 | 1/2020 |
| WO | WO 2020/021539 A1 | 1/2020 |
| WO | WO 2020/021541 A1 | 1/2020 |
| WO | WO-2020021536 A1 | 1/2020 |
| WO | WO-2020036973 A1 | 2/2020 |
| WO | WO 2020/021540 A9 | 4/2020 |
| WO | 2020021541 A9 | 2/2021 |
| WO | WO-2021199040 A1 | 10/2021 |

OTHER PUBLICATIONS

King MP. et al. Injection of mitochondria into human cells leads to a rapid replacement of the endogenous mitochondrial DNA. Cell. Mar. 25, 1988;52(6):811-9. PMID: 3349520 (Year: 1988).*
Au et al., "Mitochondrial DNA deletion in a girl with Fanconi's syndrome", Pediatr Nephrol, 2007, 22:136-140.
Galipeau et al., "Mesenchymal Stromal Cells: Clinical Challenges and Therapeutic Opportunities", Cell Stem Cell 22, Jun. 1, 2018, p. 824-839.
Govers et al., "Mitochondrial DNA mutations in renal disease: an overview". Pediatric Nephrology, 2021, 36:9-17.
Makhlough et al., "Bone marrow—mesenchymal stromal cell infusion in patients with chronic kidney disease: A safety study with 18 months of follow-up", Cytotherapy, 2018; 20:660-669.
Marcheque et al., "Concise Reviews: Stem Cells and Kidney Regeneration: An Update", Stem Cells Translational Medicine, 2019, 8:82-92.
Renaghan et al., "Acute Kidney Injury and CKD Associated with Hematopoietic Stem Cell Transplantation", CJASN, 2020, 15:289-297.
Rota et al., "Stem Cell Therapies in Kidney Diseases: Progress and Challenges", Int. J. Mol. Sci., 2019, 20, 2790, p. 1-26.
Swaminathan et al., "Allogeneic Mesenchymal Stem Cells for Treatment of AKI after Cardiac Surgery", J Am Soc Nephrol, 2018, 29: 260-267.
Yang et al., "Safety and efficacy of intrarenal arterial autologous CD34+ cell transfusion in patients with chronic kidney disease: A randomized, open-label, controlled phase II clinical trial", Stem Cells Transl Med., 2020, 9:827-838.
EP Office Action in European Application No. 19840282.8, dated Jan. 9, 2024, 13 pages.
Gollihue et al., "Prospects for therapeutic mitochondrial transplantation", Mitochondrion, 2017, 35: 70-79.
Lodi et al., "Deficit of in vivo mitochondrial ATP production in patients with Friedreich ataxia", Proc. Natl. Acad. Sci, Sep. 1999, 96: 11492-11495.
Gowda et al., "Markers of renal function tests", North American Journal of Medical Science, Apr. 2010, 2(4): 170-173.
Hosten, "Chapter 193: BUN and Creatine", Clinical methods: The History, Physical, and Laboratory Examination, 3rd Ed., 1990, pp. 874-978.
JP Office Action in Japanese Application No. 2021-502763, dated Mar. 20, 2023, 13 pages (with English translation).
JP Office Action in Japanese Application No. 2021-502836, dated Mar. 20, 2023, 12 pages (with English translation).
Shah et al., "Serum Bicarbonate Levels and the Progression of Kidney Disease: A Cohort Study", Am J Kidney Dis, Aug. 2009, 54(2): 270-277.
Tang et al., "Normalisation of urinary biomarkers to creatine for clinical practice and research—when and why", Singapore Med J, 2015, 56(1): 7-10.
Vormann, "Magnesium and Kidney Health—More on the 'Forgotten Electrolyte'", Am J Nephrol, 2016, 44: 379-380.
Augustyniak et al., "Mitochondrial Biogenesis and Neural Differentiation of Human iPSC is Modulated by Idebenone in a Developmental Stage-Dependent Manner," Biogerontology, 2017, 18: 665-677.
CN Office Action in Chinese Application No. 201980054078.2, dated Oct. 27, 2023, 20 pages (with English translation).
Shi et al., "Intravenous Administration of Mitochondria for Treating Experimental Parkinson's Disease," Mitochondrion, May 2017, 34: 91-100.
Ahmed et al., "Human Epidermal Growth Factor Receptor 2 (HER2)—Specific Chimeric Antigen Receptor-Modified T Cells for the Immunotherapy of HER2-Positive Sarcoma", Journal of Clinical Oncology, May 2015, vol. 33, No. 15, pp. 1688-1696.
EP Extended Search Report in European Application No. 21782146.1, dated Apr. 30, 2024, 7 pages.
Abramova N.B., et al., "Injection of Mitochondria Into Oocytes and Fertilized Eggs," Ontogenez, 1979, vol. 10, No. 4, pp. 401-405 (Translated abstract), 1 Page.
Abramova N.B., et al., "Regulation of the Number and Function of Mitochondria During Artificial Increase of their Mass in Fish Embryos," Biokhimiia, PMID: 6626595, Aug. 1983, vol. 48, No. 8, 1 Page, (Translated Abstract).
Abramova N.B., et al., "The Functioning of Mammalian Mitochondria Injected Into Fish Embryos," Ontogenez, PMID: 2549481, vol. 20, No. 3, May-Jun. 1989, 1 Page, (Translated Abstract).
Alaynick W.A., et al., "Nuclear Receptors, Mitochondria And Lipid Metabolism," Mitochondrion, Sep. 30, 2008, vol. 8, No. 4, pp. 329-337, 17 Pages, DOI: 10.1016/j.mito.2008.02.001, XP025474006.

(56) References Cited

OTHER PUBLICATIONS

Babenko V.A., "Mirol Enhances Mitochondria Transfer from Multipotent Mesenchymal Stem Cells (MMSC)to Neural Cells and Improves the Efficacy of Cell Recovery," Molecules, Mar. 19, 2018, vol. 23, No. 3, 14 pages.
Baker et al., "Use of the Mouse Aortic Ring Assay to Study Angiogenesis," 2012, Nature Protocols 7(1): 89-104.
Biolog, "MitoPlate™ S-1 and MitoPlate™ I-1 for Characterization of Mammalian Cell Mitochondria," 2020, pp. 1-12.
Bourgeron T., et al., "Isolation And Characterization of Mitochondria From Human B Lymphoblastoid Cell Lines," Biochemical and Biophysical Research Communications, Jul. 15, 1992, vol. 186, No. 1, pp. 16-23, XP055144685.
Brass et al., "Multiple Skeletal Muscle Mitochondrial DNA Deletions in Patients with Unilateral Peripheral Arterial Disease," 2000, Vascular Medicine 5(4):225-230.
Caicedo A., et al., "Mitoception as a New Tool to Assess the Effects of Mesenchymal Stem/Stromal Cell Mitochondria on Cancer Cell Metabolism and Function," Scientific Reports, Mar. 13, 2015, vol. 5, No. 1, Article 9073, pp. 1-10.
Cardenes N., et al., "De Mesenchymal Stem Cells: a Promising Therapy for the Acute Respiratory Distress Syndrome," Respiration, Feb. 2013, vol. 85, No. 4, pp. 267-278.
Chan D.C., et al., "Mitochondrial Fusion and Fission in Mammals," Annual Review of Cell and Developmental Biology, 2006, vol. 22, pp. 79-99.
Chemicon International Inc.: "Adipogenesis Assay Kit," Cat. No. ECM950, 2004, Revision C, 41448, 12 Pages.
Chen et al. "Inhibition of Triglyceride Synthesis as a Treatment Strategy for Obesity: Lessons From DGAT1-Deficient Mice" 2005, Arteriosclerosis, Thrombosis and Vascular Biology 25(3):482-486.
Chen M., et al., "Generation of Retinal Ganglion-like Cells From Reprogrammed Mouse Fibroblasts," Investigative Ophthalmology & Visual Science, 2010, vol. 51, No. 11, pp. 5970-5978.
Chinnery P.F., et al., "The Challenges of Mitochondrial Replacement," PLoS Genetics, Published on Apr. 24, 2014, vol. 10, No. 4, e1004315, 2 Pages.
Choi Y-S., et al., "Analysis of Proteome Bound To D-loop Region of Mitochondrial DNA By DNA-linked Affinity Chromatography And Reverse-Phase Liquid Chromatography/Tandem Mass Spectrometry," Annals of the New York Academy of Sciences, May 31, 2005, vol. 1042, pp. 88-100, XP055035180.
Clark M.A., et al., "Mitochondrial Transformation of Mammalian Cells," Nature, Macmillan Journals Ltd, London, GB, Feb. 18, 1982, vol. 295, No. 5850, pp. 605-607, ISSN 0028-0836, XP002625375.
Cook G.A., et al., "Structural Changes of Isolated Hepatocytes During Treatment With Digitonin," Biochimica et Biophysica Acta (BBA)-Molecular Cell Research, Dec. 1983, vol. 763, No. 4, pp. 356-367.
Corcelli A., et al., "Mitochondria Isolated in Nearly Isotonic Kci Buffer: Focus on Cardiolipin and Organelle Morphology," Biochimica et Biophysica Acta 1798, 2010, pp. 681-687.
Cowdry N.H., "A Comparison of Mitochondria in Plant and Animal Cells," The Biological Bulletin, 1917, vol. 33, No. 3, pp. 196-228.
Csordas A., "Mitochondrial Transfer Between Eukaryotic Animal Cells And Its Physiologic Role," Rejuvenation Research, Feb. 2006, vol. 9, No. 4, pp. 450-454.
Das Neves R.P., et al., Connecting Variability in Global Transcription Rate to Mitochondrial Variability, PLoS biology, 2010, vol. 8, No. 12, e1000560.
English Translation of Notice of Reasons for Rejection for Japanese Application No. 2021-142214, dated Jun. 21, 2022, 15 Pages.
Extended European Search Report for European Application No. 12830575.2, mailed Feb. 13, 2015, 11 Pages.
Extended European Search Report for European Application No. 16754857.7, mailed Jul. 13, 2018, 06 Pages.
Extended European Search Report for European Application No. 18774886.8, mailed Oct. 26, 2020, 7 Pages.
Extended European Search Report for European Application No. 19776644.7, mailed Jul. 12, 2021, 06 Pages.
Extended European Search Report for European Application No. 19842284.2, mailed May 4, 2022, 8 Pages.
Finsterer J., et al., "Renal Manifestations of Primary Mitochondrial Disorders," Biomedical Reports May 2014 Spandidos Publications GBR, vol. 6, No. 5, May 1, 2017, pp. 487-494.
Frazier A.E., et al., "Mitochondrial Morphology and Distribution in Mammalian Cells," Journal of Biological Chemistry, Dec. 2006, vol. 387, No. 12, 9 Pages.
Frezza C., et al., "Organelle Isolation: Functional Mitochondria From Mouse Liver, Muscle And Cultured Fibroblasts," Nature Protocols, Feb. 22, 2007, vol. 2, No. 2, pp. 287-295, ISSN 1750-2799, XP055038328.
Fu A., et al., "Mitotherapy for Fatty Liver by Intravenous Administration of Exogenous Mitochondria in Male Mice," Frontiers in Pharmacology, Jan. 2017, vol. 8, Article 241, pp. 1-8.
Gasnier F., et al., "Use of Percoll Gradients for Isolation of Human Placenta Mitochondria Suitable for Investigating Outer Membrane Proteins," Analytical Biochemistry, Academic Press Inc., New York, Jul. 1, 1993, vol. 212, No. 1, pp. 173-178, doi: 10.1006/ABIO.1993. 1309, ISSN 0003-2697, XP024763625.
Gavazza M., et al., "Sensitivity of Mitochondria Isolated From Liver And Kidney of Rat And Bovine To Lipid Peroxidation: A Comparative Study of Light Emission And Fatty Acid Profiles," Molecular And Cellular Biochemistry, Kluwer Academic Publishers, BO, Dec. 1, 2005, vol. 280, No. 1-2, pp. 77-82, ISSN 1573-4919, XP019288940.
Griffiths E.J., et al., "Mitochondrial Calcium As A Key Regulator of Mitochondrial ATP Production In Mammalian Cells," Biochimica Et Biophysica Acta, Mar. 2009, vol. 1787, No. 11, pp. 1324-1333.
Guantes, et al., "Mitochondria and the Non-Genetic Origins of Cell-to-Cell Variability: More is Different," BioEssays, 2016, vol. 38, No. 1, pp. 64-76.
Hartwig S., et al., "A Critical Comparison Between Two Classical And A Kit-based Method For Mitochondria Isolation," Proteomics, Jan. 31, 2009, vol. 9, No. 11, pp. 3209-3214, XP055144705.
Hassanein T., "Mitochondrial Dysfunction in Liver Disease and Organ Transplantation," Mitochondrion, vol. 4, Sep. 2004, pp. 609-620.
International Preliminary Report on Patentability for International Application No. PCT/IL2012/050359, mailed Mar. 20, 2014, 7 Pages.
International Preliminary Report on Patentability for International Application No. PCT/IL2016/050205, mailed Sep. 8, 2017, 10 Pages.
International Preliminary Report on Patentability for International Application No. PCT/IL2018/050332, mailed Oct. 10, 2019, 8 Pages.
International Preliminary Report on Patentability for International Application No. PCT/IL2019/050350, mailed Oct. 8, 2020, 8 Pages.
International Preliminary Report on Patentability for International Application No. PCT/IL2019/050821, mailed Feb. 4, 2021, 8 Pages.
International Preliminary Report on Patentability for International Application No. PCT/IL2019/050822, mailed Feb. 4, 2021, 8 Pages.
International Preliminary Report on Patentability for International Application No. PCT/IL2019/050823, mailed Feb. 4, 2021, 10 Pages.
International Preliminary Report on Patentability for International Application No. PCT/IL2019/050824, mailed Feb. 4, 2021, 7 Pages.
International Preliminary Report on Patentability for International Application No. PCT/IL2019/050825, mailed Feb. 4, 2021, 10 Pages.
International Preliminary Report on Patentability for International Application No. PCT/IL2019/050826, mailed Feb. 4, 2021, 9 Pages.
International Preliminary Report on Patentability for International Application No. PCT/IL2019/050827, mailed Feb. 4, 2021, 9 Pages.
International Preliminary Report on Patentability for International Application No. PCT/IL2019/050828, mailed Feb. 4, 2021, 8 Pages.
International Preliminary Report on Patentability for International Application No. PCT/IL2021/050349, mailed Oct. 13, 2022, 11 Pages.
International Preliminary Report on Patentability for International Application No. PCT/IL2021/050358, mailed Oct. 13, 2022, 8 Pages.

(56) References Cited

OTHER PUBLICATIONS

International Preliminary Report on Patentability for the application No. PCT/IL2022/050098, mailed Jul. 20, 2023, 9 pages.
International Search Report and Written Opinion for Application No. PCT/IL2022/050098, mailed on May 26, 2022, 10 Pages.
International Search Report and Written Opinion for Application No. PCT/IL2022/051280, mailed on Dec. 1, 2022, 13 pages.
International Search Report and Written Opinion for International Application No. PCT/IL2012/050359, mailed Nov. 25, 2012, 10 Pages.
International Search Report and Written Opinion for International Application No. PCT/IL2016/050205, mailed Jun. 19, 2016, 13 Pages.
International Search Report and Written Opinion for International Application No. PCT/IL2018/050332, mailed Jun. 13, 2018, 11 Pages.
International Search Report and Written Opinion for International Application No. PCT/IL2019/050350, mailed Jul. 7, 2019, 10 Pages.
International Search Report and Written Opinion for International Application No. PCT/IL2019/050821, mailed Nov. 26, 2019, 9 Pages.
International Search Report and Written Opinion for International Application No. PCT/IL2019/050822, mailed Nov. 27, 2019, 11 Pages.
International Search Report and Written Opinion for International Application No. PCT/IL2019/050823, mailed Nov. 18, 2019, 11 Pages.
International Search Report and Written Opinion for International Application No. PCT/IL2019/050824, mailed Dec. 15, 2019, 8 Pages.
International Search Report and Written Opinion for International Application No. PCT/IL2019/050825, mailed Nov. 28, 2019, 11 Pages.
International Search Report and Written Opinion for International Application No. PCT/IL2019/050826, mailed Nov. 24, 2019, 10 Pages.
International Search Report and Written Opinion for International Application No. PCT/IL2019/050827, mailed Nov. 20, 2019, 11 Pages.
International Search Report and Written Opinion for International Application No. PCT/IL2019/050828, mailed Nov. 24, 2019, 11 Pages.
International Search Report and Written Opinion for International Application No. PCT/IL2021/050349, mailed Aug. 17, 2021, 14 Pages.
International Search Report and Written Opinion for International Application No. PCT/IL2021/050358, mailed Jul. 20, 2021, 10 Pages.
Islam M.N., et al., "Mitochondrial Transfer From Bone-marrow-derived Stromal Cells to Pulmonary Alveoli Protects Against Acute Lung Injury," Nature Medicine, Apr. 15, 2012, vol. 18, No. 5, pp. 759-765, 15 Pages, XP055475523, Retrieved from URL: http://www.nature.com/nm/journal/v18/n5/abs/nm.2736.html.
Jelenik T., et al., "Mitochondrial Plasticity in Obesity and Diabetes Mellitus," Antioxidants & Redox Signaling, 2013, vol. 19, No. 3, pp. 258-268.
Jenuth J.P., et al., "Random Genetic Drift in the Female Germline Explains the Rapid Segregation of Mammalian Mitochondrial DNA," Nature Genetics, 1996, vol. 14, No. 2, pp. 146-151.
Jenuth J.P., et al., "Tissue-Specific Selection for Different mtDNA Genotypes in Heteroplasmic Mice," Nature Genetics, 1997, vol. 16, No. 1, pp. 93-95.
Jeon S.Y., et al., "Comparison of Hair Shaft Damage After UVA and UVB Irradiation," The Journal of Cosmetic Science, Mar.-Apr. 2008, vol. 59, No. 2, pp. 151-156 (Abstract), 1 Page.
Katrangi E., et al., "Xenogenic Transfer of Isolated Murine Mitochondria Into Human p0 Cells Can Improve Respiratory Function," Rejuvenation Research, Dec. 2007, vol. 10, No. 4, pp. 561-570.
Khasawneh et al., "A Novel Mitochondrial DNA Deletion in Patient with Pearson Syndrome" Med Arch., Apr. 2018, vol. 72, No. 2, pp. 148-150.
King M.P., et al., "Injection of Mitochondria Into Human Cells Leads To a Rapid Replacement of The Endogenous Mitochondrial DNA," Cell, vol. 52, No. 6, Mar. 25, 1988, pp. 811-819.
Kitani T., et al., "Direct Human Mitochondrial Transfer: A Novel Concept Based on the Endosymbiotic Theory," Transplantation Proceedings, 2014, vol. 46, No. 4, pp. 1233-1236.
Kitani T., et al., "Internalization of Isolated Functional Mitochondria: Involvement of Macropinocytosis," Journal of Cellular and Molecular Medicine, Apr. 2014, vol. 18, No. 8, pp. 1694-1703.
Klotzsch S.G., et al., "Triglyceride Measurements: A Review of Methods and Interferences," Clinical Chemistry, 1990, vol. 36, No. 9, pp. 1605-1613.
Kuranda K., et al., "Exposure to Wild-Type AAV Drives Distinct Capsid Immunity Profiles in Humans," Journal of Clinical Investigation, Dec. 3, 2018, vol. 128, No. 12, pp. 5267-5279, XP055927987.
Kuznetsov A.V., et al., "Cryopreservation of Mitochondria And Mitochondrial Function In Cardiac And Skeletal Muscle Fibers," Analytical Biochemistry, Sep. 2003, vol. 319. No. 2, pp. 296-303.
Lachgar S., et al., "Vascular Endothelial Growth Factor is an Autocrine Growth Factor for Hair Dermal Papilla Cells," The Journal of Investigative Dermatology, 1996, vol. 106, No. 1, pp. 17-23.
Larsen S., et al., "Biomarkers of Mitochondrial Content in Skeletal Muscle of Healthy Young Human Subjects," The Journal of physiology, 2012, vol. 590, No. 14, pp. 3349-3360.
Lin C.S., et al., "Mouse mtDNA Mutant Model of Leber hereditary Optic Neuropathy," Proceedings of the National Academy of Sciences, 2012, vol. 109, No. 49, pp. 20065-20070.
Lin H.D., et al., "Human Wharton's Jelly Stem Cell Conditioned Medium Enhances Freeze-Thaw Survival and Expansion of Cryopreserved CD 34+ cells," Stem Cell Reviews and Reports, Apr. 2013, vol. 9, No. 2, pp. 172-183, XP055927986.
Lu Z., et al., "Profiling the Response of Human Hair Follicles to Ultraviolet Radiation," The Journal of Investigative Dermatology, 2009, vol. 129, No. 7, pp. 1790-1804.
"Maintenance of Mitochondrial Function by Nuclear NAD+ Levels and its Disruption by Aging," Vitamin, 2016, vol. 90, No. 10, pp. 502-507.
Makris et al., "Mitochondriopathy of Peripheral Arterial Disease" 2007, Vascular 15(6):336-343.
Martinez F., et al., "Structural And Functional Changes In Mitochondria Associated With Trophoblast Differentiation: Methods To Isolate Enriched Preparations of Syncytiotrophoblast Mitochondria," Endocrinology, May 31, 1999, vol. 138, No. 5, pp. 2172-2183, XP055144697.
Masuzawa et al., "Transplantation of Autologously Derived Mitochondria Protects the Heart from Ischemia-reperfusion Injury" Jan. 25, 2013, American Journal of Physiology-Heart and Circulatory Physiology 304(7):H966-H982.
Mccully J.D., et al., "Injection of Isolated Mitochondria During Early Reperfusion For Cardioprotection," The American Journal of Physiology-Heart and Circulatory Physiology, Oct. 31, 2008, vol. 296, No. 1, 13 Pages, XP055144701.
Messenger A.G., et al., "Minoxidil: Mechanisms of Action on Hair Growth," British Journal of Dermatology, 2004, vol. 150, No. 2, pp. 186-194.
Mialet-Perez et al. "Cardiac monoamine oxidases: at the heart of mitochondrial dysfunction," Cell Death Dis, Jan. 23, 2020, vol. 11 (54), pp. 1-3, [retrieved on Nov. 4, 2022], retrieved from the Internet: URL: https://www.nature.com/articles/s41419-020-2251-4.pdf.
Modica-Napolitano J.S., et al., "Mitochondria As Targets For Detection And Treatment of Cancer," Expert Reviews in Molecular Medicine, Apr. 2002, vol. 4, No. 9, pp. 1-19.
Morley S.A., et al., "Plant Mitochondrial DNA," Frontiers in Bioscience, Landmark, Jan. 1, 2017, vol. 22, pp. 1023-1032.
Mracek et al,. "The Function and the Role of the Mitochondrial Glycerol-3-Phosphate Dehydrogenase in Mammalian Tissues," Biochimica et Biophysica Acta (BBA)—Bioenergetics, Dec. 7,

(56) References Cited

OTHER PUBLICATIONS 2012, vol. 1827(3), pp. 401-410, [retrieved on Nov. 4, 2022], retrieved from the Internet: URL: https://doi.org/10.1016/j.bbabio.2012.11.014.
Muftuoglu et al. "Mitochondrial Complex I and IV Dysfunction of Leukocytes in Parkinson's Disease" 2003, Turkish Journal of Biochemistry 28(4):246-251.
Muir R., et al., "Mitochondrial Content is Central to Nuclear Gene Expression: Profound Implications for Human Health," BioEssays, 2015, vol. 38, No. 2, pp. 150-156.
Murphy et al. "Allogeneic Endometrial Regenerative Cells: an Off the Shelf Solution for Critical Limb Ischemia?" Aug. 19, 2008, Journal of Translational Medicine 6(45):1-8.
Murthy M.S.R., et al., "Some Differences In The Properties Of Carnitine Palmitoyltransferase Activities Of The Mitochondrial Outer And Inner Membranes," Biochemical Journal, 1987, vol. 248, No. 3, pp. 727-733.
Nakamura K., et al., "Characterization Of Bioactive Agents In Five Types Of Marketed Sprouts And Comparison Of Their Antihypertensive, Antihyperlipidemic, And Antidiabetic Effects In Fructose-Loaded SHRs," Journal of Food Science and Technology, 2016, vol. 53, No. 1, pp. 581-590.
Neste D.V., et al., "Finasteride Increases Anagen Hair in Men with Androgenetic Alopecia," British Journal of Dermatology, 2000, vol. 143, No. 4, pp. 804-810.
Noterman M.F., et al., "Dual-Process Brain Mitochondria Isolation Preserves Function And Clarifies Protein Composition," PNAS, Feb. 2, 2021, vol. 118, No. 11, pp. 1-10.
Office Action for European Application No. 16754857.7, mailed May 4, 2022, 10 Pages.
Office Action for European Patent Application No. 12830575.2, mailed Mar. 16, 2017, 4 Pages.
Office Action for European Patent Application No. 12830575.2, mailed Feb. 24, 2016, 10 Pages.
Office Action for European Patent Application No. 12830575.2, mailed Oct. 25, 2016, 8 Pages.
Office Action for European Patent Application No. 12830575.2, mailed Sep. 28, 2015, 7 Pages.
Office Action for European Patent Application No. 16754857.7, mailed Jun. 6, 2019, 4 Pages.
Office Action for European Patent Application No. 19841655.4, mailed Jun. 28, 2023, 17 Pages.
Office action for Israel Patent Application No. 299482, mailed Jun. 22, 2023, 6 pages.
Office Action for Japanese Patent Application No. 2020551356, mailed Feb. 7, 2023, 11 Pages.
Office Action for Japanese Patent Application No. 2021502765, mailed Jun. 27, 2023, 11 Pages.
Office Action for Japanese Patent Application No. 2021502783, mailed Jun. 27, 2023, 10 Pages.
Office Action for Japanese Patent Application No. 2021502844, mailed Jul. 4, 2023, 16 Pages.
Office Action for Japanese Patent Application No. 2021502870, mailed Jun. 27, 2023, 10 Pages.
Office Action for Japanese Patent Application No. 2021502879, mailed Jun. 27, 2023, 19 Pages.
Office Action for Japanese Patent Application No. 2021503582, mailed Jun. 27, 2023, 16 Pages.
Parone P.A., et al., "Preventing Mitochondrial Fission Impairs Mitochondrial Function And Leads To Loss Of Mitochondrial DNA," PLoS One, Feb. 2008, vol. 3, No. 9, 9 Pages.
Pasquier J., et al., "Preferential Transfer of Mitochondria From Endothelial to Cancer Cells Through Tunneling Nanotubes Modulates Chemoresistance," Journal of Translational Medicine, Apr. 10, 2013, vol. 11, No. 94, 14 Pages, XP021151199, Retrieved from URL: http://download.springer.com/static/pdf/438/art%253A10.1186%252F1479-5876-11-94.pdf?originUrl=http%3A%2F%2Ftranslational-medicine.biomedcentral.com%2Farticle%2F10.1186%2F1479-5876-11-94&token2=exp=1465970179~acl=%2Fstatic%2Fpdf%2F438%2Fart%25253A10.1186%25252F1479-5876-11-94.pdf*~hmac=9ddc595d5.
Piel et al. "Exogenous Cytochrome C Restores Myocardial Cytochrome Oxidase Activity into the Late Phase of Sepsis" 2008, Shock 29(5):612-616.
Piel et al. "Mitochondrial Resuscitation with Exogenous Cytochrome C in the Septic Heart" 2007, Critical Care Medicine 35(9):2120-2127.
Pinkert C.A., et al., "Mitochondria Transfer Into Mouse Ova By Microinjection," Transgenic Research, Nov. 1997, vol. 6, No. 6, pp. 379-383.
Pipino C., et al., "Placenta As A Reservoir of Stem Cells: An Underutilized Resource?," British Medical Bulletin, Nov. 25, 2012, vol. 105, No. 1, pp. 1-25.
Platzbecker et al., "Treatment of MDS," Blood, The Journal of the American Society of Hematology, 2019, vol. 133, No. 10, pp. 1096-1107.
Plotnikov E.Y., et al., "Cytoplasm And Organelle Transfer Between Mesenchymal Multipotent Stromal Cells And Renal Tubular Cells In Co-culture," Experimental Cell Research, Sep. 10, 2010, vol. 316, No. 15, pp. 2447-2455.
Romero-Moya D., et al., "Cord Blood-Derived CD34+ Hematopoietic Cells With Low Mitochondrial Mass Are Enriched in Hematopoietic Repopulating Stem Cell Function," Haematologica, 2013, vol. 98, No. 7, pp. 1022-1029.
Roushandeh A.M., et al., "Mitochondrial Transplantation as a Potential and Novel Master Key for Treatment of Various Incurable Diseases," Cytotechnology, 2019, vol. 71, No. 2, pp. 647-663.
Rousou A.J., et al., "Opening of Mitochondrial KATP Channels Enhances Cardioprotection Through The Modulation of Mitochondrial Matrix Volume Calcium Accumulation, And Respiration," American Journal of Physiology-Heart and Circulatory Physiology, Jul. 8, 2004, vol. 287, No. 5, pp. H1967-H1976, XP055144706.
Saely C.H., et al., "Brown versus White Adipose Tissue: A Mini-Review," Gerontology, 2012, 58(1), pp. 15-23.
Satoh et al. "Mitochondrial Damage-induced Impairment of Angiogenesis in the Aging Rat Kidney" Feb. 2011, Laboratory Investigation 91(2):190-202.
Schechner et al. "Engraftment of a Vascularized Human Skin Equivalent" Dec. 2003, FASEB Journal 17(15):2250-2256.
Sebetic K., et al., "UV Damage of the Hair," Collegium Antropologicum, 2008, vol. 32 Supplement.2, pp. 163-165.
Shi J., et al., "Mitochondria Transfer Into Fibroblasts: Liposome-Mediated Transfer of Labeled Mitochondria Into Cultured Cells," Ethnicity and Disease, Mar. 2008, vol. 18, No. 2, pp. S1-43-S1-44.
Shimoji H., et al., "Inhibitory Effects of Flavonoids on Alternative Respiration of Plant Mitochondria," Biologia Plantarum, 2005, vol. 49, No. 1, pp. 117-119.
Shin et al., "Mitochondrial DNA Mutations in Patients with Myelodysplastic Syndromes", Blood, The Journal of the American Society of Hematology, 2003, vol. 101, No. 8, pp. 3118-3125.
Sidney L.E., et al., "Concise Review: Evidence for CD34 as a Common Marker for Diverse Progenitors," Stem Cells, 2014, vol. 32, No. 6, pp. 1380-1389.
Sivitz W.I., et al., "Mitochondrial Dysfunction In Obesity And Diabetes," US Endocrinology, Dec. 31, 2010, vol. 6, No. 1, pp. 20-27, DOI: 1 0.17925/USE.201 0.06.1.20, XP055729849.
Smith et al. "Locally Enhanced Angiogenesis Promotes Transplanted Cell Survival" 2004, Tissue Engineering 10(1-2):63-71 (11 pages).
Smith L.J., et al., "Stem Cell-Derived Clade F AAVs Mediate High-Efficiency Homologous Recombination-Based Genome Editing," Proceedings of the National Academy of Sciences of the United States of America, Jul. 31, 2018, vol. 115, No. 31, DOI: 10.1073/pnas.1802343115, pp. E7379-E7388, XP055609078.
Snyder C., et al., "Mitochondria and Chloroplasts Shared in Animal and Plant Tissues: Significance of Communication," Medical Science Monitor, 2015, vol. 21, pp. 1507-1511.
Spees J.L., et al., "Mitochondrial Transfer Between Cells Can Rescue Aerobic Respiration," Proceedings Of The National Academy Of Sciences, US, Jan. 31, 2006, vol. 103, No. 5, pp. 1283-1288, doi:10.1073/pnas.0510511103, ISSN 0027-8424, XP055349990.

(56) References Cited

OTHER PUBLICATIONS

Stork C., et al., "Mitochondrial Dysfunction in Bipolar Disorder: Evidence From Magnetic Resonance Spectroscopy Research," Molecular Psychiatry, 2005, vol. 10, No. 10, pp. 900-919.
Szewczyk A., et al., "Mitochondria as a Pharmacological Target," Pharmacological Reviews, Mar. 2002, vol. 54, No. 1, pp. 101-127.
Tachibana M., et al., "Mitochondrial Gene Replacement in Primate Offspring and Embryonic Stem Cells," Nature, Sep. 17, 2009, vol. 461, No. 7262:367-372, 15 Pages, doi:10.1038/nature08368, XP055072881, Retrieved from URL: http://www.nature.com/nature/journal/v461/n7262/abs/nature08368.html.
Takeda K., et al., "Microinjection of Cytoplasm or Mitochondria Derived From Somatic Cells Affects Parthenogenetic Development of Murine Oocytes," Biology of Reproduction, Feb. 16, 2005, vol. 72, No. 6, pp. 1397-1404.
The Champ Foundation, "William's blog., Let's get More Research Started," Fighting against Pearson Syndrome, May 1, 2017, 4 pages.
Tian L., et al., "Impaired Mitochondrial Function Results from Oxidative Stress in the Full-Term Placenta of Sows with Excessive Back-Fat," Animals, Feb. 2020, vol. 10, No. 360, pp. 1-19.
Torralba D., et al., "Mitochondria Know No Boundaries: Mechanisms and Functions of Intercellular Mitochondrial Transfer," Front Cell Dev Biol., Sep. 2016, vol. 4, 11 pages.
Tuckey R.C., et al., "The Concentration Of Adrenodoxin Reductase Limits Cytochrome P450scc Activity In The Human Placenta," European Journal of Biochemistry, Jul. 31, 1999, vol. 263, No. 2, pp. 319-325, XP055144683.
Tuckey R.C., "Progesterone Synthesis by the Human Placenta," Placenta, May 2005, vol. 26, No. 4, pp. 273-281.
Van Blerkom J., et al., "Mitochondrial Transfer Between Oocytes: Potential Applications Of Mitochondrial Donation And The Issue Of Heteroplasmy," Human Reproduction, Nov. 1998, vol. 13, No. 10, pp. 2857-2868.
Wagle M.A., et al., "The Utility Of An Isolated Mitochondrial Fraction In The Preparation Of Liposomes For The Specific Delivery Of Bioactives To Mitochondria In Live Mammalian Cells," Pharmaceutical Research, Jul. 15, 2011, vol. 28, No. 11, pp. 2790-2796.
Wang W., et al., "Novel Targets for Mitochondrial Medicine," Science Translational Medicine, vol. 8, No. 326, Feb. 17, 2016, 17 pages, Retrieved from the Internet: https://www.ncbi.nlm.nih.gov/pmc/articles/PMC4819426/pdf/nihms769346.pdf.
Wei Y., et al., "Nonalcoholic Fatty Liver Disease and Mitochondrial Dysfunction," World J Gastroenterol, Jan. 14, 2008, vol. 14, No. 2, pp. 193-199.
Weiss J.N., et al., "Stem Cell Ophthalmology Treatment Study: Bone Marrow Derived Stem Cells in the Treatment of Retinitis Pigmentosa," Stem Cell investigation, Jun. 6, 2018, vol. 5, No. 18, pp. 1-9, doi:10.21037/sci.2018.04.02, XP055778156.
Wieckowski M.R., et al., "Isolation Of Mitochondria-Associated Membranes And Mitochondria From Animal Tissues And Cells," Nature Protocol, Oct. 8, 2009, vol. 4, No. 11, pp. 1582-1590.
Xu Y., et al., "Efficient Commitment To Functional CD34+ Progenitor Cells From Human Bone Marrow Mesenchymal Stem-cell-derived Induced Pluripotent Stem Cells," PLoS One, vol. 7, No. 4, 2012, e34321,10 Pages.
Yamagata K., et al., "Pathological Roles of Mitochondrial Dysfunction in Podocyte Injury," The Japanese Journal of Nephrology, 2007, vol. 49, No. 2, pp. 82-87.
Yamaguchi R., et al., "Mitochondria Frozen With Trehalose Retain A Number Of Biological Functions And Preserve Outer Membrane Integrity," Cell Death Differentiation, Copyright Year: 2007, Published Online: Sep. 15, 2006, vol. 14, No. 3, pp. 616-624, XP055144699.
Yasuda K., et al., "Tunneling Nanotubes Mediate Rescue Of Prematurely Senescent Endothelial Cells By Endothelial Progenitors: Exchange Of Lysosomal Pool," Aging, Jun. 2011, vol. 3, No. 6, pp. 597-608.
You Y., et al., "Mulberry and Mulberry Wine Extract Increase the Number of Mitochondria During Brown Adipogenesis," Food & Function, Feb. 2015, vol. 6, No. 2, pp. 401-408.

Yu J., et al., "Induced Pluripotent Stem Cell Lines Derived From Human Somatic Cells," Science, Dec. 21, 2007, vol. 318, No. 5858, pp. 1917-1920.
Zhang Y., et al., "Deletion of a 4977-bp Fragment in the Mitochondrial Genome is Associated With Mitochondrial Disease Severity," PloS One, May 29, 2015, vol. 10, No. 5: e0128624, 10 Pages, XP055549866, Retrieved from URL: http://journals.plos.org/plosone/article?id=10.1371/journal, pone.0128624.
Zheng Y., et al., "Mitochondrial DNA 4977 bp Deletion is a Common Phenomenon in Hair and Increases with Age," Bosn Journal of Basic Medical Sciences, 2012, vol. 12, No. 3, pp. 187-192.
Che et al. Mitochondrial dysfunction in the pathophysiology of renal diseases, Am J Physiol Renal Physiol 306: F367-F378 (Year:2014).
Hall et al. The Not So 'Mighty Chondrion': Emergence of Renal Diseases due to Mitochondrial Dysfunction. Nephron Physiol 2007; 105:p. 1-p. 10 (Year: 2007).
Hashimi et al. Nephritic Syndrome. StatPearls [Internet]. Treasure Island (FL): StatPearls Publishing; Jan. 2021. NCBI Bookshelf. A service of the National Library of Medicine, National Institutes of Health. p. 1-8 (Year: 2021).
Keefe et al. Fanconi Syndrome. StatPearls [Internet]. Treasure Island (FL): StatPearls Publishing; Jan. 2021. NCBI Bookshelf. A service of the National Library of Medicine, National Institutes of Health. p. 1-4 (Year: 2021).
Anonymous: "History of Changes for Study: NCT03384420", ClinicalTrials.gov archive, Dec. 2017, 4 pages.
Anonymous: "William's Blog I The Champ Foundation", The Champ Foundation, Feb. 2018, 5 pages.
EP Extended European Search Report in European Application No. EP19841655.4, dated Mar. 11, 2022, 18 pages.
EP Extended European Search Report in European Application No. EP19840685.2, dated Apr. 22, 2022, 9 pages.
EP Extended European Search Report in European Application No. EP19841817.0, dated May 6, 2022, 7 pages.
EP Extended European Search Report in European Application No. EP19840137.4, dated Apr. 22, 2022, 8 pages.
EP Extended European Search Report in European Application No. EP198407744.4, dated May 6, 2022, 9 pages.
EP Extended European Search Report in European Application No. EP19841283.5, dated May 6, 2022, 7 pages.
EP Extended European Search Report in European Application No. EP19840282.8, dated Apr. 22, 2022, 7 pages.
Gollihue et al., "Mitochondrial transplantation strategies as potential therapeutics for central nervous system trauma", Neural regeneration research, Feb. 2018, 13.2:194.
Jacoby et al., "First-in-Human Mitochondrial Augmentation of Hematopoietic Stem Cells in Pearson Syndrome", Blood, American Society of Hematology, Nov. 2018, 132(Supp. 1):1024.
Jacoby et al., "Mitochondrial augmentation of CD34+ cells from healthy donors and patients with mitochondrial DNA disorders confers functional benefit", NPJ Regenerative Medicine, Dec. 2021, 6(1):1-12.
De Maranon et al., "Targeting Mitochondria: A Great Boon to Fight Type 2 Diabetes," Redox Experimental Medicine, 2022, pp. R127-R138.
EP Office Action in European Application No. 19840137.4, dated Jan. 29, 2024, 11 pages.
EP Office Action in European Application No. 19840685.2, dated Feb. 21, 2024, 13 pages.
EP Office Action in European Application No. 19841817.0, dated Feb. 28, 2024, 11 pages.
EP Office Action in European Application No. 19842284.2, dated Feb. 21, 2024, 11 pages.
Garone et al., "Clinical and Genetic Spectrum of Mitochondrial Neurogastrointestinal Encephalomyopathy," Brain a Journal of Neurology, 2011, vol. 134, pp. 3326-3332.
Seo et al., "Age-related changes in skeletal muscle mitochondria: the role of exercise", Integrative Medicine Research, Jul. 2016, 5(3): 182-186.
Sookoian et al., "Mitochondrial genome architecture in non-alcoholic fatty liver disease", Journal of Pathology, Oct. 2016, 240: 437-449.

(56) References Cited

OTHER PUBLICATIONS

Tomizawa et al., "Elevated levels of alanine transaminase and triglycerides within normal limits are associated with fatty liver", Experimental and Therapeutic Medicine, May 2014, 8: 759-762.
Prasun P, Ginevic I, Oishi K. "Mitochondrial dysfunction in non-alcoholic fatty liver disease and alcohol related liver disease". Transl Gastroenterol Hepatol. Jan. 5, 2021;6:4. doi: 10.21037/tgh-20-125. PMID: 33437892; PMCID: PMC7792990.
Canadian Center Society, "Side effects of a stem cell transplant". Available online: [https://cancer.ca/en/treatments/treatment-types/stem-cell-transplant/side-effects-of-stem-cell-transplant].
Rao RS, Salvato F, Thal B, Eubel H, Thelen JJ, Møller IM. "The proteome of higher plant mitochondria". Mitochondrion. Mar. 2017;33:22-37. doi: 10.1016/j.mito.2016.07.002. Epub Jul. 9, 2016. PMID: 27405097.
Naing et al, "Maternally inherited diabetes and deafness (MIDD): Diagnosis and management", Journal of Diabetes and its Complications, vol. 28, Issue 4, 2014, pp. 542-546, doi: 10.1016/j.jdiacomp.2014.03.006. Epub Mar. 12, 2014. PMID: 24746802.
Rovira-Llopis et al, "Mitochondrial dynamics in type 2 diabetes: Pathophysiological implications", Redox Biology, vol. 11, 2017, pp. 637-645, doi: 10.1016/j.redox.2017.01.013. Epub Jan. 16, 2017. PMID: 28131082; PMCID: PMC5284490.
Imamura, Yoji et al. "Angiogenic therapy using autologous bone marrow stem cells Results of autologous bone marrow cells implantation (BMI) for hindlimb and ischemic myocardium", Journal of Saitama Medical University, 2003, vol. 30, No. 4, p. 195.
Masakaba Tagawa et al "Cell therapy using bone marrow mononuclear cells" J Jpn Coll Angiol, 2006, vol. 46, pp. 281-288.
Caldas de Andrade et al. "Bone marrow mononuclear cell transplantation improves mitochondrial bioenergetics in the liver of cholestatic rats" Experimental Cell Research, vol. 336, Issue 1, 2015, pp. 15-22, doi: 10.1016/j.yexcr.2015.05.002. Epub May 12, 2015. PMID: 25978973.
Weihong Yan et al."Umbilical Cord MSCs Reverse D-Galactose-Induced Hepatic Mitochondrial Dysfunction via Activation of Nrf2/HO-1 Pathway", Biological and Pharmaceutical Bulletin, 2017, 40 p. 1174-1182, doi: 10.1248/bpb.b16-00777. Epub May 13, 2017. PMID: 28502921.
Greiff, D., and M. Myers. "Effect of dimethyl sulphoxide on the cryo-tolerance of mitochondria." Nature 190.4782 (1961): 1202-1204. https://doi.org/10.1038/1901202b0.
Nukala, Vidya N., et al. "Cryopreservation of brain mitochondria: a novel methodology for functional studies." Journal of neuroscience methods 152.1-2 (2006): 48-54. doi: 10.1016/j.jneumeth.2005.08.017. Epub Oct. 24, 2005. PMID: 16246427.
Nishigaki, Y., et al., "Mitochondrial Dysfunctions and Age-associated Diseases," Japanese Journal of Geriatrics, 2006, vol. 43, No. 3, pp. 274-282. https://doi.org/10.3143/geriatrics.43.274.
Niyazov et al., "Primary mitochondrial disease and secondary mitochondrial dysfuntion: importance of distinction for diagnosis and treatment", molecular syndromology, 2016 7: 122-137.
Rosa, E.F., et al., "Vitamin C and E Supplementation Prevents Mitochondrial Damage of Ileum Myocytes caused by Intense and Exhaustive Exercise Training," Journal of Applied Physiology, 2009, vol. 107, pp. 1532-1538. doi: 10.1152/japplphysiol.91166.2008. Epub Aug. 20, 2009. PMID: 19696358.
Rotig et al., Spectrum of mitochondrial DNA rearrangements in the pearson marrow-pamcreas syndrome, Human molecular genetics, 1995, 4(8): 1327-1330. doi: 10.1093/hmg/4.8.1327. PMID: 7581370.
Wakino, S., et al., "The Cutting-Edge or Medicine: Aging and Chronic Kidney Disease," Nihon Naika Gakkai Zasshi, 2017, vol. 106, Issue 5, pp. 1019-1028. DOI: 10.2169/naika.106.1019.
Wang et al., "Stem cell-derived mitochondria transplantation: A Novel strategy and the challenges for the treatment of tissue injury", Stem Cell Research & Therapy, 2018 9(106), 10 pages. doi: 10.1186/s13287-018-0832-2. PMID: 29653590; PMCID: PMC5899391.
Zhan et al., "Mitochondrial Dynamics: Regulatory mechanisms and Emerging role in renal pathophysiology", Kidney International, 2013, 83(4): 568-581. doi: 10.1038/ki.2012.441. Epub Jan. 16, 2013. PMID: 23325082; PMCID: PMC3612360.
Yu-Wai-Man P. Griffiths et al. 2009 Inherited mitochondrial optic neuropathies. Journal of medical genetics, 46(3), pp. 145-158 (2008). doi: 10.1186/s13287-018-0832-2. PMID: 29653590; PMCID: PMC5899391.
Mi Jin Kim et al. et al."Delivery of Exogenous mitochondria via centrifugation enhances cellular metabolic function" Scientific reports vol. 8 No. 1, Feb. 20, 2018. https://doi.org/10.1038/s41598-018-21539-y.
Silva, Gisele S et al., "Causes of ischemic stroke", in Acute ischemic stroke: imaging and intervention, R.G. Gonzalez et al. (Eds.) Springer-Verlag Berlin Heidelberg 2011, pp. 25-42. DOI:10.1007/978-3-642-12751-9_2.
Bartelink, Imke H, et al. "Association between busulfan exposure and outcome in children receiving intravenous busulfan before hematologic stem cell transplantation" Biology of blood and marrow transplantation 15.2 (2009) 231-241. https://doi.org/10.1016/j.bbmt.2008.11.022.
Russell Oliver, Turnbull Doug "Mitochondrial DNA disease—molecular insights and potential routes to a cure" Elsevier Inc. Experimental Cell Research 325(1):38-43. doi: 10.1016/j.yexcr.2014.03.012. Epub Mar. 24, 2014. PMID: 24675282; PMCID: PMC4058519.
Ganetzky Rebecca et al "Recognizing the Evolution of Clinical Syndrome Spectrum Progression in Individuals with Single Large-Scale mitochondrial DNA deletion syndromes (SLSMDS)" medRxiv 2024.08.23.24312119; doi: https://doi.org/10.1101/2024.08.23.24312119.

\* cited by examiner

30min  8h

24h

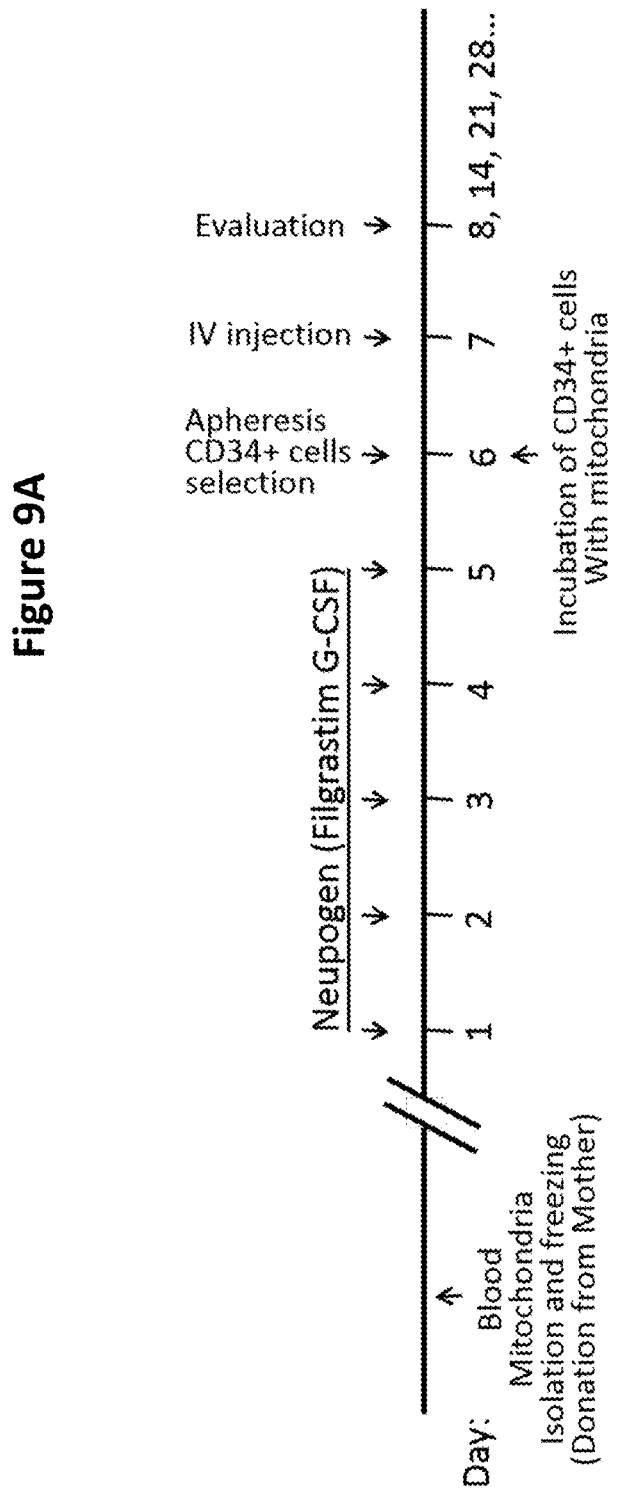

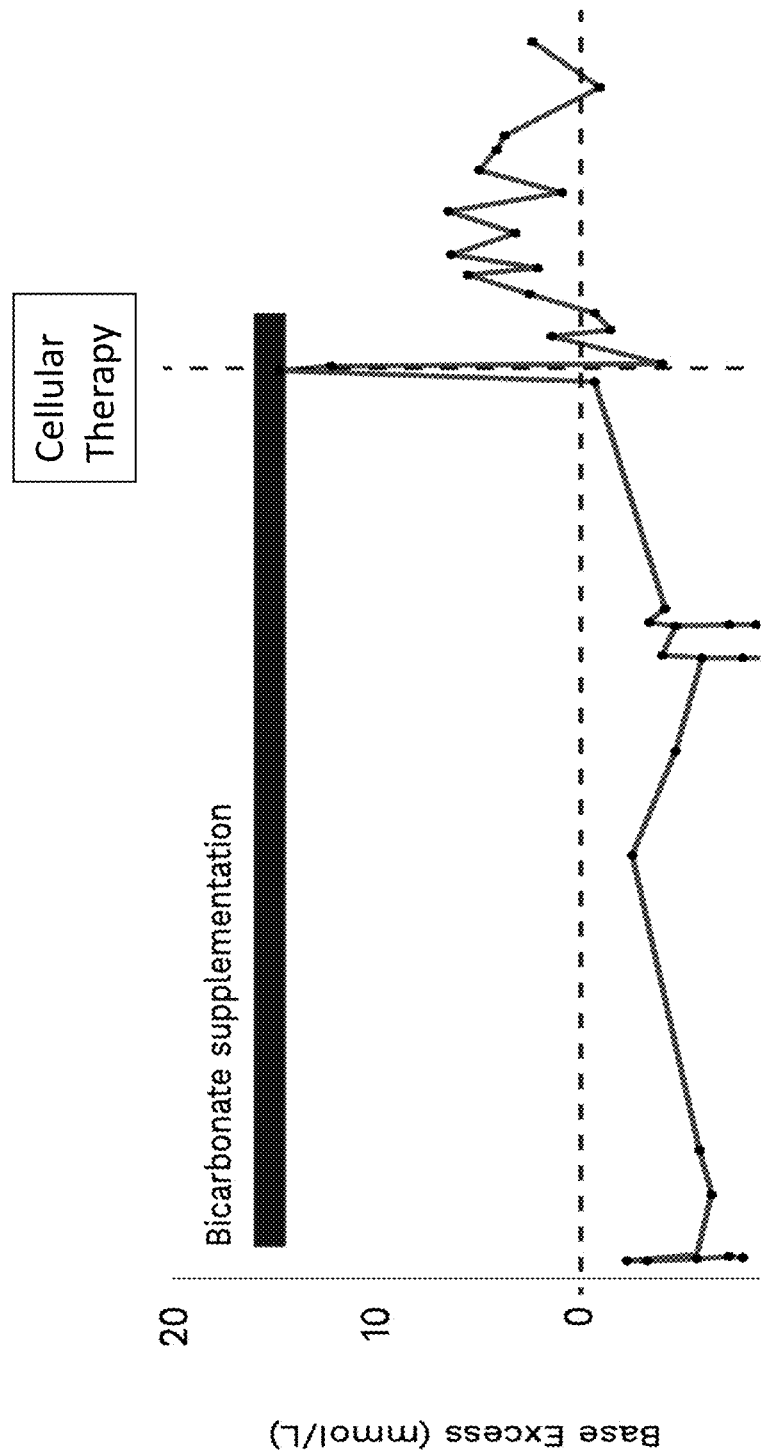

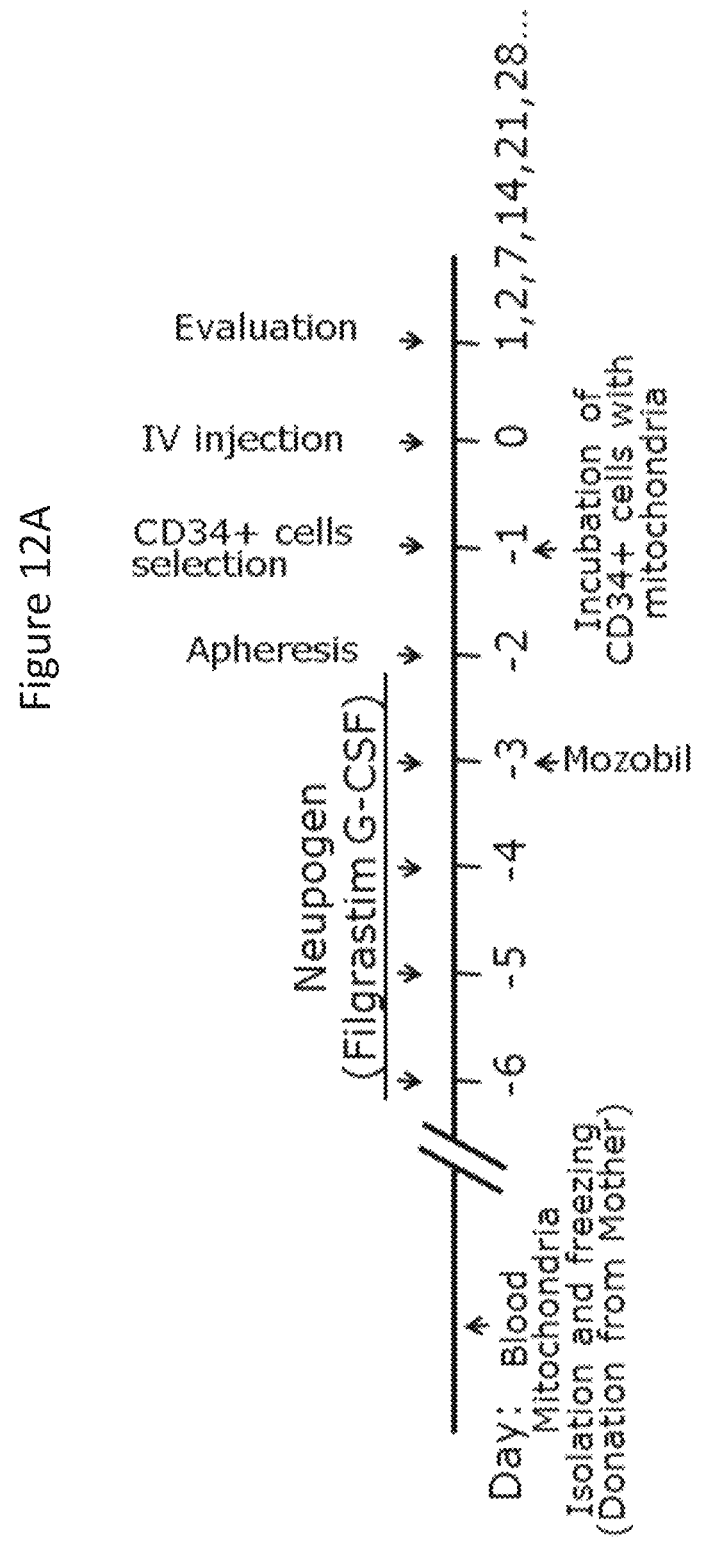

MITOCHONDRIAL AUGMENTATION THERAPY FOR PRIMARY MITOCHONDRIAL DISEASES

CROSS-REFERENCE TO RELATED APPLICATIONS

This application is a 35 USC § 371 National Stage application of International Application No. PCT/IL2019/050823 filed Jul. 22, 2019, now pending; which claims the benefit under 35 USC § 119 (e) to U.S. Application Ser. No. 62/753,947 filed Nov. 1, 2018 and to U.S. Application Ser. No. 62/701,783 filed Jul. 22, 2018. The disclosure of each of the prior applications is considered part of and is incorporated by reference in the disclosure of this application.

FIELD OF THE INVENTION

The present invention relates to mammalian stem cells, more specifically human stem cells, enriched with exogenous functional human mitochondria. The present invention further relates to methods for their production, and therapeutic methods utilizing such enriched cells.

BACKGROUND OF THE INVENTION

The mitochondrion is a membrane bound organelle found in most eukaryotic cells, ranging from 0.5 to 1.0 μm in diameter. Mitochondria are found in nearly all eukaryotic cells and vary in number and location depending on the cell type. Mitochondria contain their own DNA (mtDNA) and their own machinery for synthesizing RNA and proteins. The mtDNA contains only 37 genes, thus most of the gene products in the mammalian body are encoded by nuclear DNA.

Mitochondria perform numerous essential tasks in the eukaryotic cell such as pyruvate oxidation, the Krebs cycle and metabolism of amino acids, fatty acids and steroids. However, the primary function of mitochondria is the generation of energy as adenosine triphosphate (ATP) by means of the electron-transport chain and the oxidative-phosphorylation system (the "respiratory chain"). Additional processes in which mitochondria are involved include heat production, storage of calcium ions, calcium signaling, programmed cell death (apoptosis) and cellular proliferation. Therefore, there are many diseases and disorders known in the art associated with malfunction or dysfunction of mitochondria which require treatment.

The ATP concentration inside the cell is typically 1-10 mM. ATP can be produced by redox reactions using simple and complex sugars (carbohydrates) or lipids as an energy source. For complex fuels to be synthesized into ATP, they first need to be broken down into smaller, simpler molecules. Complex carbohydrates are hydrolyzed into simple sugars, such as glucose and fructose. Fats (triglycerides) are metabolized to give fatty acids and glycerol.

The overall process of oxidizing glucose to carbon dioxide is known as cellular respiration and can produce about 30 molecules of ATP from a single molecule of glucose. ATP can be produced by a number of distinct cellular processes. The three main pathways used to generate energy in eukaryotic organisms are glycolysis and the citric acid cycle/oxidative phosphorylation, both components of cellular respiration, and beta-oxidation. The majority of this ATP production by a non-photosynthetic aerobic eukaryote takes place in the mitochondria, which can make up nearly 25% of the total volume of a typical cell.

Mitochondrial diseases are a group of disorders caused by dysfunctional mitochondria. Primary mitochondrial diseases may be caused by mutations in the mitochondrial DNA that affect mitochondrial function, or by mutations in genes of the nuclear DNA, whose gene products are imported into the mitochondria (mitochondrial proteins). Mitochondrial diseases take on unique characteristics both because of the way the diseases are often inherited and because mitochondria are so critical to cell function. The subclass of these diseases that have neuromuscular disease symptoms are often called a mitochondrial myopathy. Unlike primary mitochondrial diseases, secondary mitochondrial dysfunction also known as acquired mitochondrial dysfunction can be caused by genes of the nuclear DNA that are not directly involved in the mitochondrial oxidative phosphorylation cascade. Affected genes will encode neither a mitochondrial protein nor affect oxidative phosphorylation (OXPHOS) by impacting production of the complex machinery needed to run the OXPHOS process. Secondary mitochondrial dysfunction can accompany many diseases or disorders, e.g. fatty liver disease, myocardial infarction and stroke, and can also be acquired secondary to adverse environmental or drug-related effects which can cause oxidative stress. The latter can result in mtDNA alterations and/or dysfunctional mitochondria as seen in a variety of other processes adversely impacting mitochondria such as aging, inflammatory response, mitotoxic drugs, etc.

Mitochondrial disease may become clinically apparent once the number of affected mitochondria reaches a certain level; this phenomenon is called "Heteroplasmy threshold".

Mitochondrial DNA mutations occur frequently, due to non-efficient error checking capability and since the DNA is naked and has no protections like nuclear histones. This means that mitochondrial DNA disorders may occur spontaneously and relatively often. Defects in enzymes that control mitochondrial DNA replication (all of which are encoded by genes in the nuclear DNA) may also cause mitochondrial DNA mutations. Most mitochondrial function and biogenesis is controlled by nuclear DNA. Human mitochondrial DNA encodes only 13 proteins of the respiratory chain, while most of the estimated 1,500 proteins and components targeted to mitochondria are nuclear-encoded. Defects in nuclear-encoded mitochondrial genes are associated with a wide spectrum of clinical disease phenotypes including anemia, dementia, epilepsy, diabetes, myopathy, hypertension, lymphoma, retinopathy, seizures, and neurodevelopmental disorders.

Pearson syndrome (PS) is a mitochondrial disease characterized by bone marrow failure, anemia and pancreas dysfunction. Other clinical features are failure to thrive, pancreatic fibrosis with insulin-dependent diabetes and exocrine pancreatic deficiency, kidney insufficiency, muscle and neurologic impairment. The few patients who survive into adulthood often develop symptoms of Kearns-Sayre syndrome (KSS).

Renal Fanconi syndrome or Fanconi's syndrome is a syndrome of inadequate reabsorption in the proximal renal tubules of the kidney. The syndrome can be caused by various underlying congenital or acquired diseases, by toxicity, or by adverse drug reactions. It results in various small molecules of metabolism being passed into the urine instead of being reabsorbed from the tubular fluid.

KSS is a mitochondrial myopathy, a more severe syndromic variant of chronic progressive external ophthalmoplegia (CPEO), a syndrome that is characterized by isolated involvement of the muscles controlling movement of the eye and eyelid. KSS results in ptosis and ophthalmoplegia. KSS involves a combination of CPEO and pigmentary retinopathy in eyes and cardiac conduction abnormalities. Other symptoms may include cerebellar ataxia, proximal muscle weakness, deafness, diabetes mellitus, growth hormone deficiency and hypoparathyroidism.

Leber's hereditary optic neuropathy (LHON) or Leber optic atrophy is a mitochondrially inherited (transmitted from mother to offspring) degeneration of retinal ganglion cells (RGCs) and their axons that leads to an acute or sub-acute loss of central vision, affecting predominantly young adult males. However, LHON is only transmitted through the mother as it is primarily due to mutations in the mitochondrial (not nuclear) genome and only the egg contributes mitochondria to the embryo. LHON is usually due to one of three pathogenic mitochondrial DNA (mtDNA) point mutations. These mutations are at nucleotide positions 11778 G to A, 3460 G to A and 14484 T to C, respectively in the ND4, ND1 and ND6 subunit genes of complex I of the oxidative phosphorylation chain in mitochondria. These mutations can lead to the reduction in cellular energy production, which in turn results in cell damage and death of certain optic nerve cells. At this time, experts are unable to tell which, if any family members will develop symptoms, though on average 50% of men and 15% of women with a LHON mutation will lose vision in their lifetime.

Mitochondrial encephalomyopathy, lactic acidosis, and stroke-like episodes—abbreviated to MELAS—is one of the family of mitochondrial cytopathies, which also include MERRF, and Leber's hereditary optic neuropathy. The disease can manifest in both sexes. MELAS is caused by mutations in the genes in mitochondrial DNA. Some of the genes (MT-ND1, MT-ND5) affected in MELAS encode proteins that are part of NADH dehydrogenase (also called complex I) in mitochondria, that helps convert oxygen and simple sugars to energy. Other genes (MT-TH, MT-TL1, and MT-TV) encode mitochondrial specific transfer RNAs (tRNAs). Mutations in MT-TL1 cause more than 80% of all cases of MELAS. They impair the ability of mitochondria to make proteins, use oxygen, and produce energy.

Mitochondrial Respiratory Chain Disorders (MRCDs) are a heterogeneous group of disorders that share the involvement of the cellular bio-energetic machinery due to molecular defects affecting the mitochondrial oxidative phosphorylation system (OXPHOS). Clinically, they usually involve multiple tissues although they tend to mainly affect nervous system and skeletal muscle. Cardiologic manifestations are frequent and include hypertrophic or dilated cardiomyopathies and heart conduction defects, being part of adult or infantile multi-systemic mitochondrial disorders or, less frequently, presenting as isolated clinical condition. In certain embodiments, the mitochondrial disease is a mitochondrial respiratory chain disease (MRCD).

Stem cells are generally cells that can differentiate into other types of cells and/or can divide to produce more of the same type of stem cells. In mammals, the main types of stem cells are embryonic stem cells and adult stem cells. There are at least three known sources of adult stem cells in humans: bone marrow stem cells, adipose tissue stem cells, and blood stem cells. Other stem cells include mesenchymal stem cells (MSC's), tissue-specific stem cells and induced pluripotent stem cells (iPSC's).

WO 2013/002880 describes compositions and methods comprising bio-energetic agents for restoring the quality of aged oocytes, enhancing oogonial stem cells or improving derivatives thereof (e.g., cytoplasm or isolated mitochondria) for use in fertility-enhancing procedures.

WO 2013/035101 to the present inventors relates to mitochondrial compositions and therapeutic methods of using same, and discloses compositions of partially purified functional mitochondria and methods of using the compositions to treat conditions which benefit from increased mitochondrial function by administering the compositions to a subject in need thereof.

WO 2016/008937 relates to methods for the intercellular transfer of mitochondria isolated from a population of donor cells into a population of recipient cells. The methods show improved efficacy of transfer of an amount mitochondria.

US 2012/0107285 is directed to mitochondrial enhancement of cells. Certain embodiments include, but are not limited to, methods of modifying stem cells, or methods of administering modified stem cells to at least one biological tissue.

WO 2016/135723 relates to human bone-marrow cells enriched by at least 50% with functional mitochondria, methods for their production, and therapeutic methods utilizing such cells.

There remains a need in the art for novel methods to increase mitochondrial function in cells and organs affected by various primary mitochondrial diseases and disorders.

SUMMARY OF THE INVENTION

Mitochondrial augmentation therapy has for the first time been used to improve the deficits in various physiological parameters in children suffering from severe effects caused by defective mitochondria. While the positive effects of mitochondrial augmentation therapy have been postulated to be capable of restoring the function of defective mitochondria it was never successfully implemented in human juvenile patients. Notably, it is now disclosed that even a low level of enrichment with healthy mitochondria can successfully provide highly beneficial long lasting improvement in the patients' health and significant improvement in physiological parameters of various organs and tissues.

Using animal model systems has previously shown that is easy to increase the mitochondrial content of host cells by well over 50% or 100% or more. As exemplified herein below it has now been found that even a modest increase in mitochondria from donor to recipient can achieve the desired clinical outcome.

The present invention provides mammalian stem cells enriched with exogenous functional mitochondria, and methods for treating a variety of primary mitochondrial diseases. In particular, the present invention provides compositions comprising human stem cells which have been enriched with functional mitochondria obtained from healthy donors. The present invention further provides methods for the use of allogeneic or autologous "mitochondrially-enriched" stem cells for treatment of subjects with primary mitochondrial disease.

The provision of stem cells of a subject afflicted with a mitochondrial disease, treated ex-vivo and returned to the same subject, provides great benefits over other methods involving allogeneic cell therapy. For example, the methods provided herein eliminate the need to screen the population and find a donor which is human leukocyte antigen (HLA)-matched with the patient, which is a lengthy and costly process, and not always successful. The methods further advantageously eliminate the need for life-long immunosuppression therapy to prevent rejection of allogeneic cell populations. Thus, the present invention advantageously provides a unique methodology of ex-vivo corrective therapy, in which cells are harvested from the patient's body, treated ex-vivo with exogenous (for example, allogeneic) mitochondria, and returned to the same patient. Moreover, the present invention relates to the administration of stem cells which, empirically are distributed throughout the body in different tissues and organs, and increase the mitochondrial function at these sites.

The present invention is based, in part, on the surprising findings that treatment of juveniles afflicted with primary mitochondrial diseases with mitochondrially-enriched stem cells increases the mitochondrial function and content in target tissues and organs, and ameliorates a wide variety of adverse conditions and symptoms associated with mitochondrial dysfunction.

It has further been found unexpectedly that enriched human stem cells are effective in treating various diseases and symptoms in human patients, as exemplified for the first time herein, even when the mitochondrial content of these cells was only moderately elevated following mitochondrial enrichment. While WO 2016/135723, to some of the present inventors, relates to mitochondrial enrichment of bone marrow cells by at least 50%, it has been surprisingly found that mitochondrial enrichment of human stem cells by about 5% to about 45% is sufficient to provide long lasting, significant improvements in many clinical parameters in human patients.

The compositions and methods provided by the present invention may be regarded as a form of mitochondrial "enhancement therapy". According to the principles of the present invention, either a low number of functional mitochondria and/or decreased functionality of mitochondria are mitigated by the addition of stem cells enriched with wild-type, healthy, functional mitochondria. Fusion or entry of stem cells enriched with intact functional mitochondria into tissues and organs of patients provides both an increase in mitochondria copy number per cell/tissue/organ and an increase in mitochondrial function. Moreover, according to the principles of the present invention, cells exhibiting low level of mitochondrial function, may be replaced by the addition of stem cells enriched with functional mitochondria. It is hypothesized that the enriched stem cells may differentiate into the same type of cells that had impaired or low-function, thereby ameliorating the dysfunction or restoring the function.

The present invention provides, in one aspect, a method of treating a primary mitochondrial disease, disorder or a symptom thereof in a human patient in need of such treatment, the method comprising the step of administering parenterally a pharmaceutical composition to the patient, the pharmaceutical composition comprising at least about $5 \times 10^5$ to $5 \times 10^9$ of human stem cells, wherein the human stem cells are enriched with frozen-thawed healthy functional human exogenous mitochondria without a pathogenic mutation in mitochondrial DNA, and wherein the healthy functional exogenous mitochondria constitute at least 3% and less than 33% of the total mitochondria in the mitochondrially-enriched human stem cell.

In another aspect, the present invention provides a pharmaceutical composition for use in treating a primary mitochondrial disease, disorder or a symptom thereof in a human patient in need of such treatment, the composition comprising at least $10^5$ to $2 \times 10^7$ human stem cells per kilogram bodyweight of the patient, in a pharmaceutically acceptable liquid medium capable of supporting the viability of the cells, wherein the human stem cells are enriched with frozen-thawed healthy functional human exogenous mitochondria without a pathogenic mutation in mitochondrial DNA, wherein the healthy functional human exogenous mitochondria constitute at least 3% and less than 33% of the total mitochondria in the mitochondrially-enriched human stem cells.

In some embodiments, the enrichment comprises introducing into the stem cells a dose of mitochondria of at least 0.088 up to 176 milliunits of CS activity per million cells.

In further embodiments, the enrichment comprises contacting the stem cells with a dose of mitochondria of 0.88 up to 17.6 milliunits of CS activity per million cells. In some embodiments, the dose of isolated mitochondria is added to the recipient cells at the desired concentration. The ratio of the number of mitochondria donor cells versus the number of mitochondria recipient cells is a ratio above 2:1 (donor cells vs. recipient cells). In typical embodiments, the ratio is at least 5, alternatively at least 10 or higher. In specific embodiments, the ratio of donor cells from which mitochondria are collected to recipient cells is at least 20, 50, 100 or possibly even higher. Each possibility is a separate embodiment.

In certain embodiments, the human stem cells are CD34+.

In certain embodiments, the healthy functional human exogenous mitochondria are allogeneic mitochondria. In other embodiments, the healthy functional human exogenous mitochondria are syngeneic.

In certain embodiments, the primary mitochondrial disease or disorder is associated with a mutation in mitochondrial DNA. In certain embodiments, the primary mitochondrial disease or disorder associated with a mutation in mitochondrial DNA is selected from the group consisting of Pearson syndrome (PS); Kearns-Sayre syndrome (KSS); a Mitochondrial encephalopathy, lactic acidosis, and stroke-like episodes (MELAS) syndrome; Leber's hereditary optic neuropathy (LHON); Neuropathy, ataxia, and retinitis pigmentosa (NARP) syndrome; myoclonic epilepsy with ragged red fibers (MERRF) syndrome; maternally inherited diabetes and deafness (MIDD); Alpers-like syndrome; Chronic progressive external ophthalmoplegia (CPEO); mitochondrial DNA-associated forms of Congenital lactic acidosis (CLA); Mitochondrial DNA depletion Syndrome (MDDS); and mitochondrial DNA-associated forms of Leigh syndrome. Each possibility represents a separate embodiment of the present invention.

In certain embodiments, the primary mitochondrial disease or disorder is associated with a mutation in nuclear DNA that encodes a gene product that is necessary to mitochondrial function. In certain embodiments, the primary mitochondrial disease or disorder associated with a mutation in nuclear DNA is selected from the group consisting of Mitochondrial neurogastrointestinal encephalopathy (MNGIE) syndrome; Alpers syndrome; Friedreich's ataxia (FA); progressive external ophthalmoplegia (PEO); Sideroblastic anemia; an ataxia neuropathy syndrome (ANS); a Mendelian neurodegenerative mitochondriopathy; 3-methylglutaconic aciduria (MEG) deafness (D), encephalopathy (E) and Leigh-like disease (L) syndrome (MEGDEL); Sengers syndrome; Minimal change nephrotic syndrome (MCNS); nuclear DNA-associated forms of Congenital lactic acidosis (CLA); Mitochondrial DNA depletion Syndrome (MDDS); and nuclear DNA-associated forms of Leigh syndrome. Each possibility represents a separate embodiment of the present invention.

In certain embodiments, the primary mitochondrial disease or disorder is associated with an organ selected from the group consisting of kidney, liver, brain, muscle, pancreas, eye and any combination thereof. Each possibility represents a separate embodiment of the present invention.

In certain embodiments, the symptom of impaired mitochondrial function is selected from the group consisting of impaired walking capability, impaired motor skills, impaired language skills, impaired memory, impaired weight gain, failure to thrive, low blood alkaline phosphatase levels, low blood magnesium levels, high blood creatinine levels, low blood bicarbonate levels, low blood base excess levels, high urine glucose/creatinine ratios, high urine chloride/creatinine ratios, high urine sodium/creatinine ratios, high blood lactate levels, high urine magnesium/creatinine ratios, high urine potassium/creatinine ratios, high urine calcium/creatinine ratios, glucosuria, magnesuria, high blood urea levels, low C-Peptide level, high HbA1C score, hypoparathyroidism, ptosis, hearing loss, cardiac conduction disorder, epileptic seizures, Stroke-like episodes, impaired EEG, high blood AST/ALT, low ATP content and low oxygen consumption in lymphocytes. Each possibility represents a separate embodiment of the present invention.

In certain embodiments, the pharmaceutical composition is administered to a specific tissue or organ.

In certain embodiments, the pharmaceutical composition is administered by systemic administration. In certain embodiments, the pharmaceutical composition comprises about $10^6$ mitochondrially-enriched human stem cells per kilogram body weight of the patient. In certain embodiments, the pharmaceutical composition comprises about total of $5 \times 10^5$ to $5 \times 10^9$ mitochondrially-enriched human stem cells.

In certain embodiments, the mitochondrially-enriched human stem cells have at least one of: (i) an increased mitochondrial DNA content; (ii) an increased level of CS activity; (iii) an increased content of at least one mitochondrial protein selected from SDHA and COX1; (iv) an increased rate of $O_2$ consumption; (v) an increased rate of ATP production; or (vi) any combination thereof, relative to the corresponding level in the stem cells prior to mitochondrial enrichment. Each possibility represents a separate embodiment of the present invention.

In certain embodiments, the human stem cells are obtained or derived from the patient before enrichment with the exogenous mitochondria. In certain embodiments, the human stem cells are obtained or derived from a donor different than the patient before enrichment with the exogenous mitochondria.

In certain embodiments, the donor of the stem cells is at least partly HLA-matched with the patient.

In certain embodiments, the mitochondrially-enriched human stem cells are mitochondrially-enriched human progenitor cells. In certain embodiments, the mitochondrially-enriched human stem cells are hematopoietic stem cells. In certain embodiments, the mitochondrially-enriched human stem cells are mesenchymal stem cells. In certain embodiments, the mitochondrially-enriched human stem cells are pluripotent stem cells (PSCs) or induced pluripotent stem cells (iPSCs).

In certain embodiments, the human stem cells have undergone at least one freeze-thaw cycle prior to introducing the frozen-thawed healthy functional human exogenous mitochondria into said human stem cells. In certain embodiments, the method comprises (a) freezing the human stem cells, (b) thawing the human stem cells, and (c) introducing frozen-thawed healthy functional exogenous mitochondria into the human stem cells.

In certain embodiments, the human stem cells are isolated, derived or obtained from cells of the bone marrow. In other embodiments the human stem cells are isolated, derived or obtained from adipose tissue, oral mucosa, skin fibroblasts, blood or umbilical cord blood. Each possibility represents a separate embodiment of the present invention.

In certain embodiments, the healthy functional exogenous mitochondria are isolated or obtained from placenta, placental cells grown in culture or blood cells. Each possibility represents a separate embodiment of the present invention. In certain embodiments, the healthy functional exogenous mitochondria are isolated or obtained from human placenta, human placental cells grown in culture or human blood cells. Each possibility represents a separate embodiment of the present invention.

In certain embodiments, the human stem cells have undergone at least one freeze-thaw cycle after enrichment with the healthy functional human exogenous mitochondria. In certain embodiments, the method described above further comprises the additional steps of (a) freezing the human stem cells enriched with healthy functional exogenous mitochondria, and (b) thawing the human stem cells enriched with healthy functional exogenous mitochondria, prior to administering the human stem cells enriched with healthy functional exogenous mitochondria to the patient.

In certain embodiments, the healthy functional exogenous mitochondria constitute between 5% and 30% of the total mitochondria. In certain embodiments, the healthy functional exogenous mitochondria constitute at least 10% and less than 30% of the total mitochondria. In certain embodiments, the healthy functional exogenous mitochondria constitute at least 10% and less than 25% of the total mitochondria.

The present invention further provides, in another aspect, an ex-vivo method for enriching human stem cells with healthy functional human exogenous mitochondria, the method comprising the steps of: (i) providing a first composition, comprising a plurality of isolated or partially purified human stem cells from a patient afflicted with a mitochondrial disease, disorder or a symptom thereof, or from a suitable donor, (ii) providing a second composition, comprising a plurality of isolated frozen-thawed healthy functional human exogenous mitochondria obtained from a donor without a pathogenic mutation in mitochondrial DNA; (iii) contacting the human stem cells of the first composition with the frozen-thawed healthy functional human exogenous mitochondria of the second composition, at a ratio of 0.088-176 mU CS activity per $10^6$ stem cells, thus providing a third composition; and (iv) incubating the third composition under conditions allowing the frozen-thawed healthy functional human exogenous mitochondria to enter the human stem cells thereby enriching said human stem cells with said healthy functional exogenous mitochondria, thus providing a fourth composition comprising mitochondrially-enriched human stem cells; wherein the total mitochondria of the fourth composition comprise at least 3% and less than 33% of the healthy functional human exogenous mitochondria.

In some embodiments, the conditions allowing the healthy functional human exogenous mitochondria to enter the human stem cells comprise incubating the human stem cells with said healthy functional exogenous mitochondria for a time ranging from 0.5 to 30 hours, at a temperature ranging from 16 to 37° C. In some embodiments, the conditions allowing the healthy functional human exogenous mitochondria to enter the human stem cells comprise incubating the human stem cells with said healthy functional exogenous mitochondria for a time ranging from 0.5 to 30 hours, at a temperature ranging from 16 to 37° C., in a culture medium under an environment supporting cell survival. According to some embodiments the culture medium is saline containing human serum albumin. In some embodiments the conditions for incubation include an atmosphere containing 5% $CO_2$. In some embodiments the conditions for incubation do not include added $CO_2$ above the level found in air.

In some embodiments, the method further comprises centrifugation of the human stem cells and the healthy functional exogenous mitochondria before, during or after incubation. In some embodiments, prior to incubation the method further comprises a single centrifugation of the human stem cells and the healthy functional exogenous mitochondria at a centrifugation force above 2500×g.

In some embodiments, the mitochondria that have undergone a freeze-thaw cycle demonstrate a comparable oxygen consumption rate following thawing, as compared to control mitochondria that have not undergone a freeze-thaw cycle.

In certain embodiments, the method described above further comprises freezing, and optionally further comprising thawing, the mitochondrially-enriched human stem cells.

In additional embodiments, the human stem cells are expanded before or after mitochondrial augmentation.

In some aspects and embodiments, the present invention provides a composition comprising a plurality of human stem cells enriched with healthy functional exogenous mitochondria obtained by the method described above in various embodiments thereof, wherein the healthy functional exogenous mitochondria constitute at least 3% and less than 33% of the total mitochondria in the mitochondrially-enriched human stem cells.

The present invention further provides, in another aspect, a method of treating a primary mitochondrial disease or disorder or a symptom thereof in a human patient in need of such treatment, comprising the step of administering a pharmaceutical composition comprising the mitochondrially-enriched human stem cells described above to the patient.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Further limitations and disadvantages of conventional and traditional approaches will become apparent to one of skill in the art, by comparison of such systems with some aspects of the present invention as set forth in the remainder of the present application with reference to the drawings.

BRIEF DESCRIPTION OF THE DRAWINGS

FIG. 9A is a scheme of the different stages of treatment of a Pearson Syndrome (PS) patient, as provided by the present invention.

FIG. 9L is a line graph illustrating the level of base excess of a PS patient treated by the methods provided in the present invention as a function of time before and after therapy.

FIG. 12A is yet another scheme of the different stages of treatment of a Pearson Syndrome (PS) patient and of a Kearns-Sayre syndrome (KSS) patient, as further provided by the present invention.

DETAILED DESCRIPTION OF THE INVENTION

Figure 1:
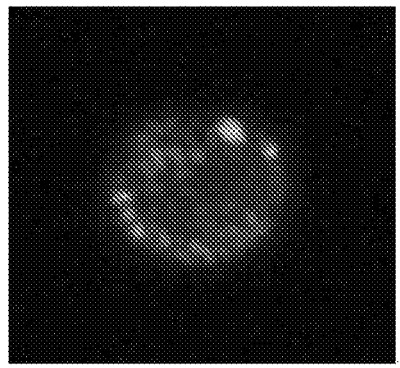
FIG. 1 shows micrographs obtained by fluorescence confocal microscopy $CD34^+$ cells incubated with GFP-labeled mitochondria isolated from HeLa-TurboGFP-Mitochondria cells.
Figure 1:
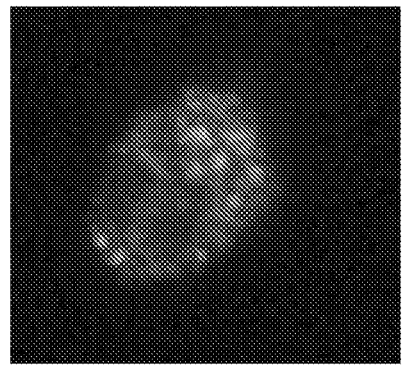
Figure 1:
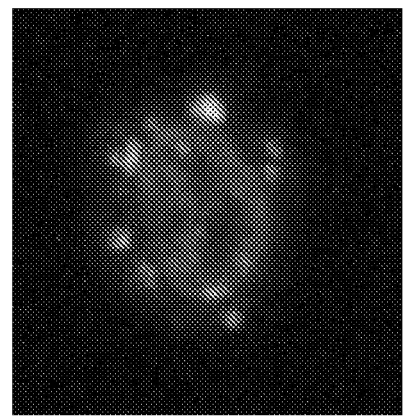

The present invention provides cellular platforms, more specifically stem cell platforms, for targeted and/or systemic delivery of therapeutically-significant amounts of exogenous functional, healthy mitochondria. The present invention further provides methods for producing such cellular platforms, and methods for their utilization in treating mitochondrial diseases.

It has now been shown for the first time that human stem cells enriched even moderately with healthy functional exogenous mitochondria can achieve in-vivo systemic delivery of healthy functional mitochondria to organs, tissues and cells in patients suffering from mitochondrial diseases and disorders of diversified pathologies.

The provision of stem cells moderately enriched with functional mitochondria enables improved therapies of primary mitochondrial diseases in humans, which were not available thus far. For example, primary mitochondrial diseases associated with mutations in mitochondrial DNA, such as Pearson syndrome (PS) and Kearns-Sayre syndrome (KSS) can now be treated by transplanting stem cells only moderately enriched with functional mitochondria into disease-affected tissues or organs, leading to long-term annulment of the disease. In cases where the disease-affected cells are stem cells themselves, the administered enriched stem cells may replace the affected cells, again leading to long-term annulment of the disease. In other examples, where the primary mitochondrial disease is associated with a mutation in nuclear DNA and the affected cells are stem cells or are derived from stem cells, the administered stem cells can replace the affected cells, again leading to long-term annulment of the disease. It should be emphasized that the present invention provides, for the first time, stem cell-based means and methods for the sustained correction of pathological states of primary mitochondrial diseases in humans, and long term annulment of these diseases, necessitating only low to moderate mitochondrial enrichment of these cells prior to administration.

The present invention is further based on several surprising findings, amongst which are that a single administration of mitochondrially-enriched human stem cells was sufficient to improve the overall physiological and cognitive state of human patients, including the functions of organs such as the kidney, liver, brain, muscles and pancreas, as determined by the results of various clinical parameters, for at least a year, without a need for repeated interventions. Although a single round of therapy was sufficient to obtain a long-term effect in a variety of organs and symptoms, the possibility remains that further rounds of treatment are needed to maintain at least part of these effects.

The present invention provides, in one aspect, a method of treating a primary mitochondrial disease, disorder or a symptom thereof in a subject in need of such treatment, the method comprising the step of administering a pharmaceutical composition comprising a plurality of stem cells to the patient, wherein the stem cells are enriched with healthy functional exogenous mitochondria without a pathogenic mutation in mitochondrial DNA. In some embodiments, the subject is a mammalian subject and the stem cells are mammalian stem cells. In certain embodiments, the subject is a human subject and the stem cells are human stem cells.

In another aspect, the present invention provides a pharmaceutical composition for use in treating a primary mitochondrial disease, disorder or a symptom thereof in a human patient in need of such treatment, the composition comprising a plurality of human stem cells enriched with frozen-thawed healthy functional exogenous mitochondria without a pathogenic mutation in mitochondrial DNA, wherein the healthy functional exogenous mitochondria constitute at least 3% and less than 33% of the total mitochondria in the mitochondrially-enriched human stem cell.

In some embodiments, the pharmaceutical composition comprises at least $10^5$ to $4\times10^7$ mitochondrially-enriched human stem cells per kilogram bodyweight of the patient. In some embodiments, the pharmaceutical composition comprises at least $10^5$ to $2\times10^7$ mitochondrially-enriched human stem cells per kilogram bodyweight of the patient. In some embodiments, the pharmaceutical composition comprises at least $5\times10^5$ to $1.5\times10^7$ mitochondrially-enriched human stem cells per kilogram bodyweight of the patient. In some embodiments, the pharmaceutical composition comprises at least $10^6$ to $10^7$ mitochondrially-enriched human stem cells per kilogram bodyweight of the patient. In other embodiments, the pharmaceutical composition comprises at least $10^5$ or at least $10^6$ mitochondrially-enriched human stem cells per kilogram bodyweight of the patient. Each possibility represents a separate embodiment of the present invention. In some embodiments, the pharmaceutical composition comprises a total of at least $5\times10^5$ up to $5\times10^9$ mitochondrially-enriched human stem cells. In some embodiments, the pharmaceutical composition comprises a total of at least $10^6$ up to $10^9$ mitochondrially-enriched human stem cells. In other embodiments, the pharmaceutical composition comprises a total of at least $2\times10^6$ up to $5\times10^8$ mitochondrially-enriched human stem cells.

In another aspect, the present invention provides a composition comprising a plurality of human CD34$^+$ stem cells enriched with healthy functional exogenous mitochondria, wherein the healthy functional exogenous mitochondria constitute at least 3% and less than 33% of the total mitochondria in the mitochondrially-enriched human CD34$^+$ stem cells.

In yet another aspect, the present invention provides a pharmaceutical composition for use in treating a primary mitochondrial disease or disorder or a symptom thereof, wherein the pharmaceutical composition comprises a plurality of human CD34$^+$ stem cells enriched with healthy functional exogenous mitochondria, wherein the healthy functional exogenous mitochondria constitute at least 3% and less than 33% of the total mitochondria in the mitochondrially-enriched human CD34$^+$ stem cells. The term "method" as used herein generally refers to manners, means, techniques and procedures for accomplishing a given task, including, but not limited to, those manners, means, techniques and procedures either known to, or readily developed from known manners, means, techniques and procedures by practitioners of the chemical, pharmacological, biological, biochemical and medical arts.

The term "treating" as used herein includes the diminishment, alleviation, or amelioration of at least one symptom associated or induced by a disease or condition. The term "treating" as used herein also includes preventative (e.g., prophylactic), palliative and curative treatment.

The term "pharmaceutical composition" as used herein refers to any composition comprising at least one biologically active agent. As used herein, the term "pharmaceutical composition" further refers to a composition comprising an active pharmaceutical ingredient to be delivered to a subject, for example, for therapeutic, prophylactic, diagnostic, preventative or prognostic effect. The term "pharmaceutical composition" as used herein further refers to any composition comprising human stem cells, optionally further comprising a medium or carrier in which the cells are maintained in a viable state. In certain embodiments, the pharmaceutical composition comprises the active pharmaceutical ingredient and a pharmaceutically acceptable carrier. As used herein, the term "pharmaceutically acceptable carrier" includes any and all solvents, dispersion media, coatings, anti-bacterial and anti-fungal agents, isotonic and absorption delaying agents, and the like that are physiologically compatible. Examples of pharmaceutically acceptable carriers include one or more of water, saline, phosphate buffered saline, dextrose, glycerol, ethanol and the like, as well as combinations thereof.

The term "biologically active agent" as used herein refers to any molecule capable of eliciting a response in a biological system such as, for example, living cell(s), tissue(s), organ(s), and being(s). Non-limiting examples of biologically active agents according to the present inventions include cells, intact mitochondria, mitochondrial DNA, and a mitochondrial protein. According to the principles of the present invention, a plurality of human stem cells enriched with healthy functional exogenous mitochondria without a pathogenic mutation in mitochondrial DNA is a biologically active agent.

The term "stem cells" as used herein generally refers to any type of stem cells. Stem cells are undifferentiated cells that can differentiate into other types of cells and can divide to produce more of the same type of stem cells. Stem cells can be either totipotent or pluripotent. The term "human stem cells" as used herein generally refers to all stem cells naturally found in humans, and to all stem cells produced or derived ex-vivo and are compatible with humans. A "progenitor cell", like a stem cell, has a tendency to differentiate into a specific type of cell, but is already more specific than a stem cell and is pushed to differentiate into its "target" cell. The most important difference between stem cells and progenitor cells is that stem cells can replicate indefinitely, whereas progenitor cells can divide only a limited number of times. The term "human stem cells" as used herein further includes "progenitor cells" and "non-fully-differentiated stem cells".

According to the principles of the present invention, stem cells are enriched with healthy functional exogenous mitochondria prior to being administered to a patient in need in order to increase the number and/or function of mitochondria in them. Without being limited to any theory or mechanism, the increased number and/or function of mitochondria in the administered stem cells is responsible for the various therapeutic effects exemplified herein for the first time in human patients.

The terms "functional mitochondria", "healthy mitochondria", "healthy functional mitochondria" and "healthy functional exogenous mitochondria" are used interchangeably herein and refer to mitochondria without a pathogenic mutation in mitochondrial DNA, that display normal, non-pathologic levels of activity. The activity of mitochondria can be measured by a variety of methods well known in the art, such as Tetramethylrhodamine Ethyl Ester Perchlorate (TMRE) staining, $O_2$ consumption, ATP production, and CS activity level.

In embodiments as exemplified hereinbelow, the mitochondria are human mitochondria.

The term "healthy donor" and "healthy subject" are used interchangeably, and refer to a subject not suffering from the disease or condition which is being treated.

In certain embodiments, the healthy functional exogenous mitochondria are syngeneic or allogeneic.

The term "enriching" as used herein refers to any action performed ex-vivo, which increases the mitochondrial content, e.g. the number of intact, functional, healthy, mitochondria, of a human cell. According to the principles of the present invention, healthy functional exogenous mitochondria are introduced into human stem cells, thus enriching these cells with healthy functional exogenous mitochondria. It should be understood that such enrichment changes the mitochondrial content of the human stem cells: while naïve human stem cells substantially have one population of host/autologous/endogenous mitochondria, human stem cells enriched with exogenous mitochondria substantially have two populations of mitochondria-one population of host/autologous/endogenous mitochondria and another population of the introduced mitochondria (i.e., the exogenous mitochondria). Thus, the term "enriched" relates to the state of the cells after receiving/incorporation of exogenous mitochondria. Determining the number and/or ratio between the two populations of mitochondria is straightforward, as the two populations differ in several aspects e.g. in their mitochondrial DNA. Therefore, the phrase "human stem cells enriched with healthy functional human mitochondria" is equivalent to the phrase "human stem cells comprising endogenous mitochondria and healthy functional exogenous mitochondria". For example, human stem cells which comprise at least 1% and less than 33% healthy functional exogenous mitochondria of the total mitochondria, are considered comprising host/autologous/endogenous mitochondria and healthy functional exogenous mitochondria in a ratio of 99:1 to a ratio 67:33. For example, "3% of the total mitochondria" means that after enrichment the original (endogenous) mitochondrial content is 97% of the total mitochondria and the introduced (exogenous) mitochondria is 3% of the total mitochondria—this is equivalent to (3/97=) 3.1% enrichment. Another example—"33% of the total mitochondria" means that after enrichment, the original (endogenous) mitochondrial content is 67% of the total mitochondria and the introduced (exogenous) mitochondria is 33% of the total mitochondria—this is equivalent to (33/67=) 49.2% enrichment.

In certain embodiments, the healthy functional exogenous mitochondria constitute at least 1% and less than 33% of the total mitochondria in the stem cells. In certain embodiments, the healthy functional exogenous mitochondria constitute between about 1%, 3%, 5%, 7%, 10%, 15% or 20% and about 25%, 27%, 29% or 31% of the total mitochondria. Each possibility represents a separate embodiment of the present invention. The term "about" as used herein means 10% above or below a given number. For example, about 10% means 9%, 9% to 11%, or 11%. Typically, the numerical values as used herein refer to +10% of the indicated numerical value.

In certain embodiments, the healthy functional exogenous mitochondria constitute at least 1% of the total mitochondria of the stem cells, wherein the stem cells are not bone marrow cells or cells derived or obtained therefrom. In certain embodiments, the healthy functional exogenous mitochondria constitute between about 1% to about 99%, and any subranges thereof, of the total mitochondria of the stem cells, wherein the stem cells are not bone marrow cells or cells derived or obtained therefrom. In certain embodiments, the healthy functional exogenous mitochondria constitute at least about 1%, 3%, 5%, 7%, 10%, 15%, 20%, 25%, 30%, 35%, 40%, 45%, 55%, 60%, 65%, 70%, 75%, 80%, 85%, 90%, 95%, or 99% of the total mitochondria of the stem cells, wherein the stem cells are not bone marrow cells or cells derived or obtained therefrom. Each possibility represents a separate embodiment of the present invention.

The extent of enrichment of the stem cells with functional mitochondria may be determined by functional and/or enzymatic assays, including but not limited to rate of oxygen ($O_2$) consumption, content or activity level of citrate synthase, rate of adenosine triphosphate (ATP) production. In the alternative the enrichment of the stem cells with healthy donor mitochondria may be confirmed by the detection of mitochondrial DNA of the donor. According to some embodiments, the extent of enrichment of the stem cells with functional mitochondria may be determined by the level of change in heteroplasmy and/or by the copy number of mtDNA per cell. Each possibility represents a separate embodiment of the present invention.

TMRM (tetramethylrhodamine methyl ester) or the related TMRE (tetramethylrhodamine ethyl ester) are cell-permeant fluorogenic dyes commonly used to assess mitochondrial function in living cells, by identifying changes in mitochondrial membrane potential. According to some embodiments, the level of enrichment can be determined by staining with TMRE or TMRM. According to certain embodiments, the enrichment of the stem cells with healthy functional mitochondria may be determined by conventional assays that are recognized in the art. In certain embodiments, the level of mitochondrial enrichment in the mitochondrially-enriched human stem cells is determined by (i) the levels of host/endogenous mitochondrial DNA and exogenous mitochondrial DNA; (ii) the level of mitochondrial proteins selected from the group consisting of citrate synthase (CS), COX1, SDHA and any combination thereof; (iii) the level of CS activity; or (iv) any combination of (i), (ii) and (iii). Each possibility represents a separate embodiment of the invention. In certain embodiments, the level of mitochondrial enrichment in the mitochondrially-enriched human stem cells is determined by at least one of: (i) the levels of host (endogenous) defective mitochondrial DNA and healthy exogenous mitochondrial DNA in case of allogeneic mitochondria; (ii) the level of citrate synthase activity; (iii) the level of succinate dehydrogenase complex flavoprotein subunit A (SDHA) or cytochrome C oxidase (COX1) protein; (iv) the rate of oxygen ($O_2$) consumption; (v) the rate of adenosine triphosphate (ATP) production or (vi) any combination thereof. Each possibility represents a separate embodiment of the invention.

It should be understood that the phrase "human stem cells enriched with healthy functional exogenous mitochondria" as used herein refers to human stem cells comprising healthy functional mitochondria, wherein the healthy functional mitochondria are of a different origin than the human stem cells, i.e. these mitochondria are obtained/derived/isolated from an exogenous source. The presence of "exogenous", "foreign" or "non-original" healthy functional mitochondria within human stem cells serves as evidence that these cells are enriched with said mitochondria. A person of average skill in the art would know how to determine that human stem cells comprise exogenous mitochondria from different origins based on well-known methods in the art (see e.g. Zander J. et al., Forensic Sci. Int. Genet., 2017, Vol. 29, pages 242-249). Such methods can be based e.g. on genetic differences between different mitochondria populations within a human stem cell or within a plurality of human stem cells. For example, in humans, the mitochondrial DNA encodes 37 genes (Nature. 290 (5806): 457-65), thus by sequencing the mtDNA one can easily determine the existence of 1, 2 or more different populations of mtDNA in a human stem cell or in a plurality of human stem cells. In certain embodiments, the level of mitochondrial enrichment in the mitochondrially-enriched human stem cells is determined by sequencing at least a statistically-representative portion of total mitochondrial DNA in the cells and determining the relative levels of host/endogenous mitochondrial DNA and exogenous mitochondrial DNA. In certain embodiments, the level of mitochondrial enrichment in the mitochondrially-enriched human stem cells is determined by single nucleotide polymorphism (SNP) analysis. In certain embodiments, the largest mitochondrial population and/or the largest mitochondrial DNA population is the host/endogenous mitochondrial population and/or the host/endogenous mitochondrial DNA population; and/or the second-largest mitochondrial population and/or the second-largest mitochondrial DNA population is the exogenous mitochondrial population and/or the exogenous mitochondrial DNA population. Each possibility represents a separate embodiment of the invention.

In some embodiments, enrichment of the stem cells with healthy functional human exogenous mitochondria comprises washing the mitochondrially-enriched stem cells after incubation of the human stem cells with said healthy functional human exogenous mitochondria. This step provides a composition of the mitochondrially-enriched stem cells substantially devoid of cell debris or mitochondrial membrane remnants and mitochondria that did not enter the stem cells. In some embodiments, washing comprises centrifugation of the mitochondrially-enriched stem cells after incubation of the human stem cells with said healthy functional human exogenous mitochondria. According to some embodiments, the pharmaceutical composition comprising the mitochondrially-enriched human stem cells is separated from free mitochondria, i.e., mitochondria that did not enter the stem cells, or other cell debris. According to some embodiments, the pharmaceutical composition comprising the mitochondrially-enriched human stem cells does not comprise a detectable amount of free mitochondria.

As used herein and in the claims, the term "mitochondrial disease" and the term "primary mitochondrial disease" may be used interchangeably. The term "primary mitochondrial disease" as used herein refers to a mitochondrial disease which is diagnosed by a known or indisputably pathogenic mutation in the mitochondrial DNA, or by mutations in genes of the nuclear DNA, whose gene products are imported into the mitochondria. According to some embodiments, the primary mitochondrial disease is a congenital disease. According to some embodiments, the primary mitochondrial disease is not a secondary mitochondrial dysfunction. The terms "secondary mitochondrial dysfunction" and "acquired mitochondrial dysfunction" are used interchangeably throughout the application.

According to some embodiments, the primary mitochondrial disease is characterized by sub-normal mitochondrial parameters in the affected cells. According to some embodiments, the affected cells have (i) a sub-normal rate of oxygen (O2) consumption; (ii) a sub-normal content or activity level of citrate synthase; (iii) a sub-normal rate of adenosine triphosphate (ATP) production; or (iv) any combination of (i), (ii) and (iii).

The term "sub-normal rate of oxygen ($O_2$) consumption" as used herein refers to a rate of oxygen ($O_2$) consumption which is substantially lower than a control rate of oxygen ($O_2$) consumption which is derived from or corresponds to the rate of oxygen ($O_2$) consumption found in corresponding cells or corresponding mitochondria of a subject or of a plurality of subjects not afflicted with a mitochondrial disease.

The term "sub-normal content or activity level of citrate synthase" as used herein refers to a content or activity level of citrate synthase which is substantially lower than a control content value or activity level of citrate synthase which is derived from or corresponds to the content or activity level of citrate synthase of a subject or of a plurality of subjects not afflicted with a mitochondrial disease.

The term "sub-normal rate of adenosine triphosphate (ATP) production" as used herein refers to a rate of adenosine triphosphate (ATP) production which is substantially lower than a control rate of adenosine triphosphate (ATP) production which is derived from or corresponds to the rate of adenosine triphosphate (ATP) production found in corresponding cells or corresponding mitochondria of a subject or of a plurality of subjects not afflicted with a mitochondrial disease.

In certain embodiments, the term "substantially lower" as used herein refers to a statistically-significant decrease below the normal values. In certain embodiments, the term "substantially lower" as used herein refers to a pathological decrease, i.e. to a level in which at least one pathological symptom associated with the substantially lower value becomes apparent.

In certain embodiments, the term "sub-normal" as used herein refers to a value which is at least 2 fold, at least 3 fold, at least 4 fold, at least 5 fold, at least 6 fold, at least 7 fold, at least 8 fold, at least 9 fold, or at least 10 fold lower than the corresponding value found in corresponding cells or corresponding mitochondria of a subject or of a plurality of subjects not afflicted with a mitochondrial disease. Each possibility represents a separate embodiment of the invention.

In certain embodiments, the primary mitochondrial disease or disorder is associated with a mutation in mitochondrial DNA. The phrase "associated with a mutation in mitochondrial DNA" as used herein generally means that the etiology of the mitochondrial disease or disorder, at least in part, is operably linked to a mutation, or to a group of mutations, in a coding region in mitochondrial DNA, coding for a mitochondrial molecule.

In certain embodiments, the mitochondrial disease or disorder associated with a mutation in mitochondrial DNA is selected from the group consisting of Pearson syndrome (PS); Kearns-Sayre syndrome (KSS); a Mitochondrial encephalopathy lactic acidosis and stroke-like episodes (MELAS) syndrome; Leber's hereditary optic neuropathy (LHON); Neuropathy, ataxia, and retinitis pigmentosa (NARP) syndrome; myoclonic epilepsy with ragged red fibers (MERRF) syndrome; maternally inherited diabetes and deafness (MIDD); Alpers-like syndrome; Chronic progressive external ophthalmoplegia (CPEO); mitochondrial DNA-associated forms of Congenital lactic acidosis (CLA); Mitochondrial DNA depletion Syndrome (MDDS); and mitochondrial DNA-associated forms of Leigh syndrome. Each possibility represents a separate embodiment of the present invention.

In certain embodiments, the primary mitochondrial disease or disorder is associated with a mutation in nuclear DNA. The phrase "associated with a mutation in nuclear DNA" as used herein generally means that the etiology of the mitochondrial disease or disorder, at least in part, is operably linked to a mutation, or to a group of mutations, in a coding region in nuclear DNA, coding for a mitochondrial molecule. The term "mitochondrial molecule" generally refers to any molecule delivered and/or active and/or found in healthy functional mitochondria. Such molecules may be nucleic acids molecules, protein molecules, enzyme molecules, etc. In some embodiments, the primary mitochondrial disease or disorder is associated with a mutation in genes of the nuclear DNA that either encode OXPHOS proteins directly or affect OXPHOS function indirectly by impacting production of the complex machinery needed to run the OXPHOS process.

In certain embodiments, the primary mitochondrial disease or disorder associated with a mutation in nuclear DNA is selected from the group consisting of Mitochondrial neurogastrointestinal encephalopathy (MNGIE) syndrome; Alpers syndrome; Friedreich's ataxia (FA); progressive external ophthalmoplegia (PEO); Sideroblastic anemia; an ataxia neuropathy syndrome (ANS); a Mendelian neurodegenerative mitochondriopathy; 3-methylglutaconic aciduria (MEG), deafness (D), encephalopathy (E), and Leigh-like disease (L) (MEGDEL) syndrome; Sengers syndrome; Minimal change nephrotic syndrome (MCNS); nuclear DNA-associated forms of Congenital lactic acidosis (CLA); Mitochondrial DNA depletion Syndrome (MDDS); and nuclear DNA-associated forms of Leigh syndrome. Each possibility represents a separate embodiment of the present invention.

In certain embodiments, the ANS is selected from the group consisting of mitochondrial recessive ataxia syndrome (MIRAS); spinocerebellar ataxia with epilepsy (SCAE); sensory ataxia neuropathy dysarthria and ophthalmoplegia (SANDO); and myoclonic epilepsy myopathy sensory ataxia (MEMSA). Each possibility represents a separate embodiment of the present invention.

In certain embodiments, the mitochondrial disease or disorder is associated with acquired mitochondrial dysfunction. The phrase "associated with acquired mitochondrial dysfunction" as used herein generally means that the mitochondrial disease or disorder becomes symptomatic at adulthood, is aggravated with time, and/or is not necessarily operably linked to a mutation, or to a group of mutations, in a coding region in mitochondrial or nuclear DNA, coding for a mitochondrial molecule.

In certain embodiments, the mitochondrial disease or disorder associated with acquired mitochondrial dysfunction becomes symptomatic at adulthood. In certain embodiments, the mitochondrial disease or disorder associated with acquired mitochondrial dysfunction is aggravated with time. In certain embodiments, the mitochondrial disease or disorder associated with acquired mitochondrial dysfunction is not operably linked, or is only partly linked, to a mutation, or to a group of mutations, in a coding region in mitochondrial or nuclear DNA, coding for a mitochondrial molecule. In certain embodiments, the patient is an adult. In certain embodiments, the patient is over 20 years in age. In certain embodiments, the patient is over 30, 40, 50, 60 or 70 years in age.

In certain embodiments, the mitochondrial disease or disorder is associated with an organ selected from the group consisting of kidney, liver, brain, muscle, pancreas, eye and any combination thereof. In certain embodiments, the mitochondrial disease or disorder is associated with a kidney. In certain embodiments, the mitochondrial disease or disorder is associated with the liver. In certain embodiments, the mitochondrial disease or disorder is associated with the brain. In certain embodiments, the mitochondrial disease or disorder is associated with a muscle. In certain embodiments, the mitochondrial disease or disorder is associated with the heart. In certain embodiments, the mitochondrial disease or disorder is associated with the pancreas. In certain embodiments, the mitochondrial disease or disorder is associated with an eye.

In certain embodiments, the symptom is selected from the group consisting of impaired walking capability, impaired motor skills, impaired language skills, impaired memory, impaired weight gain, failure to thrive, low blood alkaline phosphatase levels, low blood magnesium levels, high blood creatinine levels, low blood bicarbonate levels, low blood base excess levels, high urine glucose/creatinine ratios, high urine chloride/creatinine ratios, high urine sodium/creatinine ratios, high blood lactate levels, high urine magnesium/creatinine ratios, high urine potassium/creatinine ratios, high urine calcium/creatinine ratios, glucosuria, magnesuria, high blood urea levels, low C-Peptide level, high HbA1C level, hypoparathyroidism, ptosis, hearing loss, cardiac conduction disorder, low ATP content and oxygen consumption in lymphocytes. Each possibility represents a separate embodiment of the present invention. It should be understood that defining symptoms as "high" and "low" correspond to "detectably higher than normal" and "detectably lower than normal", respectively, wherein the normal level is the corresponding level in a plurality of subjects not afflicted with a mitochondrial disease.

In certain embodiments, the pharmaceutical composition is administered to a specific tissue or organ. In certain embodiments, the pharmaceutical composition comprises at least $10^4$ mitochondrially-enriched human stem cells. In certain embodiments, the pharmaceutical composition comprises about $10^4$ to about $10^8$ mitochondrially-enriched human stem cells.

In certain embodiments, the pharmaceutical composition is administered by parenteral administration. In certain embodiments, the pharmaceutical composition is administered by systemic administration. In certain embodiments, the pharmaceutical composition is administered by intravenous injection. In certain embodiments, the pharmaceutical composition is administered by intravenous infusion. In certain embodiments, the pharmaceutical composition comprises at least $10^5$ mitochondrially-enriched human stem cells. In certain embodiments, the pharmaceutical composition comprises about $10^6$ to about $10^8$ mitochondrially-enriched human stem cells. In certain embodiments, the pharmaceutical composition comprises at least about $10^5$-$2*10^7$ mitochondrially-enriched human stem cells per kilogram body weight of the patient. In certain embodiments, the pharmaceutical composition comprises at least about $10^5$ mitochondrially-enriched human stem cells per kilogram body weight of the patient. In certain embodiments, the pharmaceutical composition comprises about $10^5$ to about $2*10^7$ mitochondrially-enriched human stem cells per kilogram body weight of the patient. In certain embodiments, the pharmaceutical composition comprises about $10^6$ to about $5*10^6$ mitochondrially-enriched human stem cells per kilogram body weight of the patient.

In certain embodiments, the human stem cells are obtained or derived from the patient before enrichment. In further embodiments, the human stem cells obtained or derived from the patient before enrichment have (i) a sub-normal rate of oxygen (O2) consumption; (ii) a sub-normal content or activity level of citrate synthase; (iii) a sub-normal rate of adenosine triphosphate (ATP) production; or (iv) any combination of (i), (ii) and (iii).

In certain embodiments, the mitochondrially-enriched human stem cells are obtained or derived from a donor different than the patient before enrichment.

In certain embodiments, the donor is at least partly human leukocyte antigen (HLA)-matched with the patient. In certain embodiments, the method described above further comprises a step of administering to the patient an agent which prevents, delays, minimizes or abolishes an adverse immunogenic reaction between the patient and the mitochondrially-enriched human stem cells. Each possibility represents a separate embodiment of the present invention. In certain embodiments, the adverse immunogenic reaction is a graft-versus-host disease (GvHD).

In certain embodiments, the human stem cells are CD34+. In certain embodiments, the human stem cells are hematopoietic stem cells. In certain embodiments, the human stem cells are mesenchymal stem cells. In certain embodiments, the human stem cells are pluripotent stem cells (PSCs) or induced pluripotent stem cells (iPSCs). As used herein the term "pluripotent stem cells (PSCs)" refers to cells that can propagate indefinitely, as well as give rise to a plurality of cell types in the body. The term "induced pluripotent stem cells (iPSc)" as used herein refers to a type of pluripotent stem cells that can be generated from human adult somatic cells. In some embodiments, the PSCs are non-embryonic stem cells. In specific embodiments it is to be understood explicitly that human embryonic stem cells are explicitly excluded from the scope of the claims. As used herein the term "embryonic stem cells (ESC)" refers to a type of totipotent stem cell derived from the inner cell mass of a blastocyst. Totipotent stem cells are cells that can give rise to every other cell type in the body.

The term "CD34+ cells" as used herein refers to stem cells characterized as being CD34-positive, regardless of their origin. The term further refers to hematopoietic stem cells characterized as being CD34-positive that are obtained from stem cells or mobilized from bone marrow or obtained from umbilical cord blood. As used herein, the term "CD34+ cells" denotes cells that express the surface marker protein CD34. Expression of CD34 can be determined by immunofluorescence analysis or FACS analysis using an antibody directed against CD34.

In certain embodiments, the CD34+ cells are umbilical cord cells. In certain embodiments, the CD34+ cells are bone marrow cells. In certain embodiments, the CD34+ cells are hematopoietic cells. In certain embodiments, the CD34+ cells are mesenchymal stem cells. In certain embodiments, the CD34+ cells are endothelial progenitor cells. In certain embodiments, the CD34+ cells are endothelial cells of blood vessels. In certain embodiments, the CD34+ cells are mast cells. In certain embodiments, the CD34+ cells are a subpopulation dendritic cells (which are factor XIIIa-negative). In certain embodiments, the CD34+ cells are Long-Term Hematopoietic Stem Cells (LT-HSCs). In certain embodiments, the CD34+ cells are human HSCs cells. In certain embodiments, the CD34+ cells are allogeneic to the subject, wherein said CD34+ cells are HLA-matched to the patient. In certain embodiments, the CD34+ cells are HLA-matched with the patient. In certain embodiments, the CD34+ cells are autologous to the patient.

In certain embodiments, the mitochondrially-enriched human stem cells are obtained by introducing frozen-thawed healthy functional exogenous mitochondria into the human stem cells. In certain embodiments, the method described above further comprises the preceding steps of isolating, deriving or obtaining human stem cells, and introducing healthy functional exogenous mitochondria into the human stem cells, thus producing the mitochondrially-enriched human stem cells. In some embodiments, the method described above further comprises the step of selection of CD34 positive cells from the human stem cells prior to introducing the healthy functional exogenous mitochondria into the cells. Selection of CD34 positive cells can be done by methods known in the art including but not limited to the CliniMACS or Prodigy systems (Miltenyi).

In certain embodiments, the human stem cells have undergone at least one freeze-thaw cycle prior to introducing the frozen-thawed healthy functional exogenous mitochondria into said human stem cells. In certain embodiments, the method comprises (a) freezing the human stem cells, (b) thawing the human stem cells, and (c) introducing healthy functional exogenous mitochondria into the human stem cells.

In some embodiments, the method further comprises expanding the stem cells before or after enrichment with the healthy functional exogenous mitochondria. In some embodiments, the method further comprises expanding the stem cells of the first composition by culturing said cells in a culture or proliferation medium capable of expanding stem cells. In other embodiments, the method further comprises expanding the mitochondrially-enriched stem cells of the fourth composition by culturing said cells in a culture or proliferation medium capable of expanding stem cells. As used throughout this application, the term "culture or proliferation medium" is a fluid medium such as cell culture media, cell growth media, buffer which provides sustenance to the cells. As used throughout this application, and in the claims the term "pharmaceutical composition" comprises a fluid carrier such as cell culture media, cell growth media, buffer which provides sustenance to the cells.

According to the principles of the present invention, the possibility to freeze human stem cells before their enrichment with healthy functional exogenous mitochondria is beneficial as it e.g. provides sufficient time to test certain attributes of the human stem cells and/or increases the shelf-life of the human stem cells and/or allows the human stem cells to be easily distributed, before their enrichment with healthy functional exogenous mitochondria.

According to the principles of the present invention, the possibility to freeze human stem cells after their enrichment with healthy functional exogenous mitochondria is beneficial as it e.g. provides sufficient time to test certain attributes of the enriched human stem cells and/or increases the shelf-life of the enriched human stem cells and/or allows the enriched human stem cells to be easily distributed, after their enrichment with healthy functional exogenous mitochondria.

In certain embodiments, the human stem cells are isolated, derived or obtained from cells of the bone marrow, adipose tissue, oral mucosa, skin fibroblasts, blood or umbilical cord blood. Each possibility represents a separate embodiment of the present invention. In certain embodiments, the human stem cells are not isolated, derived or obtained from the bone marrow or from cells of the bone marrow.

In certain embodiments, the method described above further comprises the preceding steps of isolating or obtaining healthy functional exogenous mitochondria from a suitable source, and introducing the healthy functional exogenous mitochondria into human stem cells, thus producing the mitochondrially-enriched human stem cells. In certain embodiments, the method comprises (a) freezing the healthy functional exogenous mitochondria, (b) thawing the healthy functional exogenous mitochondria, and (c) introducing the healthy functional exogenous mitochondria into the human stem cells.

According to the principles of the present invention, the possibility to freeze healthy functional exogenous mitochondria before enriching the human stem cells is crucial for mitochondrial augmentation therapy process as it e.g. provides sufficient time to test functionality and/or certain attributes of the healthy functional exogenous mitochondria, as well as increases the shelf-life of the healthy functional exogenous mitochondria and/or allows the healthy functional exogenous mitochondria to be easily distributed, before enriching the human stem cells.

Without wishing to be bound by any theory or mechanism, mitochondria that have undergone a freeze-thaw cycle demonstrate a comparable oxygen consumption rate following thawing, as compared to control mitochondria that have not undergone a freeze-thaw cycle.

According to some embodiments, the freeze-thaw cycle comprises freezing said functional mitochondria for at least 24 hours prior to thawing. According to other embodiments, the freeze-thaw cycle comprises freezing said functional mitochondria for at least 1 month prior to thawing, several months prior to thawing or longer. Each possibility represents a separate embodiment of the present invention. According to another embodiment, the oxygen consumption of the functional mitochondria after the freeze-thaw cycle is equal or higher than the oxygen consumption of the functional mitochondria prior to the freeze-thaw cycle.

As used herein, the term "freeze-thaw cycle" refers to freezing of the functional mitochondria to a temperature below 0° C., maintaining the mitochondria in a temperature below 0° C. for a defined period of time and thawing the mitochondria to room temperature or body temperature or any temperature above 0° C. which enables treatment of the stem cells with the mitochondria. Each possibility represents a separate embodiment of the present invention. The term "room temperature", as used herein typically refers to a temperature of between 18° C. and 25° C. The term "body temperature", as used herein, refers to a temperature of between 35.5° C. and 37.5° C., preferably 37° C. In another embodiment, mitochondria that have undergone a freeze-thaw cycle are functional mitochondria.

In another embodiment, the mitochondria that have undergone a freeze-thaw cycle were frozen at a temperature of −70° C. or lower. In another embodiment, the mitochondria that have undergone a freeze-thaw cycle were frozen at a temperature of −20° C. or lower. In another embodiment, the mitochondria that have undergone a freeze-thaw cycle were frozen at a temperature of −4° C. or lower. According to another embodiment, freezing of the mitochondria is gradual. According to some embodiment, freezing of mitochondria is through flash-freezing. As used herein, the term "flash-freezing" refers to rapidly freezing the mitochondria by subjecting them to cryogenic temperatures.

In another embodiment, the mitochondria that underwent a freeze-thaw cycle were frozen for at least 30 minutes prior to thawing. According to another embodiment, the freeze-thaw cycle comprises freezing the functional mitochondria for at least 30, 60, 90, 120, 180, 210 minutes prior to thawing. Each possibility represents a separate embodiment of the present invention. In another embodiment, the mitochondria that have undergone a freeze-thaw cycle were frozen for at least 1, 2, 3, 4, 5, 6, 7, 8, 9, 10, 24, 48, 72, 96, or 120 hours prior to thawing. Each freezing time presents a separate embodiment of the present invention. In another embodiment, the mitochondria that have undergone a freeze-thaw cycle were frozen for at least 4, 5, 6, 7, 30, 60, 120, 365 days prior to thawing. Each freezing time presents a separate embodiment of the present invention. According to another embodiment, the freeze-thaw cycle comprises freezing the functional mitochondria for at least 1, 2, 3 weeks prior to thawing. Each possibility represents a separate embodiment of the present invention. According to another embodiment, the freeze-thaw cycle comprises freezing the functional mitochondria for at least 1, 2, 3, 4, 5, 6 months prior to thawing. Each possibility represents a separate embodiment of the present invention.

In another embodiment, the mitochondria that have undergone a freeze-thaw cycle were frozen at −70° C. for at least 30 minutes prior to thawing. Without wishing to be bound by any theory or mechanism, the possibility to freeze mitochondria and thaw them after a long period enables easy storage and use of the mitochondria with reproducible results even after a long period of storage.

According to one embodiment, thawing is at room temperature. In another embodiment, thawing is at body temperature. According to another embodiment, thawing is at a temperature which enables administering the mitochondria according to the methods of the invention. According to another embodiment, thawing is performed gradually.

According to another embodiment, the mitochondria that underwent a freeze-thaw cycle were frozen within a freezing buffer. According to another embodiment, the mitochondria that underwent a freeze-thaw cycle were frozen within the isolation buffer. As used herein, the term "isolation buffer" refers to a buffer in which the mitochondria of the invention have been isolated. In a non-limiting example, the isolation buffer is a sucrose buffer. Without wishing to be bound by any mechanism or theory, freezing mitochondria within the isolation buffer saves time and isolation steps, as there is no need to replace the isolation buffer with a freezing buffer prior to freezing or to replace the freezing buffer upon thawing.

According to another embodiment, the freezing buffer comprises a cryoprotectant. According to some embodiments, the cryoprotectant is a saccharide, an oligosaccharide or a polysaccharide. Each possibility represents a separate embodiment of the present invention. According to another embodiment, the saccharide concentration in the freezing buffer is a sufficient saccharide concentration which acts to preserve mitochondrial function. According to another embodiment, the isolation buffer comprises a saccharide. According to another embodiment, the saccharide concentration in the isolation buffer is a sufficient saccharide concentration which acts to preserve mitochondrial function. According to another embodiment, the saccharide is sucrose.

In certain embodiments, the healthy functional exogenous mitochondria are isolated or obtained from placenta, placental cells grown in culture or blood cells. Each possibility represents a separate embodiment of the present invention.

According to some aspects, the present invention provides a method of treating a primary mitochondrial disease, disorder or a symptom thereof in a human patient in need of such treatment, the method comprising the step of administering a pharmaceutical composition comprising a plurality of human CD34$^+$ stem cells to the patient, wherein the human CD34$^+$ stem cells are enriched with frozen-thawed healthy functional exogenous mitochondria without a pathogenic mutation in mitochondrial DNA, and wherein the healthy functional exogenous mitochondria constitute at least 3% and less than 33% of the total mitochondria in the mitochondrially-enriched human CD34$^+$ stem cells The present invention further provides, in another aspect, an ex-vivo method for enriching human stem cells with healthy functional exogenous mitochondria, the method comprising the steps of: (i) providing a first composition, comprising a plurality of human stem cells from a patient afflicted with a primary mitochondrial disease, disorder or a symptom thereof; (ii) providing a second composition, comprising a plurality of isolated healthy functional exogenous mitochondria obtained from a donor without a pathogenic mutation in mitochondrial DNA; (iii) contacting the human stem cells of the first composition with the healthy functional exogenous mitochondria of the second composition, thus providing a third composition; and (iv) incubating the third composition under conditions allowing the healthy functional exogenous mitochondria to enter the human stem cells thereby enriching said human stem cells with said healthy functional exogenous mitochondria, thus providing a fourth composition comprising mitochondrially-enriched human stem cells; wherein the healthy functional exogenous mitochondria comprise at least 3% and less than 33% of the total mitochondria of the fourth composition.

The term "ex-vivo method" as used herein refers to any method comprising steps performed exclusively outside the human body. In particular, an ex vivo method comprises manipulation of cells outside the body that are subsequently reintroduced or transplanted into the subject to be treated.

The term "contacting" refers to bringing the composition of mitochondria and cells into sufficient proximity to promote entry of the mitochondria into the cells. The term "introducing" mitochondria into the stem cells is used interchangeably with the term contacting.

According to some embodiments, the method for enriching human stem cells with healthy functional exogenous mitochondria does not comprise measuring the membrane potential of the cell.

In some embodiments, the enrichment of the stem cells with healthy functional exogenous mitochondria comprises introducing into the stem cells a dose of mitochondria of at least 0.044 up to 176 milliunits of CS activity per million cells. In some embodiments, the enrichment of the stem cells with healthy functional exogenous mitochondria comprises introducing into the stem cells a dose of mitochondria of at least 0.088 up to 176 milliunits of CS activity per million cells. In other embodiments, the enrichment of the stem cells with healthy functional exogenous mitochondria comprises introducing into the stem cells a dose of mitochondria of at least 0.2 up to 150 milliunits of CS activity per million cells. In other embodiments, the enrichment of the stem cells with healthy functional exogenous mitochondria comprises introducing into the stem cells a dose of mitochondria of at least 0.4 up to 100 milliunits of CS activity per million cells. In some embodiments, the enrichment of the stem cells with healthy functional exogenous mitochondria comprises introducing into the stem cells a dose of mitochondria of at least 0.6 up to 80 milliunits of CS activity per million cells. In some embodiments, the enrichment of the stem cells with healthy functional exogenous mitochondria comprises introducing into the stem cells a dose of mitochondria of at least 0.7 up to 50 milliunits of CS activity per million cells. In some embodiments, the enrichment of the stem cells with healthy functional exogenous mitochondria comprises introducing into the stem cells a dose of mitochondria of at least 0.8 up to 20 milliunits of CS activity per million cells. In some embodiments, the enrichment of the stem cells with healthy functional exogenous mitochondria comprises introducing into the stem cells a dose of mitochondria of at least 0.88 up to 17.6 milliunits of CS activity per million cells. In some embodiments, the enrichment of the stem cells with healthy functional exogenous mitochondria comprises introducing into the stem cells a dose of mitochondria of at least 0.9 up to 15 milliunits of CS activity per million cells.

Mitochondrial dose can be expressed in terms of units of CS activity or mtDNA copy number of other quantifiable measurements of the amount of healthy functional mitochondria as explained herein. A "unit of CS activity" is defined as the amount that enables conversion of one micromole substrate in 1 minute in 1 mL reaction volume.

The present invention further provides, in another aspect, a method of treating a primary mitochondrial disease or disorder or a symptom thereof in a human patient in need of such treatment, comprising the step of administering a pharmaceutical composition comprising the mitochondrially-enriched human stem cells described above to the patient.

The phrase "stem cells obtained from a patient afflicted with a mitochondrial disease" as used herein refers to cells that were stem cells in the patient at the time of their isolation from the patient.

The phrase "stem cells derived from a patient afflicted with a mitochondrial disease" as used herein refers to cells that were not stem cells in the patient, and have been manipulated to become stem cells. The phrase further includes stems cells of a certain type which have been manipulated to become stem cells of a different type. The term "manipulated" as used herein refers to the use of any one of the methods known in the field (Yu J. et al., Science, 2007, Vol. 318 (5858), pages 1917-1920) for reprograming somatic cells to an undifferentiated state and becoming induced pluripotent stem cells (iPSc), and, optionally, further reprograming the iPSc to become cells of a desired lineage or population (Chen M. et al., IOVS, 2010, Vol. 51 (11), pages 5970-5978), such as bone-marrow cells (Xu Y. et al., 2012, PLOS ONE, Vol. 7 (4), page e34321).

The term "a patient afflicted with a mitochondrial disease" as used herein refers to a human subject diagnosed with a mitochondrial disease, suspected to have a mitochondrial disease, or in a risk group of developing a mitochondrial disease. As certain mitochondrial diseases are inherited, the progeny of genetic carriers of a mitochondrial disease or of subjects diagnosed with a mitochondrial disease are considered a risk group of developing a mitochondrial disease.

The term "a subject/donor not afflicted with a mitochondrial disease" as used herein refers to human subject not diagnosed with a mitochondrial disease, not suspected to have a mitochondrial disease, and/or not in a risk group of developing a mitochondrial disease. The term further includes a subject without a mutation in mitochondrial DNA and/or a subject without a mutation in nuclear DNA which encodes a molecule (e.g. a protein or an RNA molecule) transferred to the mitochondria.

The term "isolated healthy functional human exogenous mitochondria" as used herein refers to intact mitochondria obtained or derived from cells obtained from a subject not afflicted with a mitochondrial disease. The term further includes functional mitochondria obtained from a subject not carrying a mutation in mitochondrial DNA. In some embodiments, such mitochondria are exogenous mitochondria. The term "isolated" as used herein and in the claims in the context of mitochondria includes mitochondria that were purified, at least partially, from other components found in said source. In certain embodiments, the total amount of mitochondrial proteins in the second composition comprising the plurality of isolated healthy functional exogenous mitochondria, is between 20%-80%, 20-70%, 40-70%, 20-40%, or 20-30% of the total amount of cellular proteins within the sample. Each possibility represents a separate embodiment of the present invention. In certain embodiments, the total amount of mitochondrial proteins in the second composition comprising the plurality of isolated healthy functional exogenous mitochondria, is between 20%-80% of the total amount of cellular proteins within the sample. In certain embodiments, the total amount of mitochondrial proteins in the second composition comprising the plurality of isolated healthy functional exogenous mitochondria, is between 20%-80% of the combined weight of the mitochondria and other sub-cellular fractions. In other embodiments, the total amount of mitochondrial proteins in the second composition comprising the plurality of isolated healthy functional exogenous mitochondria, is above 80% of the combined weight of the mitochondria and other sub-cellular fractions.

The phrase "conditions allowing the human functional mitochondria to enter the human stem cells" as used herein generally refers to parameters such as time, temperature, and proximity between the mitochondria and the human stem cells. Such conditions are provided by the present invention.

In certain embodiments, the human stem cells are incubated with the healthy functional exogenous mitochondria for a time ranging from 0.5 to 30 hours, at a temperature ranging from about 16 to about 37° C. In certain embodiments, the human stem cells are incubated with the healthy functional exogenous mitochondria for a time ranging from 1 to 30 or from 5 to 25 hours. Each possibility represents a separate embodiment of the present invention. In specific embodiments, incubation is for 20 to 30 hours. In some embodiments, incubation is for at least 1, 5, 10, 15 or 20 hours. Each possibility represents a separate embodiment of the present invention. In other embodiments, incubation is up to 5, 10, 15, 20 or 30 hours. Each possibility represents a separate embodiment of the present invention. In specific embodiments, incubation is for 24 hours. In some embodiments, incubation is at room temperature (16° C. to 30° C.). In other embodiments, incubation is at 37° C. In some embodiments, incubation is in a 5% $CO_2$ atmosphere. In other embodiments, incubation does not include added $CO_2$ above the level found in air. In certain embodiments, incubation is until the mitochondrial content in the stem cells is increased in average by 1% to 45% compared to their initial mitochondrial content.

By manipulating the conditions of the incubation, one can manipulate the features of the product. In certain embodiments, the incubation is performed at 37° C. In certain embodiments, the incubation is performed for at least 6 hours. In certain embodiments, the incubation is performed for at least 12 hours. In certain embodiments, the incubation is performed for 12 to 24 hours. In certain embodiments, the incubation is performed at a ratio of $1*10^5$ to $1*10^7$ naïve stem cells per amount of exogenous mitochondria having or exhibiting 4.4 milliunits of CS. In certain embodiments, the incubation is performed at a ratio of $1*10^6$ naïve stem cells per amount of exogenous mitochondria having or exhibiting 4.4 milliunits of CS. In certain embodiments, the conditions are sufficient to increase the mitochondrial content of the naïve stem cells by at least about 3%, 5% or 10% as determined by CS activity. Each possibility represents a separate embodiment of the present invention.

The term "mitochondrial content" as used herein refers to the amount of mitochondria within a cell. In some embodiments, incubation is in a medium supporting cell survival. In some embodiments, the medium is Dulbecco's Modified Eagle Medium (DMEM). In other embodiment, the medium is saline containing HSA (human serum albumin). In some embodiments, the saline contains between 1% and 10% HSA. In further embodiments, the saline contains between 3 to 6% HSA. In yet further embodiments, the saline contains 4.5% HSA. In specific embodiments, incubation of the stem cells with the heathy functional mitochondria is at a temperature ranging between 16 to 30° C., for a time ranging between 15 to 30 hours, in a saline containing between 3 to 6% HSA, without added $CO_2$ above the level found in air.

In certain embodiments, the methods described above in various embodiments thereof, further include centrifugation before, during or after incubation of the stem cells with the exogenous mitochondria. Each possibility represents a separate embodiment of the present invention. In some embodiments, the methods described above in various embodiments thereof include a single centrifugation step before, during or after incubation of the stem cells with the exogenous mitochondria. In some embodiments, the centrifugation force ranges from 1000 g to 8500 g. In some embodiments, the centrifugation force ranges from 2000 g to 4000 g. In some embodiments, the centrifugation force is above 2500 g. In some embodiments, the centrifugation force ranges from 2500 g to 8500 g. In some embodiments, the centrifugation force ranges from 2500 g to 8000 g. In some embodiments, the centrifugation force ranges from 3000 g to 8000 g. In other embodiments, the centrifugation force ranges from 4000 g to 8000 g. In specific embodiments, the centrifugation force is 7000 g. In other embodiments, the centrifugation force is 8000 g. In some embodiments, centrifugation is performed for a time ranging from 2 minutes to 30 minutes. In some embodiments, centrifugation is performed for a time ranging from 3 minutes to 25 minutes. In some embodiments, centrifugation is performed for a time ranging from 5 minutes to 20 minutes. In some embodiments, centrifugation is performed for a time ranging from 8 minutes to 15 minutes.

In some embodiments, centrifugation is performed in a temperature ranging from 4 to 37° C. In certain embodiments, centrifugation is performed in a temperature ranging from 4 to 10° C. or 16-30° C. Each possibility represents a separate embodiment of the present invention. In specific embodiments, centrifugation is performed at 2-6° C. In specific embodiments, centrifugation is performed at 4° C. In some embodiments, the methods described above in various embodiments thereof include a single centrifugation before, during or after incubation of the stem cells with the exogenous mitochondria, followed by resting the cells at a temperature lower than 30° C. In some embodiments, the conditions allowing the human functional mitochondria to enter the human stem cells include a single centrifugation before, during or after incubation of the stem cells with the exogenous mitochondria, followed by resting the cells at a temperature ranging between 16 and 28° C.

In certain embodiments, the first composition is fresh. In certain embodiments, the first composition was frozen and then thawed prior to incubation. In certain embodiments, the second composition is fresh. In certain embodiments, the second composition was frozen and then thawed prior to incubation. In certain embodiments, the fourth composition is fresh. In certain embodiments, the fourth composition was frozen and then thawed prior to administration.

In some embodiments, the stem cells in the fourth composition have (i) an increased mitochondrial DNA content; (ii) an increased content of at least one mitochondrial protein selected from the group consisting of CS, COX1 and SDHA; (iii) an increased rate of oxygen ($O_2$) consumption; (iv) an increased activity level of citrate synthase; (v) an increased rate of adenosine triphosphate (ATP) production; or (vi) any combination of (i), (ii), (iii), (iv) and (v), as compared to the stem cells in the first composition. Each possibility represents a separate embodiment of the invention. Methods for determining these various parameters are well known in the art.

The term "increased mitochondrial DNA content" as used herein refers to the content of mitochondrial DNA which is detectably higher than the mitochondrial DNA content in the first composition, prior to mitochondria enrichment. Mitochondrial DNA content may be measured by performing quantitative PCR of a mitochondrial gene prior and post mitochondrial enrichment, normalized to a nuclear gene.

The term "increased content of at least one mitochondrial protein" as used herein refers to the content of either nuclear-encoded or mitochondrial-encoded mitochondrial proteins, e.g., CS, COX1 and SDHA, which is detectably higher than content of said mitochondrial protein in the first composition, prior to mitochondrial enrichment.

The term "increased rate of oxygen (O2) consumption" as used herein refers to a rate of oxygen (O2) consumption which is detectably higher than the rate of oxygen (O2) consumption in the first composition, prior to mitochondrial enrichment.

The term "increased content or activity level of citrate synthase" as used herein refers to a content or activity level of citrate synthase which is detectably higher than the content value or activity level of citrate synthase in the first composition, prior to mitochondrial enrichment.

The term "increased rate of adenosine triphosphate (ATP) production" as used herein refers to a rate of adenosine triphosphate (ATP) production which is detectably higher than the rate of adenosine triphosphate (ATP) production in the first composition, prior to mitochondrial enrichment.

In certain embodiments, the term "detectably higher" as used herein refers to a statistically-significant increase between the normal and increased values. In certain embodiments, the term "detectably higher" as used herein refers to a non-pathological increase, i.e. to a level in which no pathological symptom associated with the substantially higher value becomes apparent. In certain embodiments, the term "increased" as used herein refers to a value which is 1.05 fold, 1.1 fold, 1.25 fold, 1.5 fold, 2 fold, 3 fold, 4 fold, 5 fold, 6 fold, 7 fold or higher than the corresponding value found in corresponding cells or corresponding mitochondria of a plurality of healthy subjects or in the stem cells of the first composition prior to mitochondrial enrichment. Each possibility represents a separate embodiment of the invention.

In specific situations the same cells, prior to mitochondrial enrichment, serve as controls to measure CS and ATP activity and determine enrichment level.

Citrate synthase (CS) is localized in the mitochondrial matrix, but is encoded by nuclear DNA. Citrate synthase is involved in the first step of the Krebs cycle, and is commonly used as a quantitative enzyme marker for the presence of intact mitochondria (Larsen S. et al., 2012, J. Physiol., Vol. 590 (14), pages 3349-3360; Cook G. A. et al., Biochim. Biophys. Acta., 1983, Vol. 763 (4), pages 356-367). In certain embodiments, the mitochondrial content of the stem cells in the first composition or in the fourth composition is determined by determining the content of citrate synthase. In certain embodiments, the mitochondrial content of the stem cells in the first composition or in the fourth composition is determined by determining the activity level of citrate synthase. In certain embodiments, the mitochondrial content of the stem cells in the first composition or in the fourth composition correlates with the content of citrate synthase. In certain embodiments, the mitochondrial content of the stem cells in the first composition or in the fourth composition correlates with the activity level of citrate synthase. CS activity can be measured by e.g., using the CS activity kit CS0720 (Sigma).

Eukaryotic NADPH-cytochrome C reductase (cytochrome C reductase) is a flavoprotein localized to the endoplasmic reticulum. It transfers electrons from NADPH to several oxygenases, the most important of which are the cytochrome P450 family of enzymes, responsible for xenobiotic detoxification. Cytochrome C reductase is widely used as an endoplasmic reticulum marker. In certain embodiments, the second composition is substantially free from cytochrome C reductase or cytochrome C reductase activity. In certain embodiments, the fourth composition is not enriched with cytochrome C reductase or cytochrome C reductase activity compared to the first composition In certain embodiments, the stem cells comprise myelopoietic cells. The term "myelopoietic cells" as used herein refers to cells involved in myelopoiesis, e.g. in the production of bone marrow and of all cells that arise from it, namely, all blood cells.

In certain embodiments, the stem cells comprise erythropoietic cells. The term "erythropoietic cells" as used herein refers to cells involved in erythropoiesis, e.g. in the production of red blood cells (erythrocytes).

In certain embodiments, the stem cells comprise multi-potential hematopoietic stem cells (HSCs). The term "multi-potential hematopoietic stem cells" or "hemocytoblasts" as used herein refers to the stem cells that give rise to all the other blood cells through the process of haematopoiesis.

In certain embodiments, the stem cells comprise common myeloid progenitor cells, common lymphoid progenitor cells, or any combination thereof. The term "common myeloid progenitor" as used herein refers to the cells that generate myeloid cells. The term "common lymphoid progenitor" as used herein refers to the cells that generate lymphocytes.

In certain embodiments, the pharmaceutical composition further comprises megakaryocytes, erythrocytes, mast cells, myeloblasts, basophils, neutrophils, eosinophils, monocytes, macrophages, natural killer (NK) cells, small lymphocytes, T lymphocytes, B lymphocytes, plasma cells, reticular cells, or any combination thereof. Each possibility represents a separate embodiment of the invention.

In certain embodiments, the stem cells comprise mesenchymal stem cells. The term "mesenchymal stem cells" as used herein refers to multipotent stromal cells that can differentiate into a variety of cell types, including osteoblasts (bone cells), chondrocytes (cartilage cells), myocytes (muscle cells) and adipocytes (fat cells).

In certain embodiments, the stem cells consist of myelopoietic cells. In certain embodiments, the stem cells consist of erythropoietic cells. In certain embodiments, the stem cells consist of multi-potential hematopoietic stem cells (HSCs). In certain embodiments, the stem cells consist of common myeloid progenitor cells, common lymphoid progenitor cells, or any combination thereof. Each possibility represents a separate embodiment of the invention. In certain embodiments, the stem cells consist of mesenchymal stem cells.

Hematopoietic progenitor cell antigen CD34 also known as CD34 antigen is a protein that in humans is encoded by the CD34 gene. CD34 is a cluster of differentiation in a cell surface glycoprotein and functions as a cell-cell adhesion factor. In certain embodiments, the stem cells express the bone-marrow progenitor cell antigen CD34 (are CD34$^+$). In certain embodiments, the stem cells present the bone-marrow progenitor cell antigen CD34 on their external membrane. In certain embodiments, the stem cells do not express the bone-marrow progenitor cell antigen CD34 (are CD34$^-$). In certain embodiments, the stem cells do not present the bone-marrow progenitor cell antigen CD34 on their external membrane.

In certain embodiments, the stem cells in the first composition are directly derived from the patient afflicted with a mitochondrial disease. In certain embodiments, the stem cells in the first composition are directly derived from a subject not afflicted with a mitochondrial disease. The term "directly derived" as used herein refers to stem cells which were derived directly from other cells. In certain embodiments, the stem cells were derived from hematopoietic stem cells.

In certain embodiments, the stem cells in the first composition are indirectly derived from the patient afflicted with a mitochondrial disease. In certain embodiments, the stem cells in the first composition are indirectly derived from a subject not afflicted with a mitochondrial disease. The term "indirectly derived" as used herein refers to stem cells which were derived from non-stem cells or from other types of stem cells. In certain embodiments, the stem cells were derived from somatic cells which were manipulated to become induced pluripotent stem cells (iPSc).

In certain embodiments, the stem cells in the first composition are directly obtained from the bone marrow of the patient afflicted with a mitochondrial disease. In certain embodiments, the stem cells in the first composition are directly obtained from the bone marrow of a subject not afflicted with a mitochondrial disease. The term "directly obtained" as used herein refers to stem cells which were obtained from the bone-marrow itself, e.g. by means such as surgery or suction through a needle by a syringe.

In certain embodiments, the stem cells in the first composition are indirectly obtained from the bone marrow of the patient afflicted with a mitochondrial disease. In certain embodiments, the stem cells in the first composition are indirectly obtained from the bone marrow of a subject not afflicted with a mitochondrial disease. The term "indirectly obtained" as used herein refers to stem cells which were obtained from a location other than the bone-marrow itself.

In certain embodiments, the stem cells in the first composition are directly or indirectly obtained from adipose tissue, oral mucosa, skin fibroblasts, blood and/or umbilical cord blood. Each possibility is a separate embodiment.

In certain embodiments, the stem cells in the first composition are obtained from the peripheral blood of the patient afflicted with a mitochondrial disease. In certain embodiments, the stem cells in the first composition are obtained from the peripheral blood of the subject not afflicted with a mitochondrial disease. The term "peripheral blood" as used herein refers to blood circulating in the blood system.

In certain embodiments, the method described above further comprises a preceding step, the step comprising administering to the patient afflicted with a mitochondrial disease an agent which induces mobilization of stem cells to peripheral blood. In certain embodiments, the method described above further comprises a preceding step, the step comprising administering to a subject not afflicted with a mitochondrial disease an agent which induces mobilization of stem cells to peripheral blood.

In certain embodiments, the agent which induces mobilization of stem cells to peripheral blood is selected from the group consisting of granulocyte-colony stimulating factor (G-CSF), granulocyte-macrophage colony-stimulating factor (GM-CSF), 1,1'-[1,4-Phenylenebis(methylene)]bis [1,4,8,11-tetraazacyclotetradecane] (Plerixafor, CAS number 155148-31-5), a salt thereof, and any combination thereof. Each possibility represents a separate embodiment of the invention.

In certain embodiments, the method described above further comprises a step of isolating the stem cells from the peripheral blood of the patient afflicted with a mitochondrial disease. In certain embodiments, the method described above further comprises a step of isolating the stem cells from the peripheral blood of the subject not afflicted with a mitochondrial disease. The term "isolating from the peripheral blood" as used herein refers to the isolation of stem cells from other constituents of the blood.

During apheresis, the blood of a donor or patient is passed through an apparatus that separates out one particular constituent and returns the remainder to the circulation. It is thus a medical procedure which is performed outside the body. In certain embodiments, the isolation is performed by apheresis.

In certain embodiments, the method described above further comprises concentrating the stem cells and the functional mitochondria in the third composition before incubation. In certain embodiments, the method described above further comprises concentrating the stem cells and the functional mitochondria in the third composition during incubation. In some embodiments, concentration of the stem cells and the functional mitochondria in the third composition during incubation is performed by continuous centrifugation.

In certain embodiments, the method described above further comprises centrifugation of the third composition before incubation. In certain embodiments, the method described above further comprises centrifugation of the third composition during incubation. In certain embodiments, the method described above further comprises centrifugation of the third composition after incubation.

It should be emphasized that any reference to any measurable feature or characteristic or aspect directed to a plurality of cells or mitochondria is directed to the measurable average feature or characteristic or aspect of the plurality of cells or mitochondria.

Heteroplasmy is the presence of more than one type of mitochondrial DNA within a cell or individual. The heteroplasmy level is the proportion of mutant mtDNA molecules vs. wild type/functional mtDNA molecules and is an important factor in considering the severity of mitochondrial diseases. While lower levels of heteroplasmy (sufficient amount of mitochondria are functional) are associated with a healthy phenotype, higher levels of heteroplasmy (insufficient amount of mitochondria are functional) are associated with pathologies. In certain embodiments, the heteroplasmy level of the stem cells in the fourth composition is at least 1% lower than the heteroplasmy level of the stem cells in the first composition. In certain embodiments, the heteroplasmy level of the stem cells in the fourth composition is at least 3% lower than the heteroplasmy level of the stem cells in the first composition. In certain embodiments, the heteroplasmy level of the stem cells in the fourth composition is at least 5% lower than the heteroplasmy level of the stem cells in the first composition. In certain embodiments, the heteroplasmy level of the stem cells in the fourth composition is at least 10% lower than the heteroplasmy level of the stem cells in the first composition. In certain embodiments, the heteroplasmy level of the stem cells in the fourth composition is at least 15% lower than the heteroplasmy level of the stem cells in the first composition. In certain embodiments, the heteroplasmy level of the stem cells in the fourth composition is at least 20% lower than the heteroplasmy level of the stem cells in the first composition. In certain embodiments, the heteroplasmy level of the stem cells in the fourth composition is at least 25% lower than the heteroplasmy level of the stem cells in the first composition. In certain embodiments, the heteroplasmy level of the stem cells in the fourth composition is at least 30% lower than the heteroplasmy level of the stem cells in the first composition.

In certain embodiments, the method further comprises freezing the fourth composition. In certain embodiments, the method further comprises freezing and then thawing the fourth composition.

As used herein, the term "autologous cells" or "cells that are autologous, refers to being the patient's own cells. The term "allogeneic cells", refers to cells from a different donor individual. The term "autologous mitochondria", refers to mitochondria obtained from the same maternally genetically related cells. The term "allogeneic mitochondria", refers to mitochondria being from a different donor individual, wherein the different donor individual is not maternally genetically related to the subject to be treated.

The term "syngeneic" as used herein and in the claims refers to genetic identity or genetic near-identity sufficient to allow grafting among individuals without rejection. The term "syngeneic" in the context of mitochondria is used herein interchangeably with the term "autologous mitochondria" meaning of the same maternal bloodline.

The term "exogenous mitochondria" refers to mitochondria that are introduced to a target cell (i.e., stem cell), from a source which is external to the cell. For example, in some embodiments, exogenous mitochondria may be derived or isolated from a cell which is different than the target cell. For example, exogenous mitochondria may be produced/made in a donor cell, purified/isolated/obtained from the donor cell and thereafter introduced into the target cell.

The term "endogenous mitochondria" refers to mitochondria that are being made/expressed/produced by cell and are not introduced from an external source into the cell. In some embodiments, endogenous mitochondria contain proteins and/or other molecules which are encoded by the genome of the cell. In some embodiments, the term "endogenous mitochondria" is equivalent to the term "host mitochondria".

In certain embodiments, the healthy functional human exogenous mitochondria are autologous or allogeneic mitochondria.

In some embodiments, the identification/discrimination of endogenous mitochondria from exogenous mitochondria, after the latter have been introduced into the target cell, can be performed by various means, including, for example, but not limited to: identifying differences in mitochondrial DNA (mtDNA) sequences, for example different haplotypes, between the endogenous mitochondria and exogenous mitochondria, identify specific mitochondrial proteins originating from the tissue of the exogenous mitochondria, such as, for example, cytochrome p450 Cholesterol side chain cleavage (P450SCC) from placenta, UCP1 from brown adipose tissue, and the like, or any combination thereof.

In certain embodiments, the method described above further comprises a step of administering to the patient an agent which promotes mitochondrial biogenesis. The term "mitochondrial biogenesis" as used herein refers to the growth and division of mitochondria. In certain embodiments, the agent which promotes mitochondrial biogenesis is erythropoietin (EPO) or a salt thereof. In certain embodiments, the agent is selected from the group consisting of recombinant human erythropoietin and isolated human erythropoietin.

In certain embodiments, the method described above further comprises a step of administering to the patient an agent which prevents, delays, minimizes or abolishes an adverse immunogenic reaction between the patient and the stem cells. In certain embodiments, the adverse immunogenic reaction is a graft-versus-host disease (GvHD). In certain embodiments, the GvHD is an acute form of the disease (aGvHD). In certain embodiments, the GvHD is a chronic form of the disease (cGvHD).

In certain embodiments, the method described above further comprises a preceding step of administering to the patient a pre-transplant conditioning agent prior to the administration of the pharmaceutical composition. The term "pre-transplant conditioning agent" as used herein refers to any agent capable of killing stem cells within the human subject. In certain embodiments, the pre-transplant conditioning agent is Busulfan.

The term "mutation" as used herein refers to an insertion, deletion or replacement of at least one nucleotide in mitochondrial or nuclear DNA. In certain embodiments, the mutation is a pathological mutation.

In certain embodiments, the pharmaceutical composition is administered locally. In certain embodiments, the administration of the pharmaceutical composition to a subject is by direct administration to the bone-marrow of the subject. In certain embodiments, the administration of the pharmaceutical composition to a subject is to a tissue or an organ. In certain embodiments, the administration of the pharmaceutical composition to a subject is to the eye. The vitreous humor is a transparent, colorless, gelatinous mass that fills the space in the eye between the lens and the retina. In certain embodiments, the administration of the pharmaceutical composition to a subject is to the vitreous humor of the eye. In certain embodiments, the administration of the pharmaceutical composition to a subject is by direct intramuscular injection. In certain embodiments, the pharmaceutical composition is administered systemically. In certain embodiments, the administration of the pharmaceutical composition to a subject is by a route selected from the group consisting of intravenous, intraarterial, intramuscular, subcutaneous, and direct injection into a tissue or an organ. Each possibility represents a separate embodiment of the invention.

In certain embodiments, the functional mitochondria are obtained from a human cell or a human tissue selected from the group consisting of placenta, placental cells grown in culture, and blood cells. Each possibility represents a separate embodiment of the invention.

According to another embodiment, the intactness of a mitochondrial membrane may be determined by any method known in the art. In a non-limiting example, intactness of a mitochondrial membrane is measured using the tetramethylrhodamine methyl ester (TMRM) or the tetramethylrhodamine ethyl ester (TMRE) fluorescent probes. Each possibility represents a separate embodiment of the present invention. Mitochondria that were observed under a microscope and show TMRM or TMRE staining have an intact mitochondrial outer membrane. As used herein, the term "a mitochondrial membrane" refers to a mitochondrial membrane selected from the group consisting of the mitochondrial inner membrane, the mitochondrial outer membrane, and both.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1. Mitochondria Enter CD34$^+$ Cells Rapidly after MAT Procedure

CD34$^+$ cells from healthy donors were treated with Mitotracker Orange (MTO) and washed prior to MAT, using mitochondria isolated from HeLa-TurboGFP-Mitochondria cells (CellTrend GmbH). Cells were fixed with 2% PFA for 10 minutes and fixed with DAPI. Cells were scanned using confocal microscope equipped with a 60×/1.42 oil immersion objective.

As can be seen in FIG. 1, exogenous mitochondria enter CD34$^+$ cell as quickly as 0.5 hour after MAT (bright, almost white, spots inside the cell), and continues for the tested 8 and 24 hours.

Example 2. Mitochondrial Augmentation Therapy in Mice·

Different mouse cells were incubated in DMEM containing 10% FCS for 24 hours at 37° C. and 5% CO2 atmosphere with isolated mitochondria in order to increase their mitochondrial content and activity. Table 1 describes representative results of the mitochondrial augmentation process, determined by the relative increase in CS activity of the cells after the process compared to the CS activity of the cells before the process.

TABLE 1

| Origin of cells | Origin of mitochondria | CS activity of mitochondria/ number of cells | Relative increase in CS activity of cells |
|---|---|---|---|
| ICR Mouse Isolated from whole bone marrow | Human mitochondria | 4.4 mU CS/1 × 10^6 Cells | +41% |
| FVB/N Mouse- Isolated from whole bone marrow | C57/BL placental mitochondria | 4.4 mU CS/1 × 10^6 Cells | +70% |
| FVB/N Mouse- Isolated from whole bone marrow | C57/BL liver mitochondria | 4.4 mU CS/1 × 10^6 Cells | +25% |

Figure 2A:
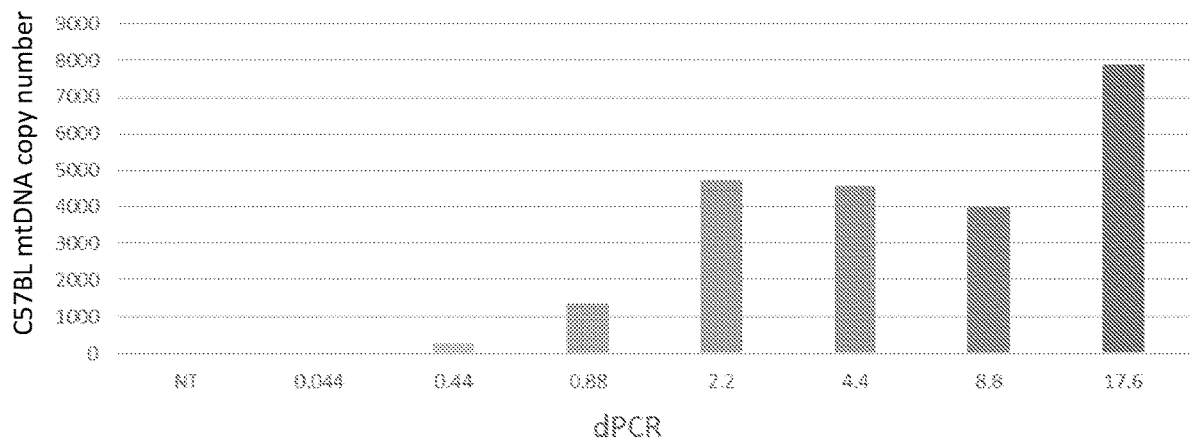
FIG. 2A is a bar graph illustrating the number of copies of C57BL mtDNA in FVB/N bone marrow cells after incubation of the cells with exogenous mitochondria from C57BL mouse in various concentrations (0.044, 0.44, 0.88, 2.2, 4.4, 8.8, 17.6 mUnits CS activity, compared to untreated cells (NT).
Figure 2B:
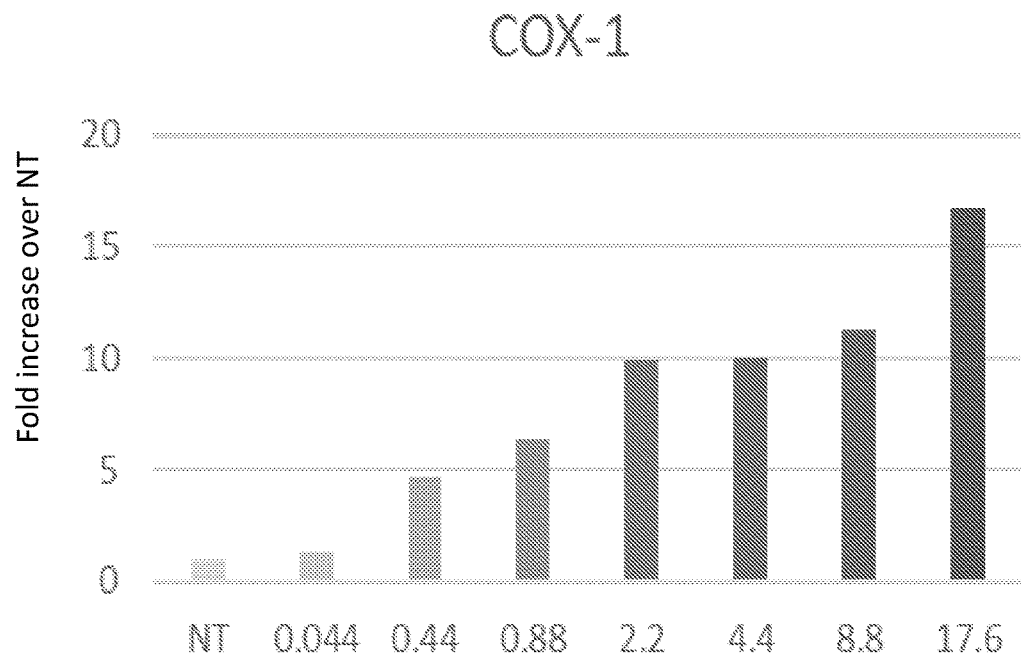
FIG. 2B is a bar graph illustrating the content of mtDNA encoded (COX1) protein in FVB/N bone marrow cells after incubation of the cells with exogenous mitochondria from C57BL mouse in various concentrations (0.044, 0.44, 0.88, 2.2, 4.4, 8.8, 17.6 mUnits CS activity), compared to untreated cells (NT), normalized to Janus levels.
Figure 2C:
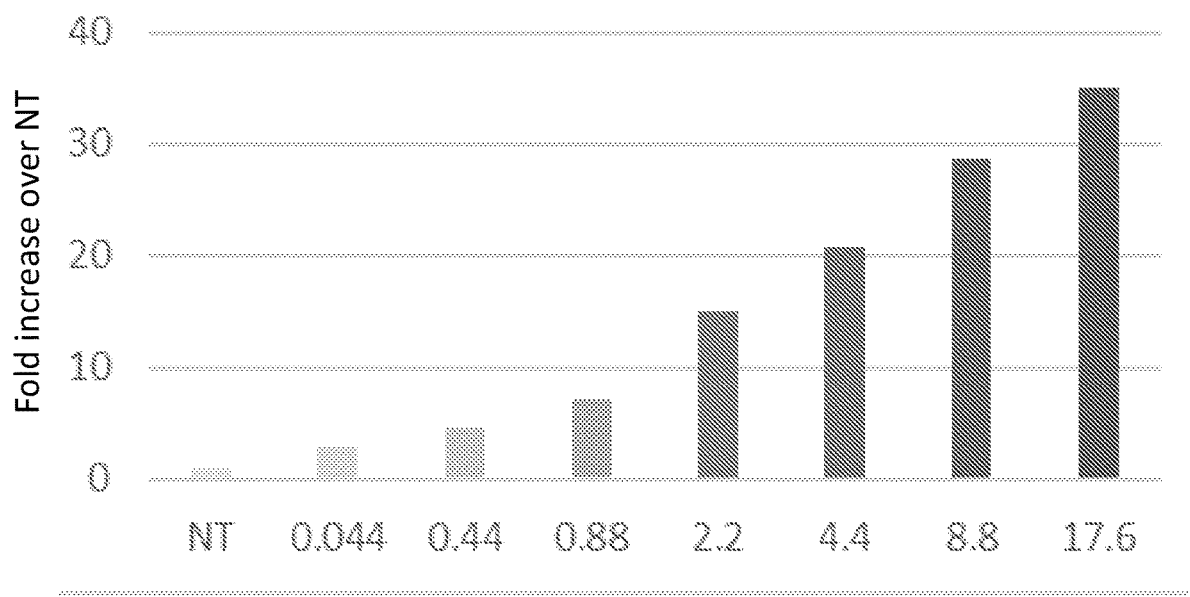
FIG. 2C is a bar graph illustrating the content of nuclear encoded (SDHA) protein in FVB/N bone marrow cells after incubation of the cells with exogenous mitochondria from C57BL mouse in various concentrations (0.044, 0.44, 0.88, 2.2, 4.4, 8.8, 17.6 mUnits CS activity), compared to untreated cells (NT), normalized to Janus levels.

FVB/N bone marrow cells (carrying a mutation in mtDNA ATP8) were incubated with C57/BL wild-type (WT) mitochondria isolated from placenta in various doses (0.044, 0.44, 0.88, 2.2, 4.4, 8.8, 17.6 mUnits CS activity per 1 M cells in 1 mL). As can be seen in FIG. 2A, dPCR using WT specific sequences showed an increase in WT mtDNA in a dose-dependent manner for most dosages. The enriched cells also showed a dose-dependent increase in content of mtDNA encoded (COX1) (FIG. 2B) and nuclear encoded (SDHA) (FIG. 2C) proteins.

Figure 3A:
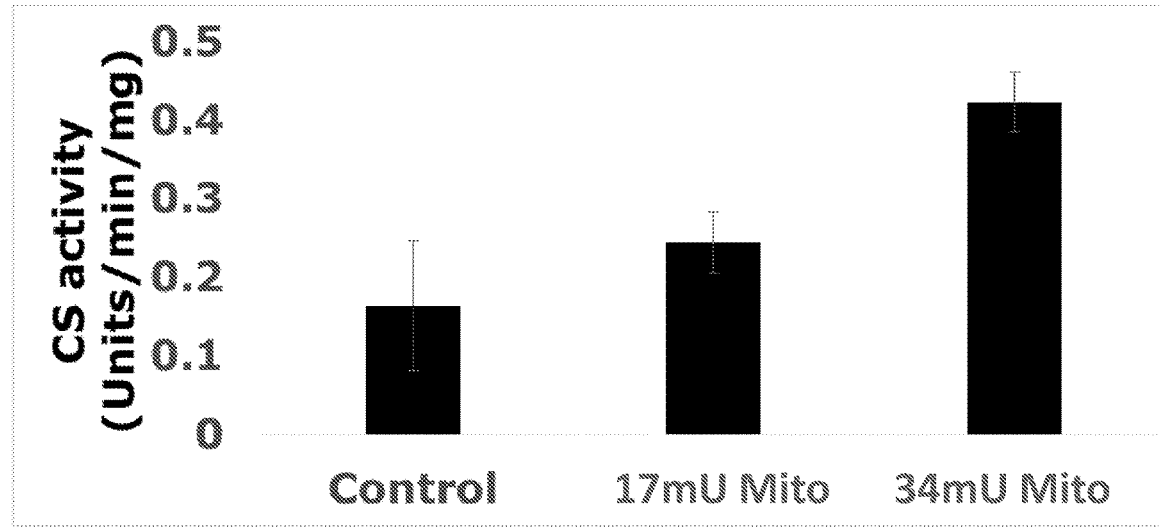
FIG. 3A is a bar graph showing a comparison of CS activity in murine BM cells after enrichment with increasing amounts of GFP-labeled mitochondria.
Figure 3B:
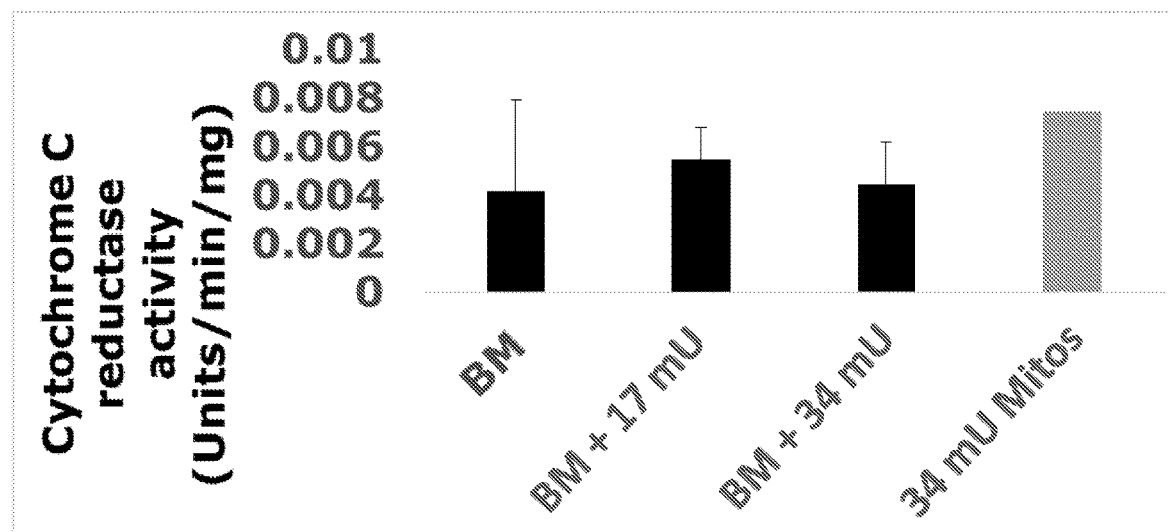
FIG. 3B is a bar graph showing a comparison of cytochrome c reductase activity in these cells (black bars), compared to the activity in GFP-labeled mitochondria (gray bar).

Mouse bone-marrow cells (10$^6$) were untreated or incubated for 24 hours with GFP-labeled mitochondria isolated from mouse melanoma cells (17 milliunits or 34 milliunits, indicating the level of citrate synthase activity as a marker for mitochondria content). The cells were mixed with mitochondria, centrifuged at 8000 g and re-suspended. After 24 hour incubation, the cells were washed twice with PBS and the level of citrate synthase (CS) activity (FIG. 3A) and cytochrome c reductase activity (FIG. 3B) were measured using the CS0720 and CY0100 kits (Sigma), respectively, as previously described in WO 2016/135723.

The results demonstrated in FIG. 3 clearly indicate that the compositions of functional mitochondria used in the experiments above enrich bone-marrow cells with mitochondria, but not with ER.

Figure 4:
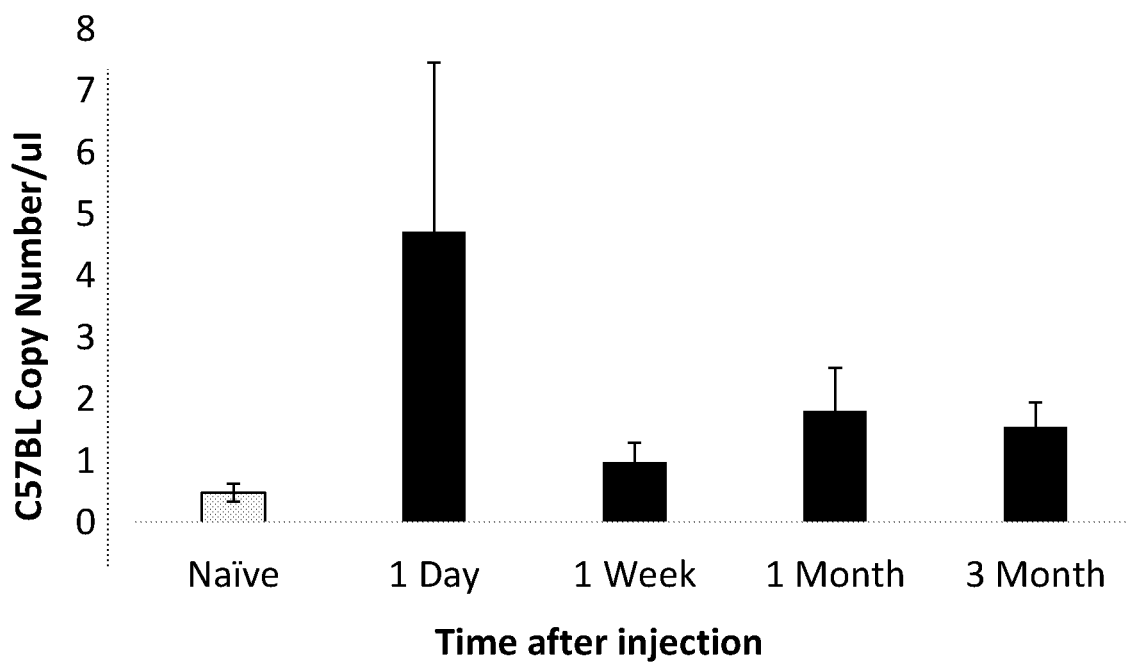
FIG. 4 is a bar graph illustrating the level of C57BL mtDNA in the bone marrow of FVB/N mice at various time points after IV injection of bone marrow cells enriched with exogenous mitochondria from C57BL mouse.

In order to examine in vivo the effect of mitochondrial augmentation therapy, FVB/N bone marrow cells (1×10⁶) enriched with 4.4 mUnits CS activity of C57/BL placental mitochondria, were IV injected to FVB/N mice. Bone marrow were collected from mice 1 day, 1 week, 1 month and 3 months after the treatment and the level of WT mtDNA were detected using dPCR. As can be seen in FIG. 4, significant amount of WT mtDNA was detected in bone marrow 1 day post treatment.

Example 3. MAT Results in Co-Existence of Exogenous and Endogenous mtDNA within Cells Mitochondrial augmentation of healthy donor CD34⁺ cells was performed with two different placenta-derived mitochondria batches, and cells were washed extensively after 24 h incubation. Illumina-based sequencing of the mtDNA show the presence of both transferred and endogenous mitochondria within the same cell.

Figure 5:
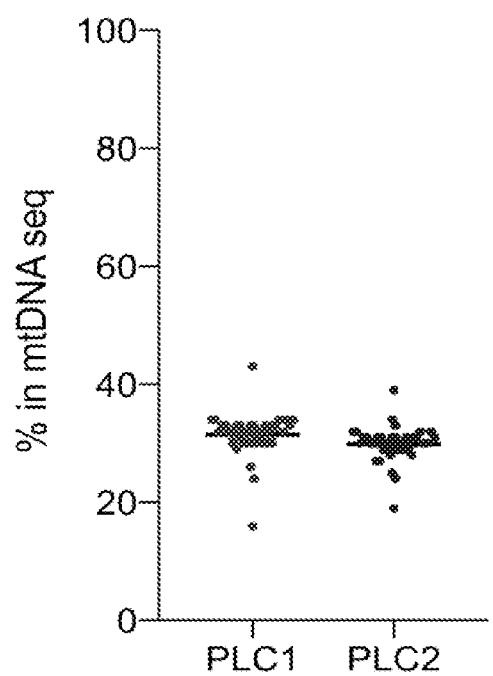
FIG. 5 is a dot plot illustrating the percentage placental haplogroup in healthy donor $CD34^+$ cells after MAT with two different placenta-derived mitochondria batches (PLC1 & PLC2).

As can be seen in FIG. 5 both MAT experiments from different placenta resulted in a similar augmentation percentage.

Example 4. Mitochondria can Enter Human Bone Marrow Cells

Figure 6A:
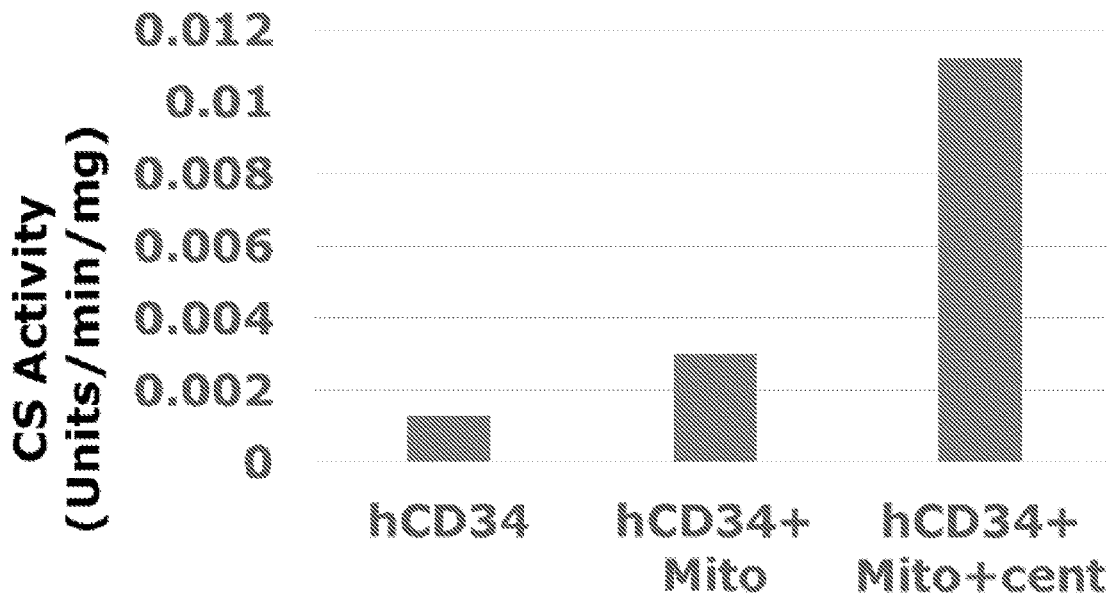
FIG. 6A is a bar graph showing a comparison of CS activity in control, untreated human BM cells and human BM cells incubated with GFP-labeled mitochondria isolated from human placental cells, with or without centrifugation.

Human CD34⁺ cells (1.4*10⁵, ATCC PCS-800-012) were untreated or incubated for 20 hours with GFP-labeled mitochondria isolated from human placental cells. Before plating the cells, mitochondria were mixed with the cells, centrifuged at 8000 g and re-suspended. After incubation, the cells were washed twice with PBS and CS activity was measured using the CS0720 Sigma kit (FIG. 6A). ATP content was measured using ATPlite (Perkin Elmer) (FIG. 6B), as previously described in WO 2016/135723.

The results demonstrated in FIG. 6 clearly indicate that the mitochondrial content of human bone-marrow cells may be increased many fold by interaction and co-incubation with isolated human mitochondria, to an extent beyond the capabilities of either human or murine fibroblasts or murine bone-marrow cells.

Example 5. Bone-Marrow from NSGS Mice Engrafted with Human Umbilical Cord Blood Contain More Human mtDNA 2 Month after MAT Pearson-patient umbilical cord blood cells were incubated with 0.88 mU of human mitochondria for 24 hr, after which media was removed and cells were washed and resuspended in 4.5% HSA. The enriched cells were IV injected to NSGS mice (100,000 CD34⁺ cells per mouse).

Figure 7A:
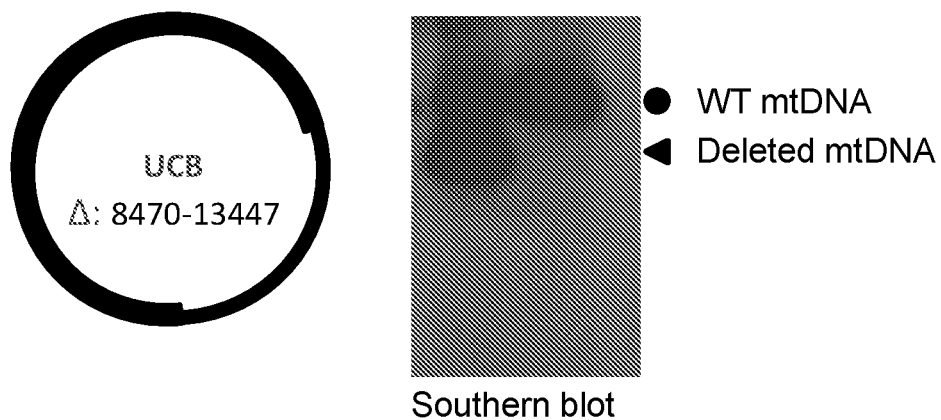
FIG. 7A is an illustration of mtDNA deletion in Pearson-patient cord blood cells as well as a southern blot analysis showing the deletion.

FIG. 7A is an illustration of mtDNA deletion in the Pearson-patient's cord blood cells showing 4978 kb deleted UCB mtDNA region (left) as well as a southern blot analysis showing the deletion (right).

Bone marrow was collected from mice 2 months post MAT, and copy number of non-deleted WT mtDNA was analyzed in dPCR using primers and probe identifying UCB non-deleted WT mtDNA sequences.

Figure 7B:
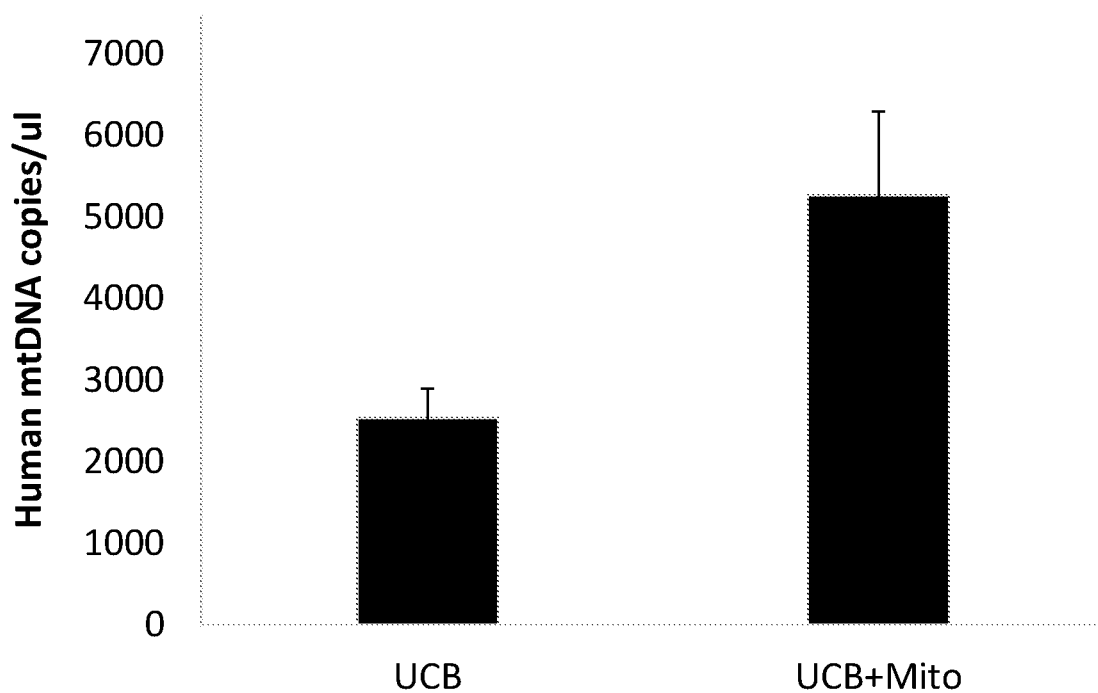
FIG. 7B is a bar graph illustrating the number of human mtDNA copies in the bone marrow of NSGS mice 2 month after mitochondrial augmentation therapy using Pearson's cord blood cells enriched with human mitochondria (UCB+Mito), as compared to mice injected with non-augmented cord blood cells (UCB).

As can be seen in FIG. 7B, 2 months after mitochondrial augmentation therapy, bone marrow of the mice contained ~100% more human mtDNA as compared to bone marrow of mice injected with non-augmented cord blood cells.

Example 6. In-Vivo Safety and Bio-Distribution Animal Study

Mitochondria are introduced into bone marrow cells of control healthy mice from two different backgrounds: the source of mitochondria will be from mice with different mtDNA sequences (Jenuth J P et al., Nature Genetics, 1996, Vol. 14, pages 146-151).

Mitochondria from wild type mice (C57BL) placenta were isolated. Bone marrow cells were isolated from FVB/N mice. The mutated FVB/N bone marrow cells (10⁶) were loaded with the healthy functional C57BL mitochondria (4.4 mU) and administered IV to FVB/N mice.

The steps of the method are: (1) isolating mitochondria from placenta of C57BL mice, freezing at −80° C. and defrosting, or using fresh; (2) obtaining bone marrow cells from mtDNA mutated FVB/N mice; (3) contacting the mitochondria and bone marrow cells, centrifuging at 8000 g for 5 minutes, resuspending and incubating for 24 hours; (4) washing the bone marrow cells twice with PBS and injecting into a tail vein of FVB/N mice. At various time points, e.g., after 24 hours, a week, a month and 3 months post transplantation, tissues (blood, bone marrow, lymphocytes, brain, heart, kidney, liver, lung, spleen, skeletal muscle, eye, ovary/testis) were collected and DNA extracted for further sequence analysis.

Figure 8:
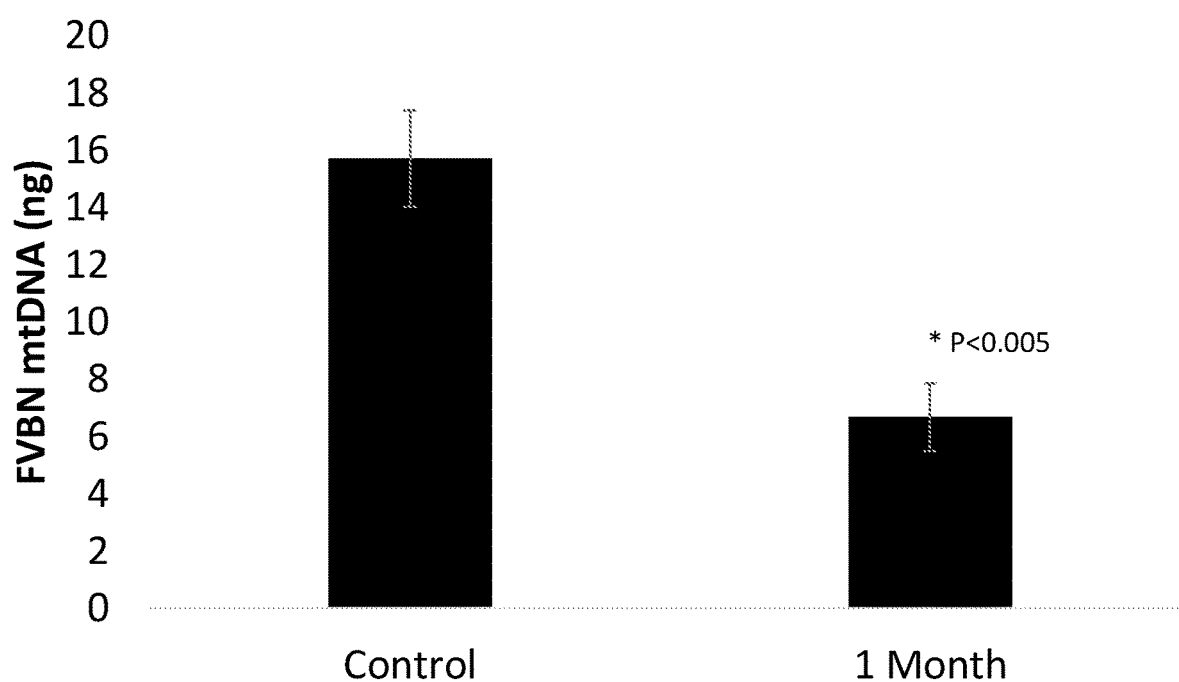
FIG. 8 is a bar graph showing FVB/N ATP8 mutated mtDNA levels in the bone marrow of FVB/N mice 1 month post administration of stem cells enriched with healthy functional mitochondria obtained from C57/BL placenta.

The decreased levels of FVB/N in the bone marrow 1 month after the transplantation are depicted in FIG. 8.

Example 7. Compassionate Treatment Using Autologous CD34⁺ Cells Enriched with MNV-BLD (Blood Derived Mitochondria) for a Juvenile with Pearson Syndrome (PS) and Renal Fanconi Syndrome (FS)

Patient 1 was a 6.5-years old male patient diagnosed with PS, having a deletion of nucleotides 5835-9753 in his mtDNA. Prior to mitochondrial augmentation therapy (MAT), his weight was 14.5 KG, he was not able to walk more than 100 meters or to climb stairs. His growth was significantly delayed for 3 years prior to treatment, and at baseline his weight was −4.1 standard deviation score (SDS) and height-3.2 SDS (relative to the population), with no improvement despite being fed by a gastrostomy tube (G-tube) for more than a year. He had renal failure (GFR 22 ml/min) and proximal tubulopathy requiring electrolyte supplementation. He had hypoparathyroidism requiring calcium supplementation, and an incomplete right bundle branch block (ICRBB) on electrocardiography.

Mobilization of hematopoietic stem and progenitor cells (HSPC) was performed by subcutaneous administration of GCSF, given alone for 5 days. Leukapheresis was performed using a Spectra Optia system (TerumoBCT), via peripheral vein access, according to institutional guidelines. CD34 positive selection was performed on mobilized peripheral blood derived cells by using the CliniMACS CD34 reagent according to the manufacturer's instructions. Mitochondria were isolated from maternal peripheral blood mononuclear cells (PBMCs) using 250 mM sucrose buffer pH 7.4 by differential centrifugation. For MAT, the autologous CD34⁺ cells were incubated with the healthy mitochondria from the patient's mother (1*10⁶ cells per amount of mitochondria having 4.4 milliunits of citrate synthase (CS)), resulting in a 1.56 fold increase in the cells mitochondrial content (56% increase in mitochondrial content as demonstrated by CS activity). Incubation with mitochondria was performed for 24 hours at R.T. in saline containing 4.5% HSA. Enriched cells were suspended in 4.5% human serum albumin in saline solution. The patient received a single round of treatment, by IV infusion, of 1.1*10⁶ autologous CD34⁺ cells enriched with healthy mitochondria per kilogram body weight, according to the timeline presented in FIG. 9A.

Figure 9B:
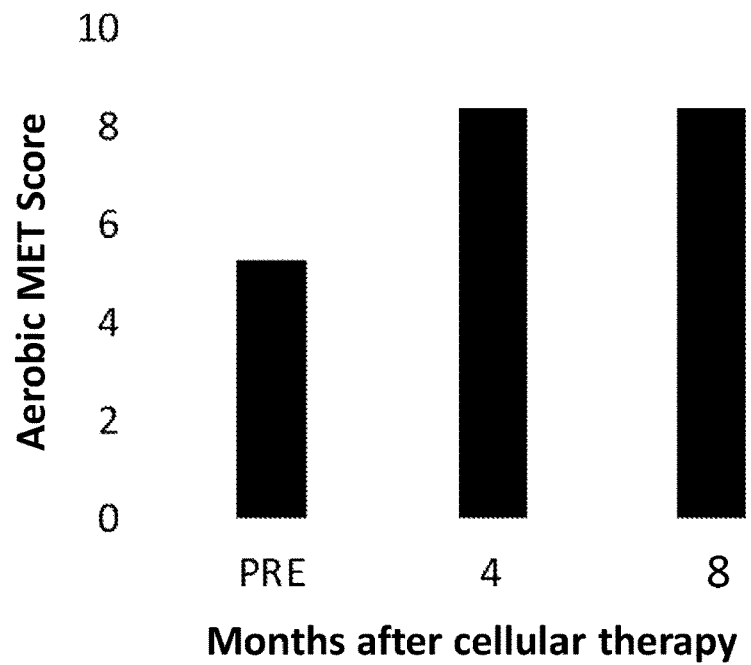
FIG. 9B is a bar graph illustrating the MET score of a PS patient treated by the methods provided in the present invention as a function of time before and after therapy.

FIG. 9B presents the level of aerobic Metabolic Equivalent of Task (MET) score of the patient as a function of time post cellular therapy. The data teach that the aerobic MET score of the patient was significantly increased over time from 5 (moderate intensity activities, such as walking and bicycling) to 8 (vigorous intensity activities, such as running, jogging and rope jumping).

Figure 9C:
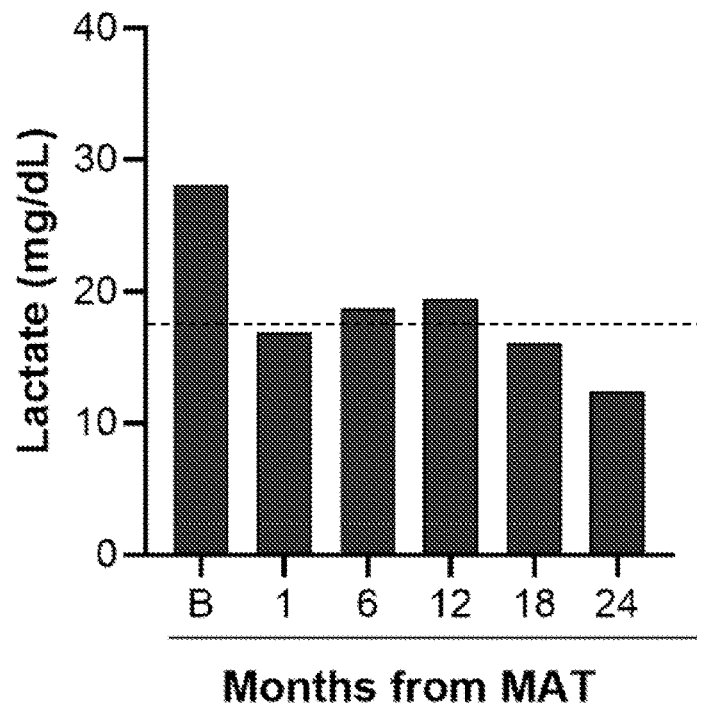
FIG. 9C is a bar graph illustrating the level of lactate found in the blood of a PS patient treated by the methods provided in the present invention as a function of time before (B) and after therapy.
Figure 9D:
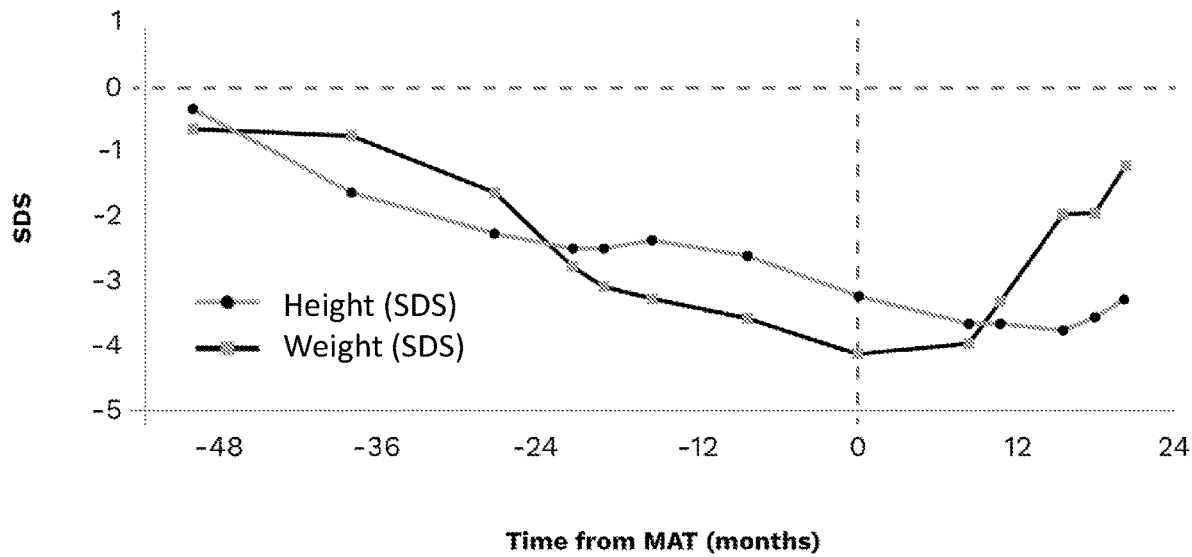
FIG. 9D is a line graph illustrating the standard deviation score of the weight and height of a PS patient treated by the methods provided in the present invention as a function of time before and after therapy.

FIG. 9C presents the level of lactate found in the blood of the patient as a function of time post the I.V. injection. Blood lactate is lactic acid that appears in the blood as a result of anaerobic metabolism when mitochondria are damaged or when oxygen delivery to the tissues is insufficient to support normal metabolic demands, one of the hallmarks of mitochondria dysfunction. As can be seen in FIG. 4C, after MAT, blood lactate level of patient 1 has decreased to normal values.

Table 2 presents the Pediatric Mitochondrial Disease Scale (IPMDS)—Quality of Life (QoL) Questionnaire results of the patient as a function of time post cellular therapy. In both the "Complaints & Symptoms" and the "Physical Examination" categories, 0 represents "normal" to the relevant attribute, while aggravated conditions are scored as 1-5, dependent on severity.

TABLE 2

| | Pre-treatment | +6 months |
|---|---|---|
| Complaints & Symptoms | 24 | 11 |
| Physical Examination | 13.4 | 4.6 |

It should be noted that the patient has not gained weight in the 3 years before treatment, i.e. did not gain any weight since being 3.5 years old. The data presented in FIG. 4D shows the growth measured by standard deviation score of the weight and height of the patient, with data starting 4 years prior to MAT and during the follow-up period. The data indicates that approximately 9 months or 15 months following a single treatment, there was an increase in the weight and height of the patient, respectively.

Figure 9E:
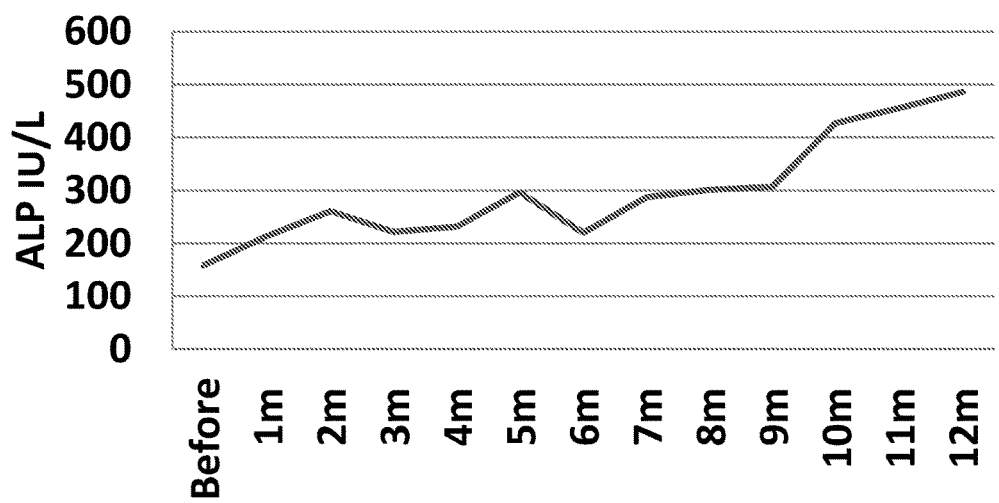
FIG. 9E is a line graph illustrating the alkaline phosphatase (ALP) level of a PS patient treated by the methods provided in the present invention as a function of time before and after therapy.

Another evidence for the patient's growth comes from his Alkaline Phosphatase levels. An alkaline phosphatase level test (ALP test) measures the amount of alkaline phosphatase enzyme in the bloodstream. Having lower than normal ALP levels in the blood can indicate malnutrition, which could be caused by a deficiency in certain vitamins and minerals. The data presented in FIG. 9E indicates that a single treatment was sufficient to elevate the Alkaline Phosphatase levels of the patient from 159 to 486 IU/L in only 12 months.

Figure 9F:
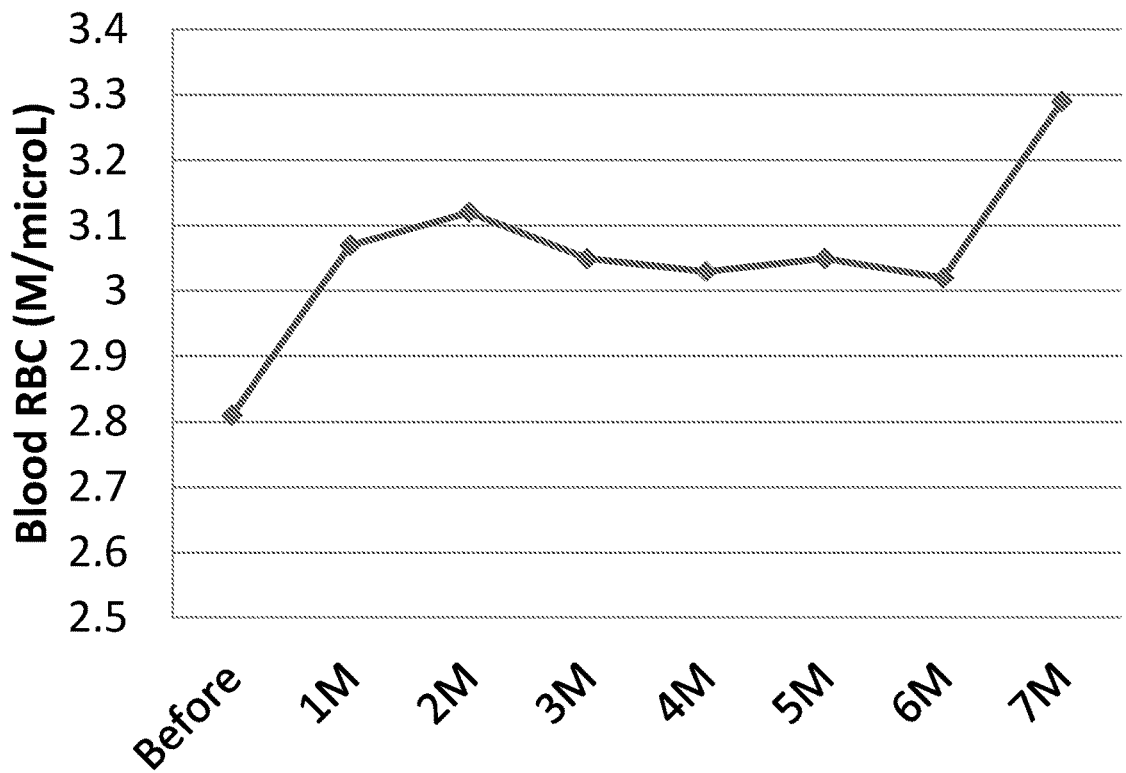
FIG. 9F is a line graph illustrating the long term elevation in blood red blood cell (RBC) levels in a PS patient before and after therapy provided by the present invention.
Figure 9G:
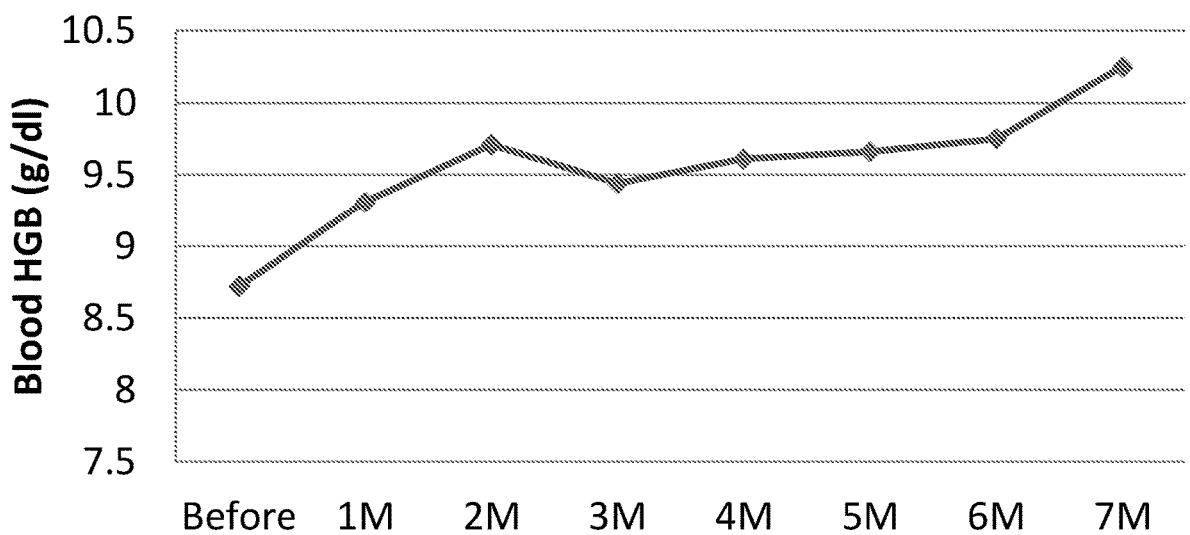
FIG. 9G is a line graph illustrating the long term elevation in blood hemoglobin (HGB) levels in a PS patient before and after therapy provided by the present invention.
Figure 9H:
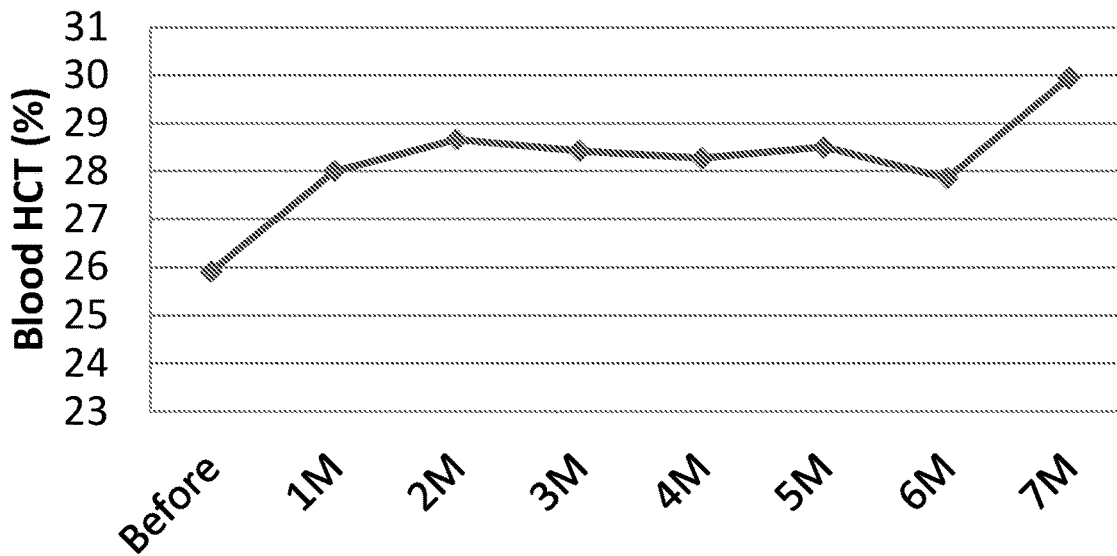
FIG. 9H is a line graph illustrating the long term elevation in blood hematocrit (HCT) levels in a PS patient before and after therapy provided by the present invention.
Figure 9I:
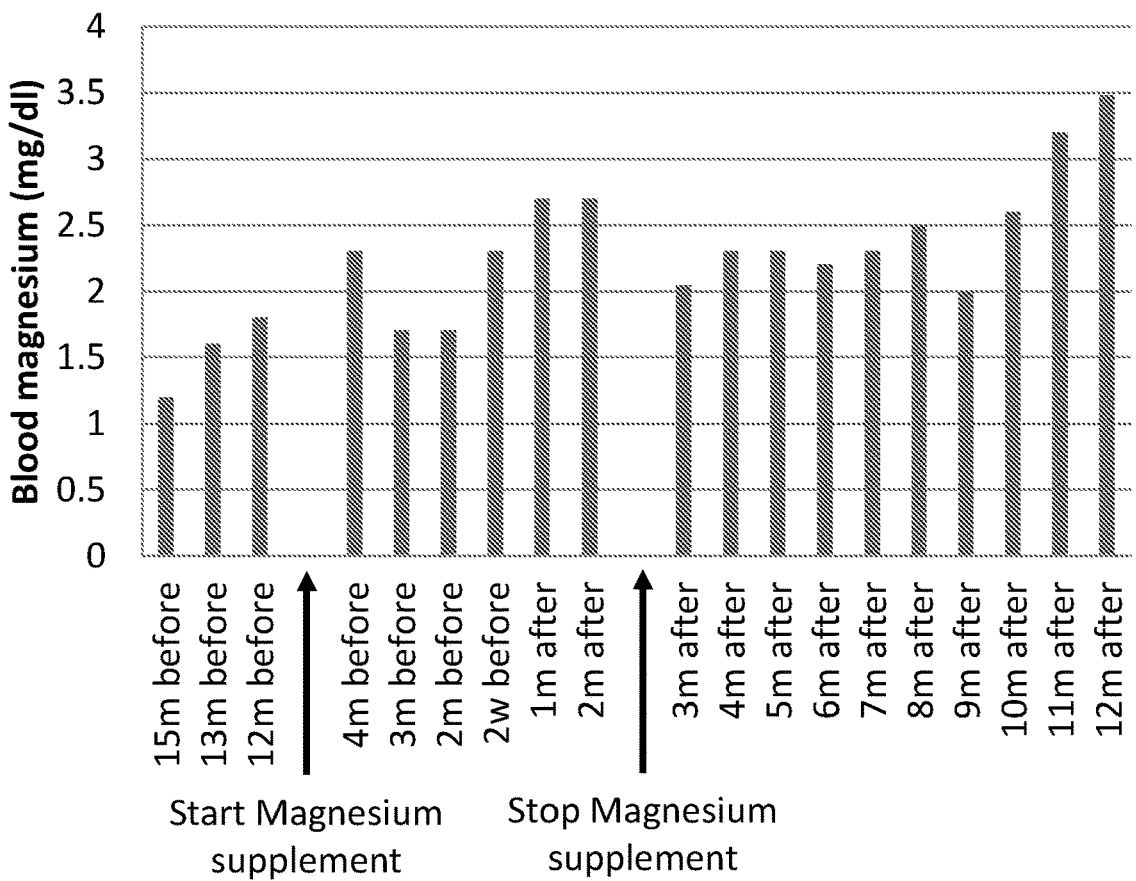
FIG. 9I is a bar graph illustrating the levels of blood magnesium in a PS patient treated by the methods provided in the present invention as a function of time before and after therapy, before and after magnesium supplementation

As can be seen in FIGS. 9F-H, treatment resulted in pronounced improvements in red blood cells levels (FIG. 9F), hemoglobin levels (FIG. 9G) and hematocrit levels (FIG. 9H). These results show that a single treatment was sufficient to ameliorate symptoms of anemia FIG. 9I presents the level of magnesium in the blood of the patient as a function of magnesium supplementation and time post cellular therapy. The data teach that the blood level of magnesium of the patient was significantly increased over time, such that magnesium supplementation was no longer required. Attaining high levels of magnesium, without magnesium supplementation, is evidence of improved magnesium absorption as well as reabsorption in the kidney proximal tubule.

Figure 9J:
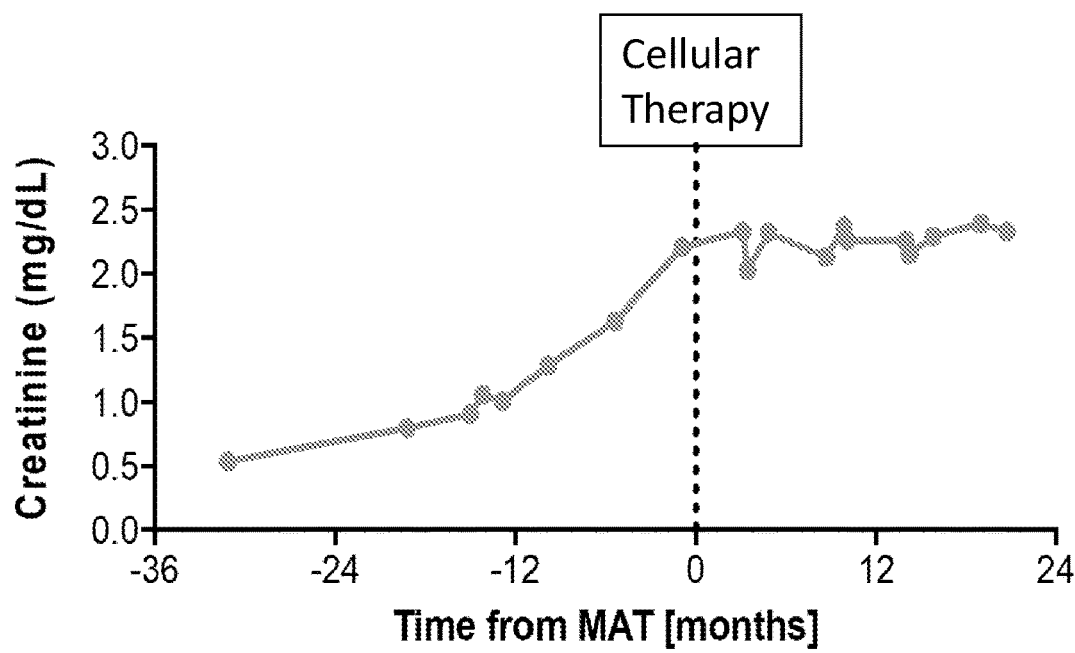
FIG. 9J is a line graph illustrating the creatinine level of a PS patient treated by the methods provided in the present invention as a function of time before and after therapy.

FIG. 9J presents the level of creatinine in the blood of the patient as a function of time pre and post cellular therapy. The data teach that the creatinine level of the patient was initially normal (below 1 mg/dL) but over time, about 12 months before the treatment, his condition deteriorated. Reaching high levels of creatinine is a marker of kidney failure. After initializing cellular therapy, his condition stabilized and further deterioration (illustrated by the dotted line) was prevented.

Figure 9K:
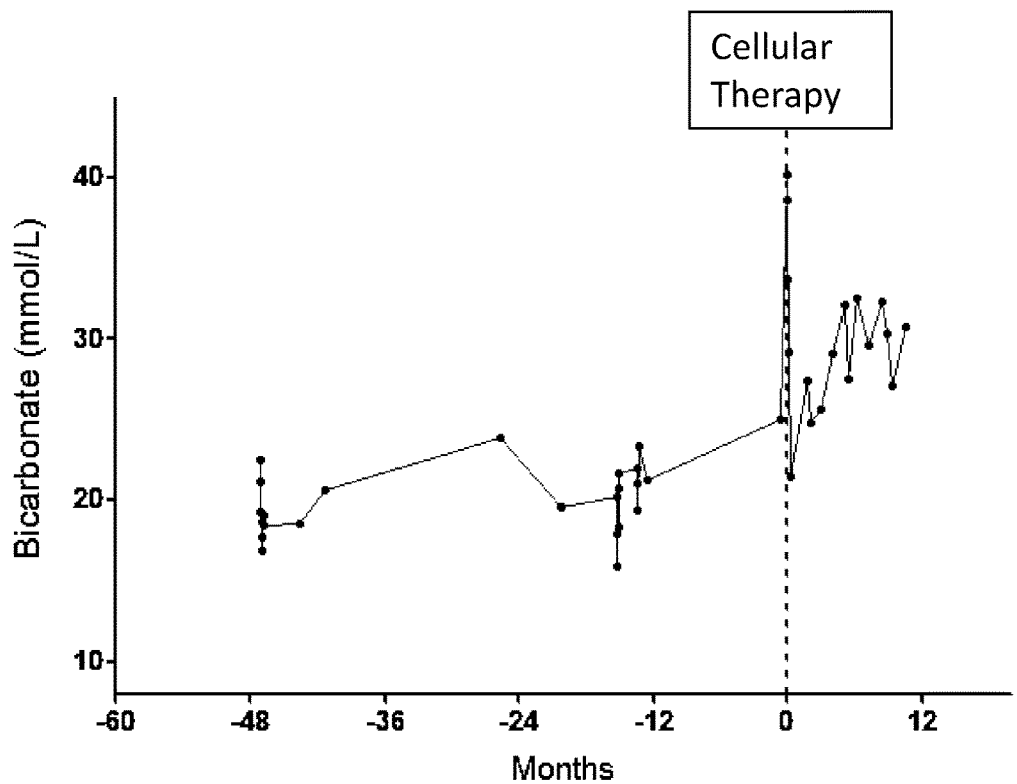
FIG. 9K is a line graph illustrating the bicarbonate level of a PS patient treated by the methods provided in the present invention as a function of time before and after therapy.
Figure 9M:
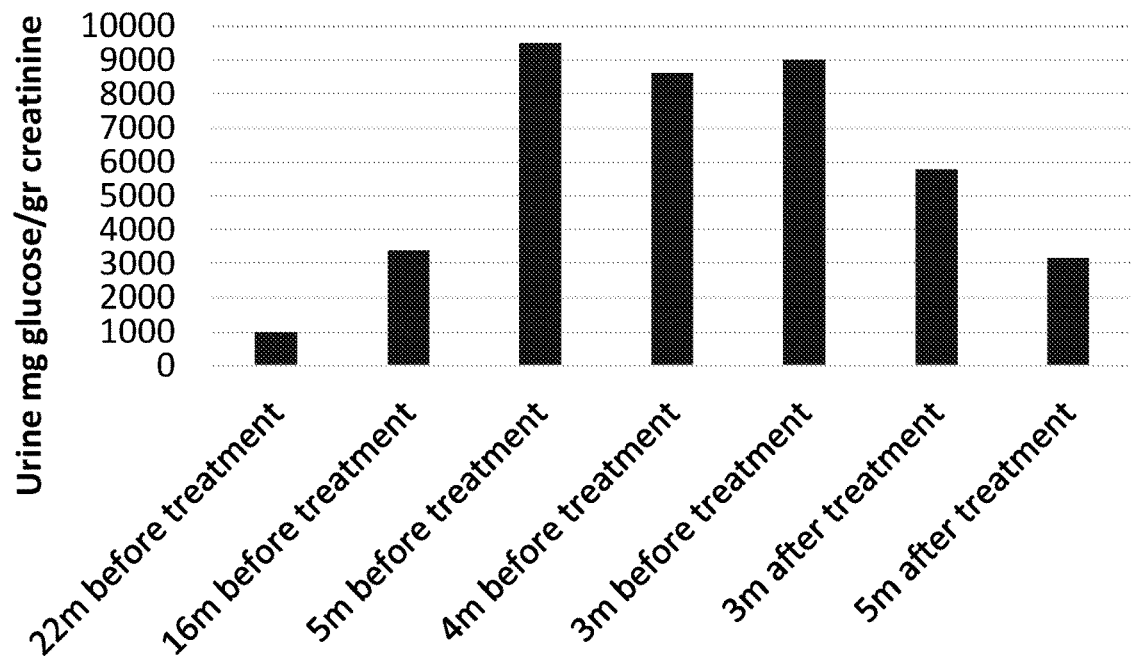
FIG. 9M is a bar graph illustrating the glucose to creatinine ratio in the urine of a PS patient treated by the methods provided in the present invention as a function of time before and after therapy.

As can further be seen in FIGS. 9K to 9L, cellular treatment also resulted in pronounced improvements in the levels of bicarbonate (FIG. 9J) and base excess (FIG. 9L) without supplementing with bicarbonate.

Figure 9N:
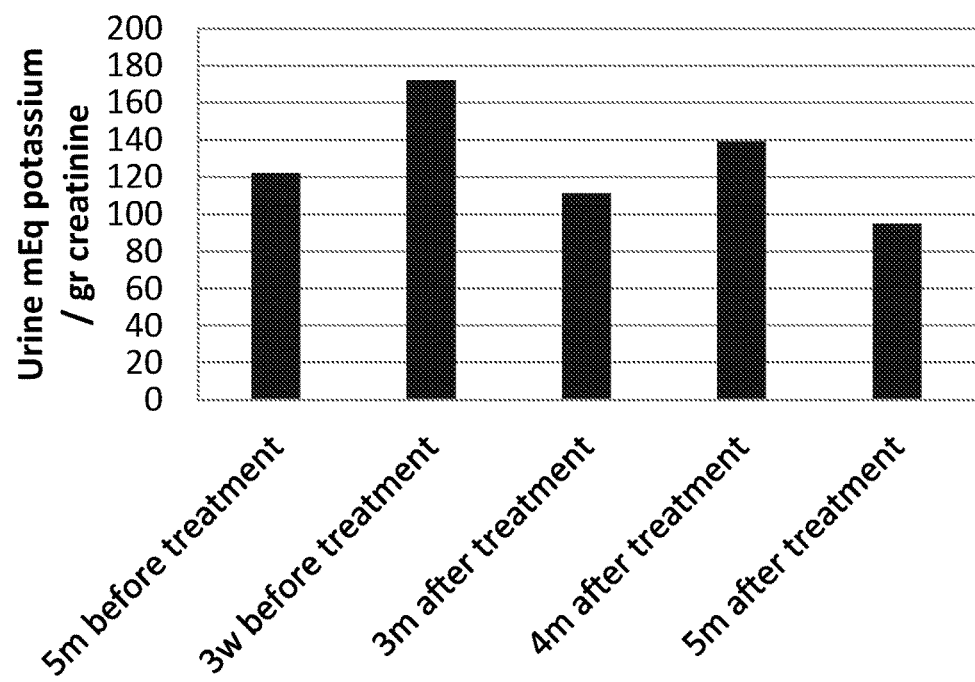
FIG. 9N is a bar graph illustrating the potassium to creatinine ratio in the urine of a PS patient treated by the methods provided in the present invention as a function of time before and after therapy.
Figure 9O:
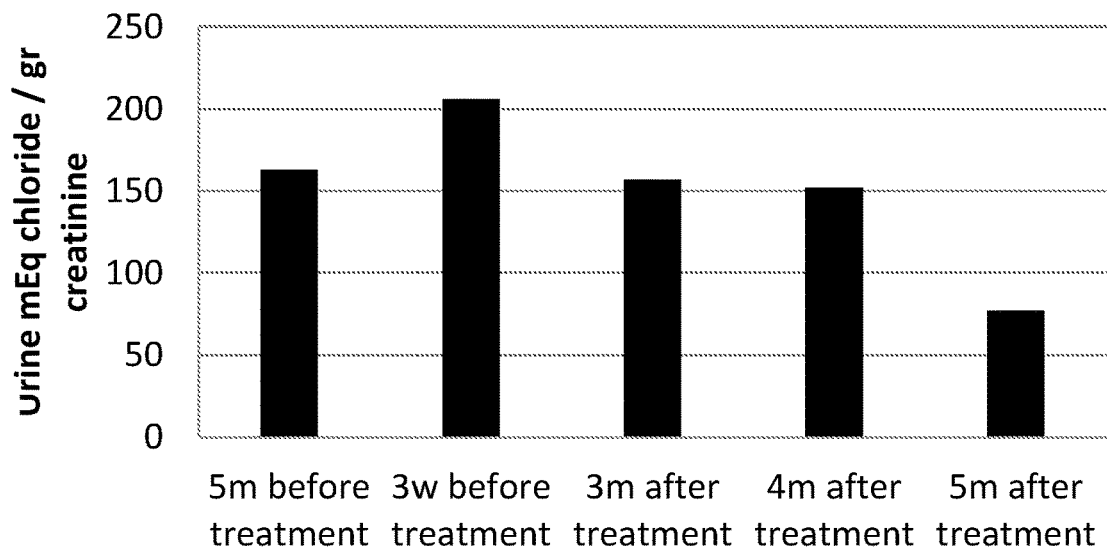
FIG. 9O is a bar graph illustrating the chloride to creatinine ratio in the urine of a PS patient treated by the methods provided in the present invention as a function of time before and after therapy.
Figure 9P:
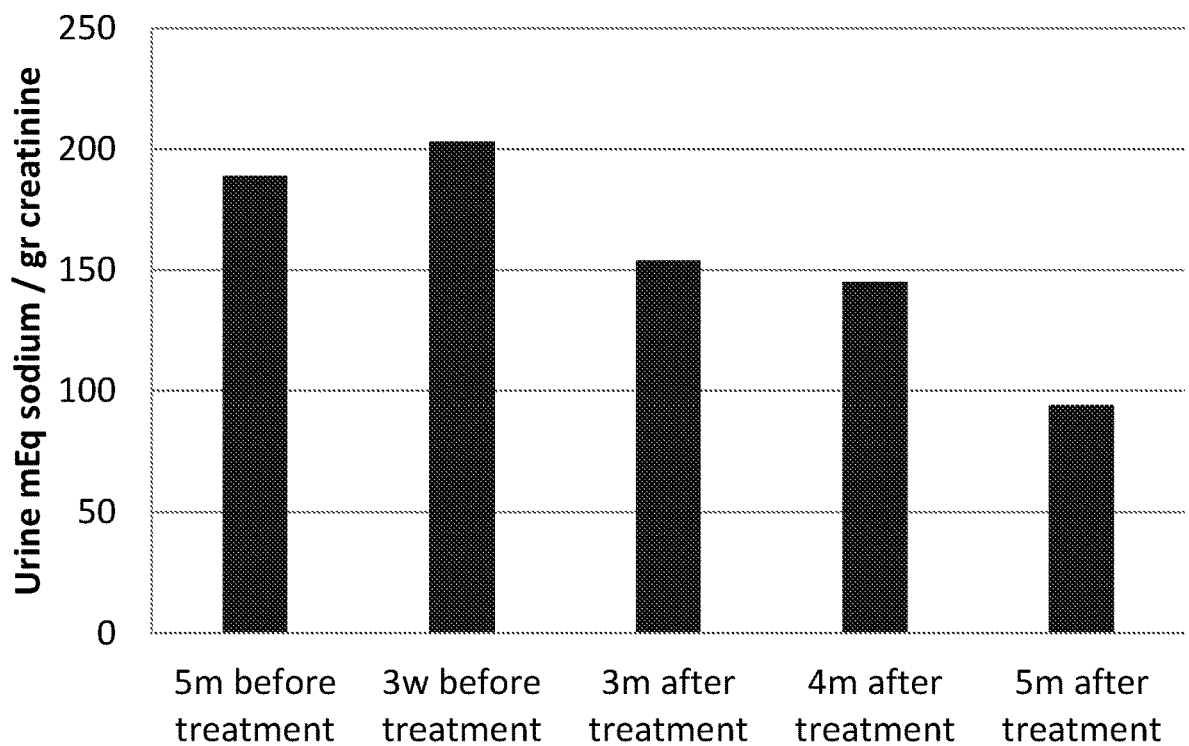
FIG. 9P is a bar graph illustrating the sodium to creatinine ratio in the urine of a PS patient treated by the methods provided in the present invention as a function of time before and after therapy.

As can be seen in FIGS. 9M-9P, a single treatment also resulted in pronounced reduction in the levels of several renal tubulopathy indicators, such as glucose levels (FIG. 9M) and certain salt levels in the urine (FIG. 9N—potassium; FIG. 9O—chloride; FIG. 9P—sodium).

Figure 10A:
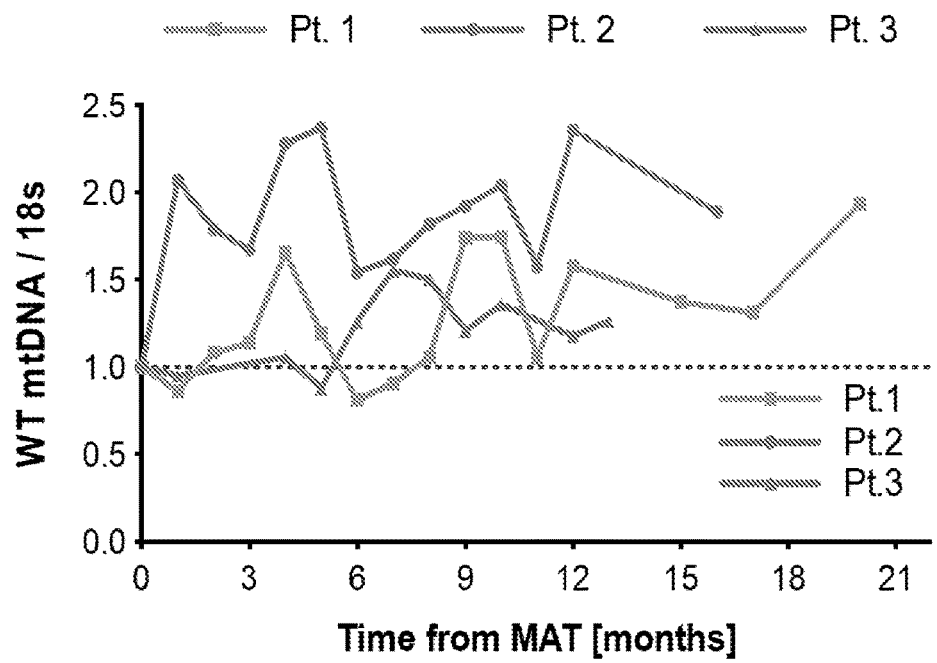
FIG. 10A is a line graph illustrating the normal mtDNA content in 3 PS patients (Pt.1, Pt.2 and Pt.3) treated by the methods provided in the present invention as a function of time before and after therapy, as measured by digital PCR for the deleted region (in each patient) compared to the 18S genomic DNA representing number of normal mtDNA per cell, and normalized per baseline.
Figure 10B:
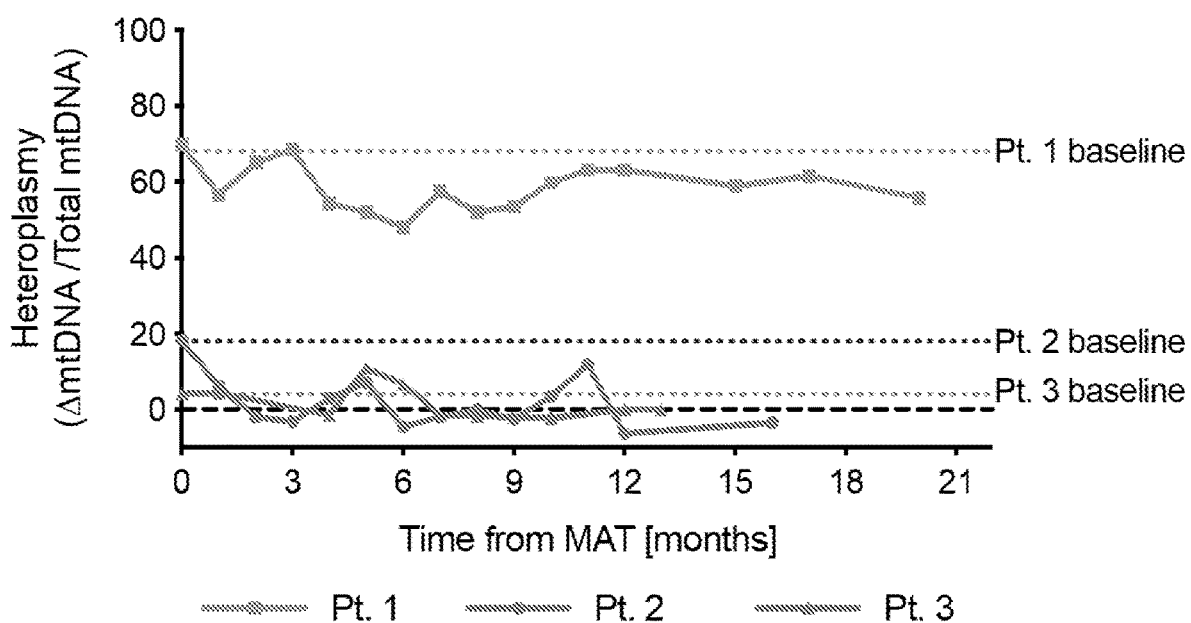
FIG. 10B is a line graph illustrating the heteroplasmy level (deleted mtDNA compared to total mtDNA) in 3 PS patients (Pt.1, Pt.2 and Pt.3), at baseline after MAT. Dotted line represents the baseline for each patient.

A genetic indication to the success of the therapy used is the prevalence of normal mtDNA compared to total mtDNA. As illustrated in FIG. 10A (Pt.1), the prevalence of normal mtDNA in the patient was increased from a baseline of about 1 to as high as 1.6 (+60%) in just 4 months, and to 1.9 (+90%) after 20 months from treatment. Notably, normal mtDNA levels were above the baseline level on most of the time points. As presented in FIG. 10B (Pt.1), there was a decrease in heteroplasmy (less deleted mtDNA) following MAT, who had relatively high levels of heteroplasmy at baseline. This was ongoing throughout the follow-up period.

According to a Hospital's neurologist report, neurological improvement has been demonstrated in the patient after transplantation of autologous cells with healthy mitochondria (not carrying the deletion mutation). The patient improved his walking skills, his ability to climb steps, and his abilities to use scissors and draw pictures. Substantial improvements were also noted in his ability to execute commands, in his response time as well as in his motor and language skills. Also, the patient's mother reported an improvement in the patient's memory.

As the data presented above indicates, a single round of the therapeutic method provided by the present invention was successful in treating PS, FS, improving kidney function, and increasing the prevalence of normal mtDNA in peripheral blood. Evidence for such a combination of beneficial effects is further found in the patient's gain of weight, which is normal to healthy subjects of his age, and in his cognitive state.

Example 8. Compassionate Treatment Using Autologous CD34+ Cells Enriched with MNV-BLD (Blood Derived Mitochondria) for a Juvenile with Pearson Syndrome (PS)

Patient 2 was a 7-years female patient diagnosed with PS, having a deletion of 4977 nucleotides in her mtDNA. The patient also suffered from anemia, endocrine pancreatic insufficiency, and she also had insulin-dependent diabetes mellitus for 4 years. Patient had high lactate levels (>25 mg/dL), low body weight, and problems with eating and gaining weight. The patient further suffers from hypermagnesuria (high levels of magnesium in urine, low levels in blood). Patient has memory and learning problems, astigmatism, and low mitochondrial activity in peripheral lymphocytes as determined by TMRE, ATP content and $O_2$ consumption rate (relative to the healthy mother).

Mobilization of hematopoietic stem and progenitor cells (HSPC), leukapheresis and CD34 positive selection were performed similar to patient 1 (Example 3) with the addition of plerixafor (n=2) on day −1 prior to leukapheresis. Mitochondria were isolated from maternal peripheral blood mononuclear cells (PBMCs) using 250 mM sucrose buffer pH 7.4 by differential centrifugation. For MAT, the autologous CD34+ cells were incubated with the healthy mitochondria from the patient's mother ($1*10^6$ cells per amount of mitochondria having 4.4 milliunits of citrate synthase (CS)), resulting in a 1.62 fold increase in the cells mitochondrial content (62% increase in mitochondrial content as demonstrated by CS activity). Incubation with mitochondria was performed for 24 hours at R.T. in saline containing 4.5% HSA. It should be noted that after mitochondrial enrichment, the CD34+ cells from the patient increased the rate of colony formation by 26%.

Figure 11A:
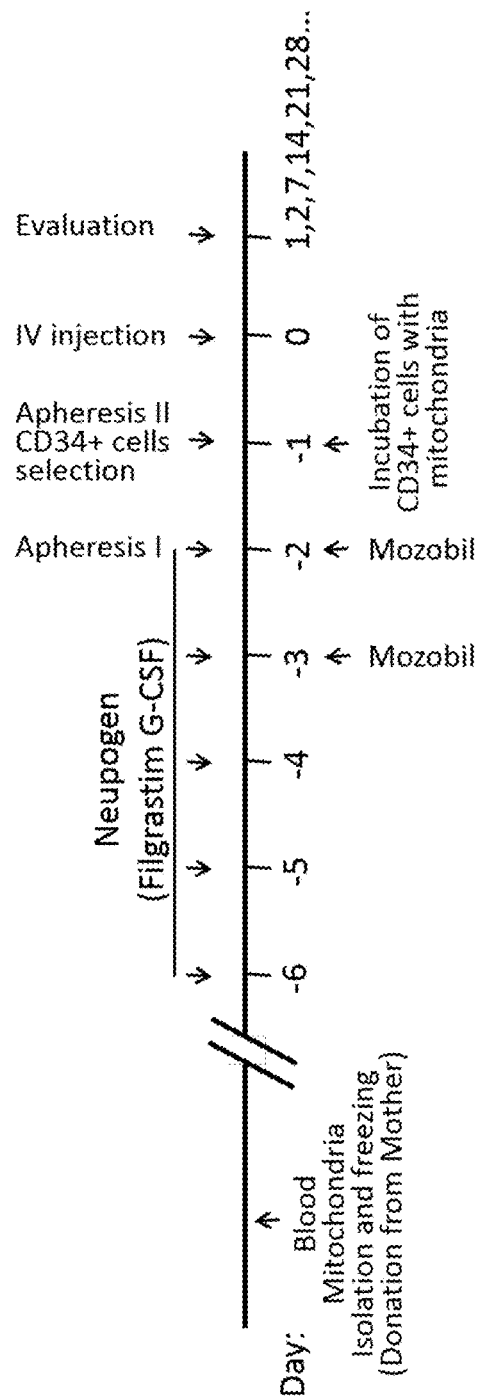
FIG. 11A is another scheme of the different stages of treatment of a Pearson Syndrome (PS) patient, as further provided by the present invention.

Patient 2 (15 KG at day of treatment) was treated, by IV infusion, with $1.8*10^6$ autologous CD34+ cells enriched with healthy mitochondria per kilogram body weight, according to the timeline presented in FIG. 11A.

Figure 11B:
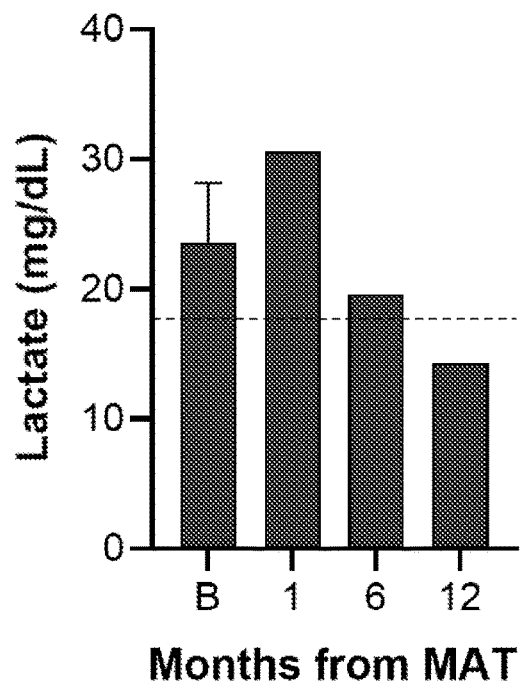
FIG. 11B is a bar graph illustrating the level of lactate in the blood of a PS patient treated by the methods provided in the present invention as a function of time before (B) and after therapy.

FIG. 11B presents the level of lactate found in the blood of the patient as a function of time post the I.V. injection. Blood lactate is lactic acid that appears in the blood as a result of anaerobic metabolism when mitochondria are damaged or when oxygen delivery to the tissues is insufficient to support normal metabolic demands, one of the hallmarks of mitochondria dysfunction. The data teach that the level of blood lactate was significantly reduced over time.

Figure 11C:
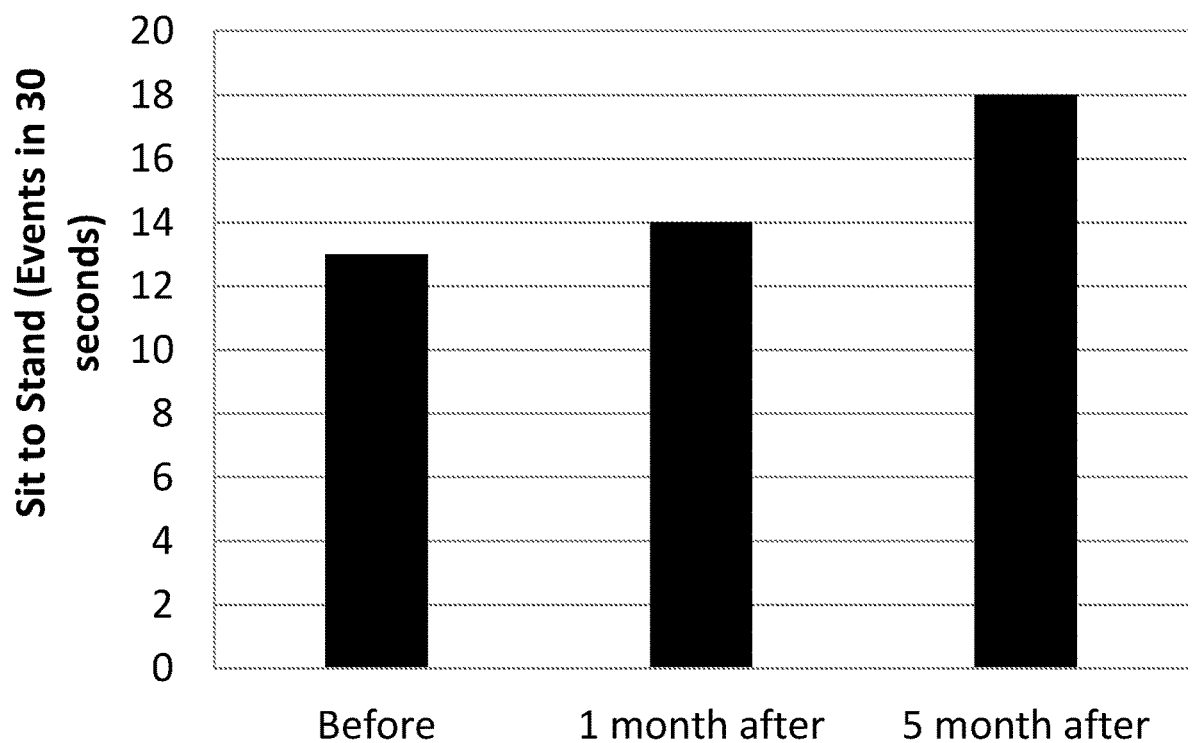
FIG. 11C is a bar graph illustrating the sit-to-stand score of a PS patient treated by the methods provided in the present invention as a function of time before and after therapy.
Figure 11D:
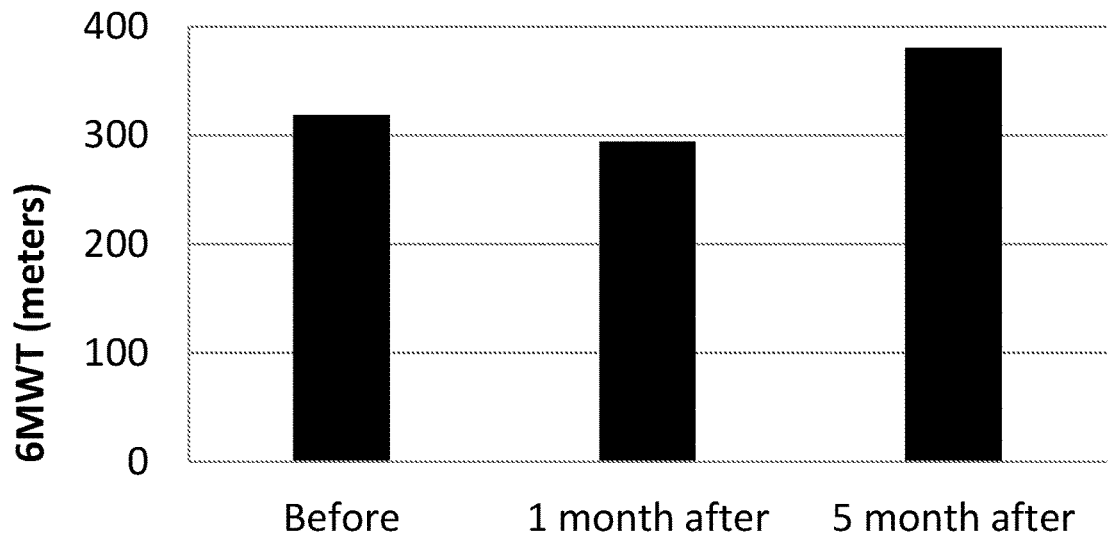
FIG. 11D is a bar graph illustrating the six-minute-walk-test score of a PS patient treated by the methods provided in the present invention as a function of time before and after therapy.

FIGS. 11C and 11D present the results of the "Sit-to-Stand" and "6-minute-walk" tests of the patient as a function of time post the I.V. injection.

Figure 11E:
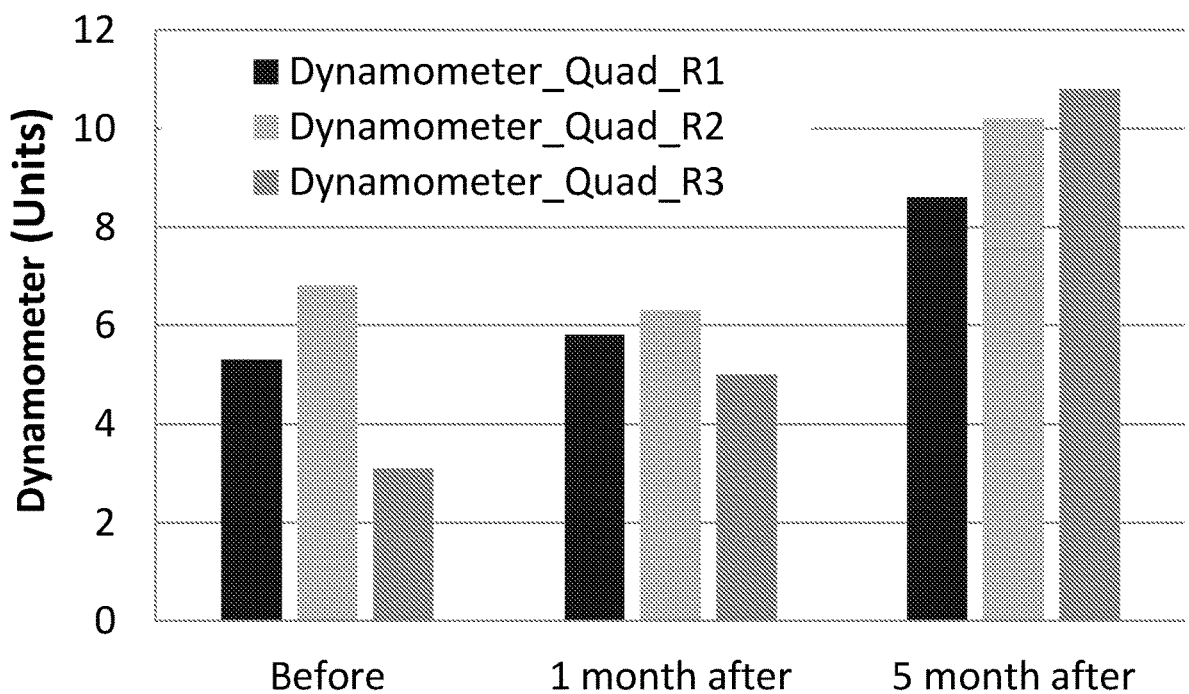
FIG. 11E is a bar graph illustrating the dynamometer score of three consecutive repetitions (R1, R2, R3) of a PS patient treated by the methods provided in the present invention as a function of time before and after therapy.

FIG. 11E presents the results of a dynamometer test performed on the muscles of the right leg of the patient as a function of time post the I.V. injection. In each test, three consecutive repeats were recorded. The data teach that the patient's muscular ability was improved over time, both in the aspect of increased muscle strength and in the aspect of decreased tiredness.

Figure 11F:
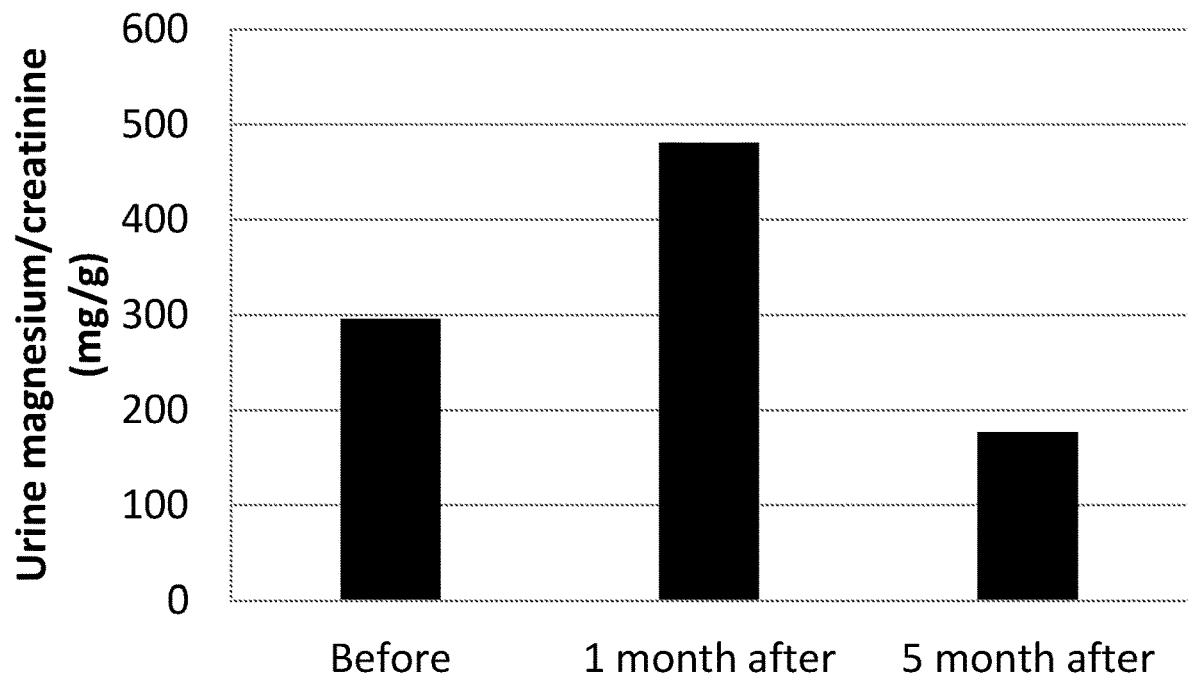
FIG. 11F is a bar graph illustrating the urine magnesium to creatinine ratio in a PS patient treated by the methods provided in the present invention as a function of time before and after therapy.
Figure 11G:
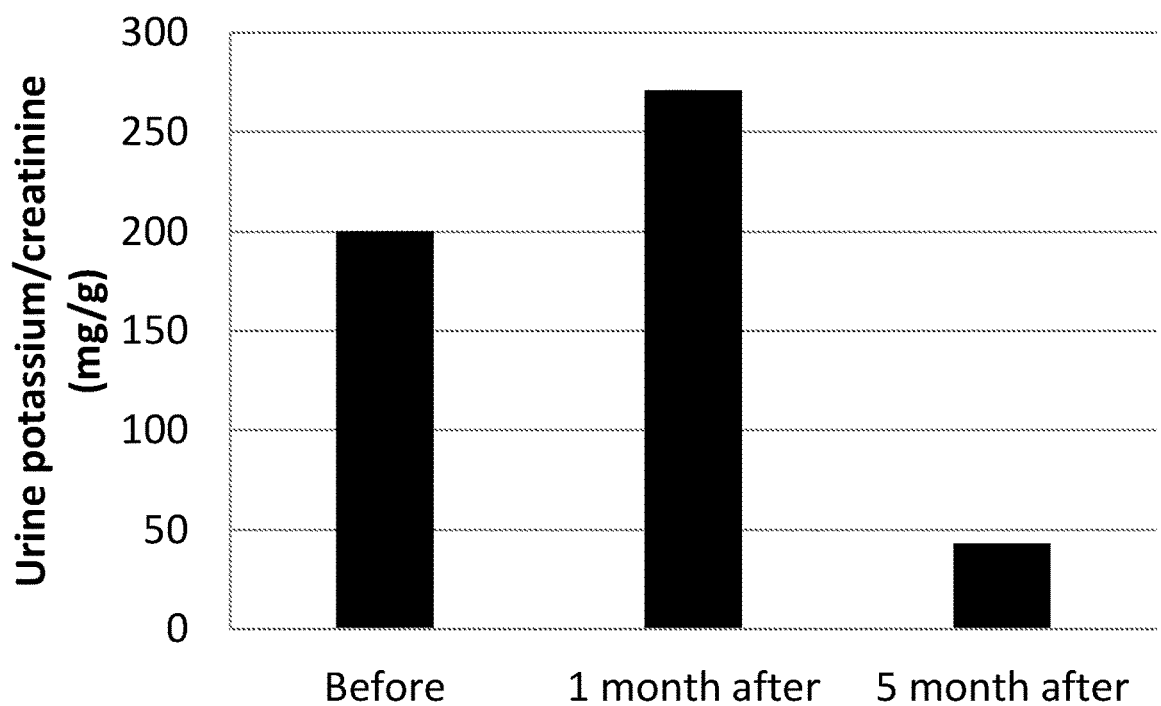
FIG. 11G is a bar graph illustrating the urine potassium to creatinine ratio in a PS patient treated by the methods provided in the present invention as a function of time before and after therapy.
Figure 11H:
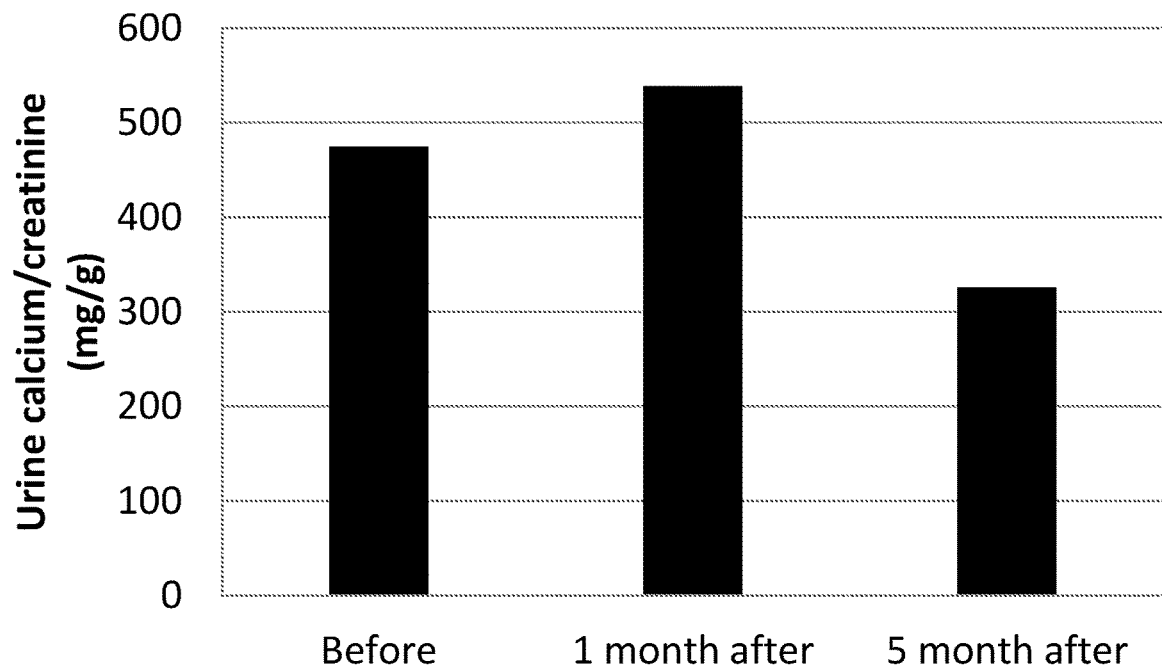
FIG. 11H is a bar graph illustrating the urine calcium to creatinine ratio in a PS patient treated by the methods provided in the present invention as a function of time before and after therapy.

FIGS. 11F-11H present the ratios of magnesium, potassium and calcium compared to creatinine found in the urine of the patient as a function of time post the I.V. injection, respectively.

Figure 11I:
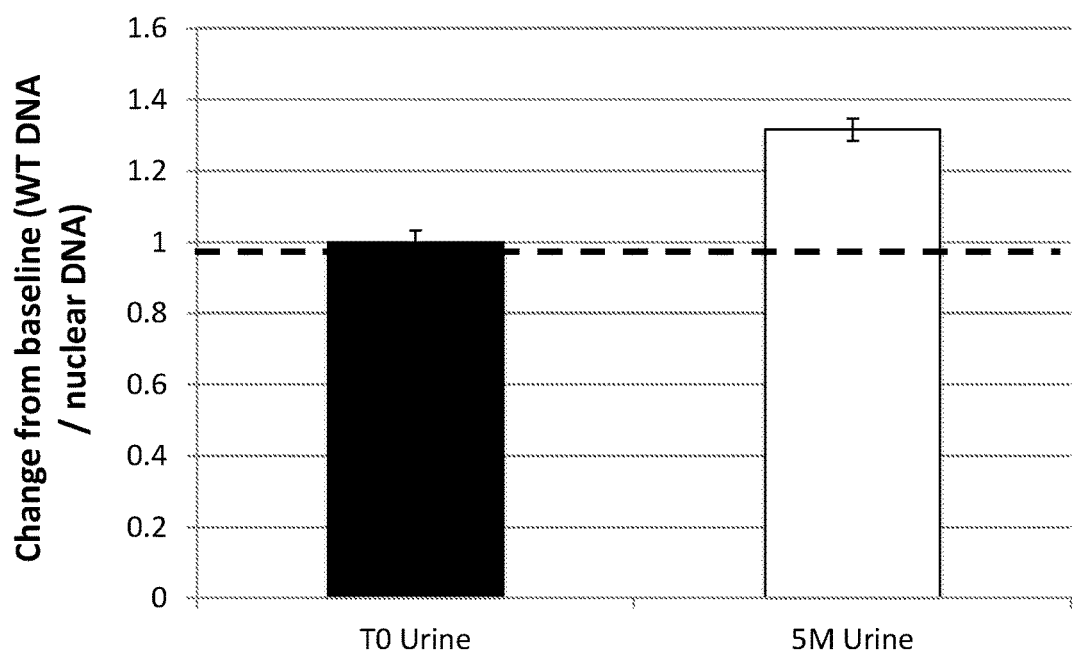
FIG. 11I is a bar graph illustrating the ATP8 to 18S copy number ratio in the urine of a PS patient treated by the methods provided in the present invention as a function of time before and after therapy.

FIG. 11I presents the genetic ratio between ATP8 to 18S in the urine of the patient as a function of time post the I.V. injection.

Figure 11J:
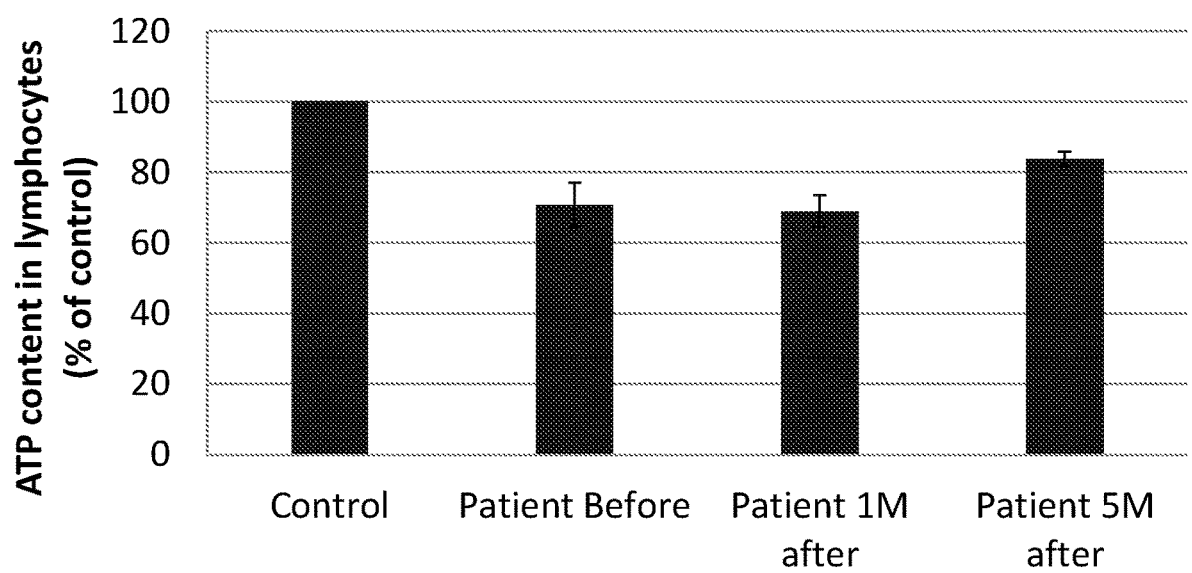
FIG. 11J is a bar graph illustrating the ATP level in lymphocytes of a PS patient treated by the methods provided in the present invention as a function of time before and after therapy.

FIG. 11J presents the ATP content in lymphocytes of the patient as a function of time post the I.V. injection. The control is the ATP content in lymphocytes of the patient's mother, which is the donor of the mitochondria.

Figure 6B:
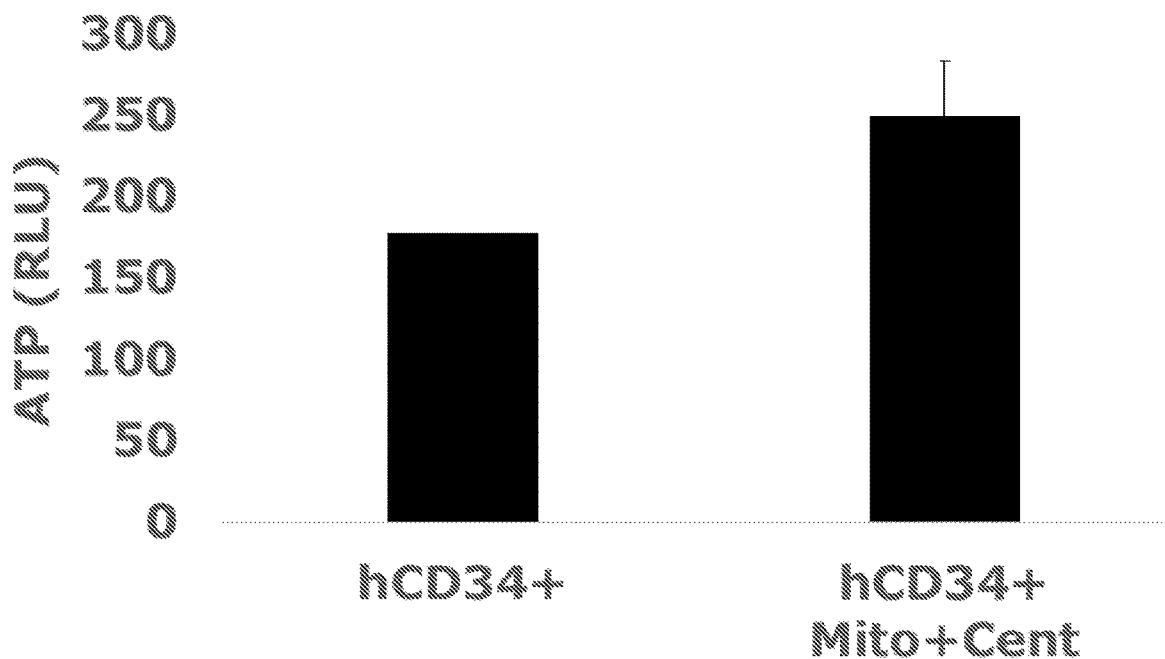
FIG. 6B is a bar graph showing a comparison of ATP levels in control, untreated human BM cells and human BM cells incubated with GFP-labeled mitochondria isolated from human placental cells, with centrifugation.

FIG. 10A (Pt.2) presents the prevalence of normal mtDNA as a function of time post the I.V. injection. As can be seen in FIG. 6B (Pt.2), the prevalence of normal mtDNA was increased from a baseline of about 1 to as high as 2 (+100%) in just 1 month, remaining relatively high until 10 months post treatment. Notably, normal mtDNA levels were above the baseline level on all the time points FIG. 10B (Pt.2) presents the change in heteroplasmy level as a function of time after MAT. It can be seen that there was a decrease in heteroplasmy (less deleted mtDNA) following MAT in patient 2. This was ongoing throughout the follow-up period.

Example 9. Compassionate Treatment Using Autologous CD34+ Cells Enriched with MNV-BLD (Blood Derived Mitochondria) for a Juvenile with Pearson Syndrome (PS) and Fanconi Syndrome (FS)

Patient 3 was a 10.5-years old female patient, diagnosed with PS, having a deletion of nucleotides 12113-14421 in her mtDNA. The patient also suffered from anemia, and from Fanconi Syndrome that developed into kidney insufficiency stage 4. Patient was treated with dialysis three times a week. In the last two months, patient also suffered from a severe vision disorder, narrowing of the vision field and loss of near vision. Patient was incapable of any physical activity at all (no walking, sits in a stroller). Patient had high lactate levels (>50 mg/dL), and a pancreatic disorder which was treated with insulin. Brain MRI showed many lesions and atrophic regions. Patient was fed only through a gastrostomy. Patient had memory and learning problems. Patient had low mitochondrial activity in peripheral lymphocytes as determined by Tetramethylrhodamine Ethyl Ester (TMRE), ATP content and $O_2$ consumption rate (relative to the healthy mother) tests.

Mobilization of hematopoietic stem and progenitor cells (HSPC) as well as leukapheresis and CD34 positive selection were performed similar to patient 1 (Example 3) with the addition of plerixafor (n=1) on day-1 prior to leukapheresis. Leukapheresis was performed via a permanent dialysis catheter. Mitochondria were isolated from maternal peripheral blood mononuclear cells (PBMCs) using 250 mM sucrose buffer pH 7.4 by differential centrifugation. For MAT, the autologous CD34+ cells were incubated with healthy mitochondria from the patient's mother ($1*10^6$ cells per amount of mitochondria having 4.4 milliunits of citrate synthase (CS)), resulting in a 1.14 fold increase in the cells mitochondrial content (14% increase in mitochondrial content as demonstrated by CS activity). Cells were incubated with mitochondria for 24 hours at R.T. in saline containing 4.5% HSA. It should be noted that after mitochondrial enrichment, the CD34+ cells from the patient increased the rate of colony formation by 52%.

Patient 3 (21 KG) was treated, by IV infusion, with $2.8*10^6$ autologous CD34+ cells enriched with healthy mitochondria from her mother per kilogram body weight, according to the timeline presented in FIG. 12A.

Figure 12B:
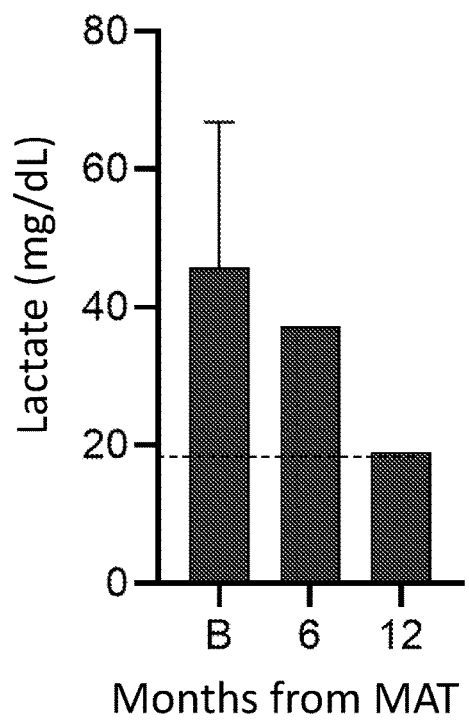
FIG. 12B is a bar graph illustrating the level of lactate in the blood of a PS patient treated by the methods provided in the present invention as a function of time before (B) and after therapy.

FIG. 12B presents the level of lactate found in the blood of the patient as a function of time before and after therapy.

Figure 12C:
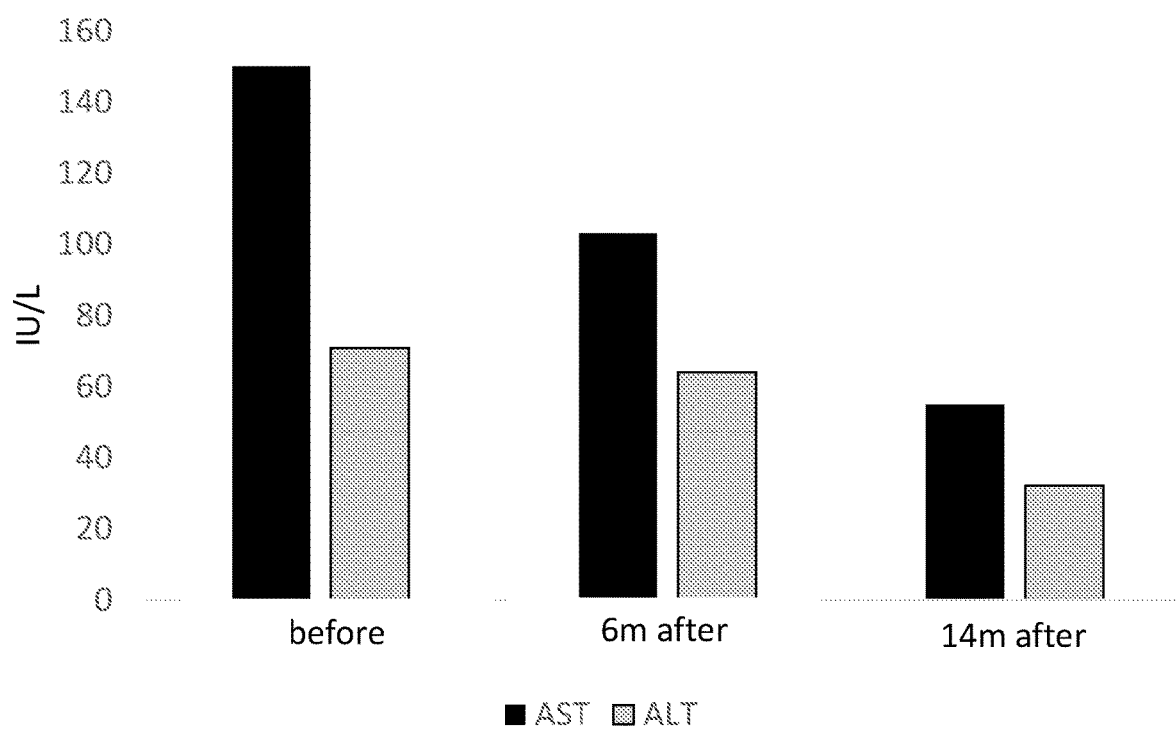
FIG. 12C is a bar graph illustrating the AST and ALT levels of a PS patient treated by the methods provided in the present invention as a function of time before and after therapy.

FIG. 12C presents the levels of AST and ALT liver enzymes in the blood of the patient as a function of time before and after cellular therapy. Attaining low levels of liver enzymes in the blood is evidence of decreased liver damage.

Figure 12D:
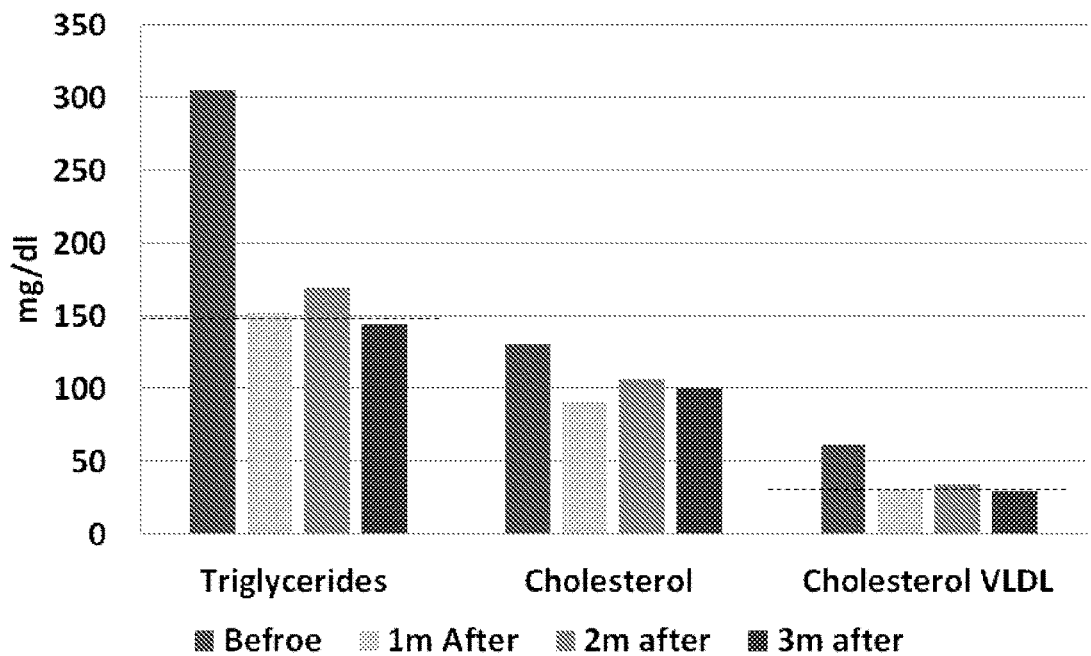
FIG. 12D is a bar graph illustrating the triglyceride, total cholesterol and VLDL cholesterol levels of a PS patient treated by the methods provided in the present invention as a function of time before and after therapy.

FIG. 12D presents the levels of triglycerides, total cholesterol and very-low-density lipoprotein (VLDL) cholesterol in the blood of the patient as a function of time before and after cellular therapy. Attaining low levels of triglycerides, total cholesterol and VLDL cholesterol in the blood is evidence of increased liver function and improved lipid metabolism.

Figure 12E:
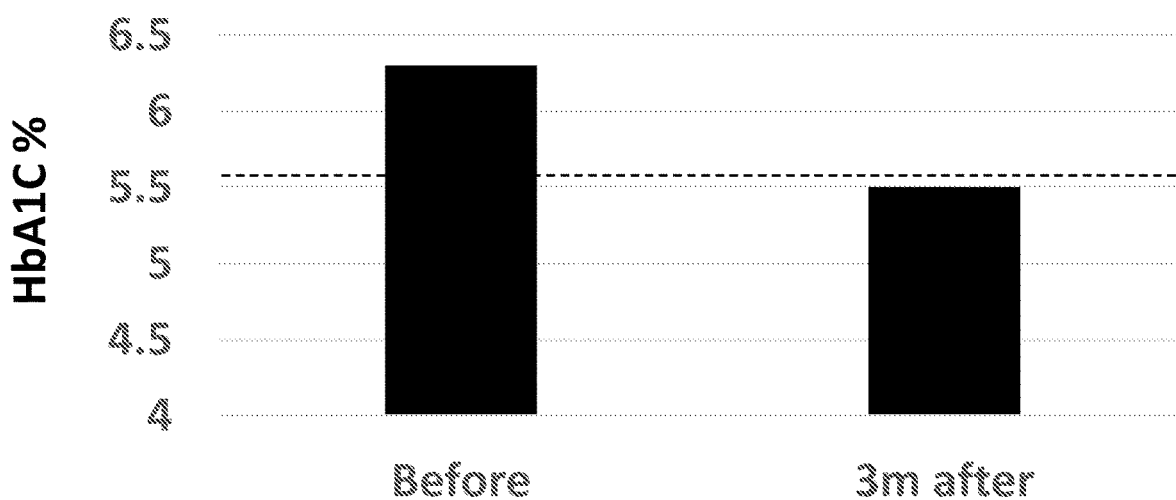
FIG. 12E is a bar graph illustrating the hemoglobin A1C (HbA1C) score of a PS patient treated by the methods provided in the present invention as a function of time before and after therapy.

Glycated hemoglobin (sometimes also referred to as hemoglobin A1c, HbA1c, A1C, Hb1c, Hb1c or HGBA1C) is a form of hemoglobin that is measured primarily to identify the three-month average plasma glucose concentration. The test is limited to a three-month average because the lifespan of a red blood cell is four months (120 days). FIG. 12E presents the result of the A1C test of the patient as a function of time before and after therapy.

Figure 12F:
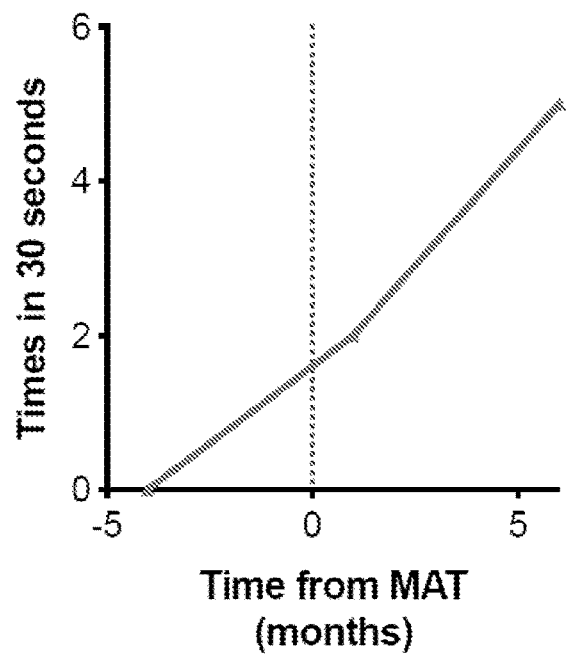
FIG. 12F is a line graph illustrating the sit-to-stand score of a PS patient (Pt.3) treated by the methods provided in the present invention as a function of time before and after therapy.
Figure 12G:
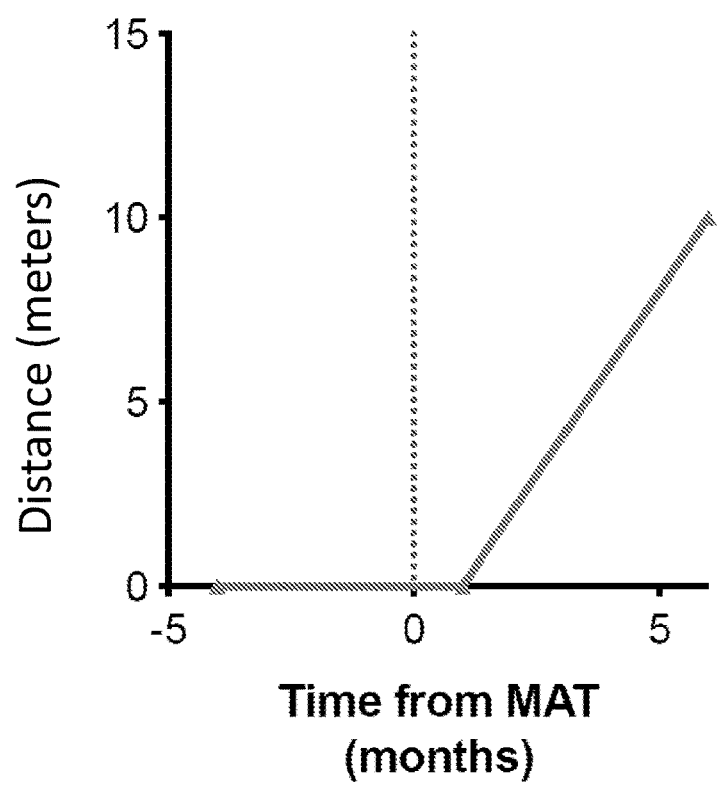
FIG. 12G is a line graph illustrating the six-minute-walk-test score of a PS patient (Pt.3) treated by the methods provided in the present invention as a function of time before and after therapy.

FIGS. 12F and 12G present the results of the "Sit-to-Stand" (112F) and "6-minute-walk" (12G) tests of the patient as a function of time post the I.V. injection, showing an improvement in both parameters 5 months after treatment.

FIG. 10A (Pt.3) presents the prevalence of normal mtDNA as a function of time post the I.V. injection. As can be seen in FIG. 10A (Pt.3), the prevalence of normal mtDNA was increased by 50% at 7 months post treatment. Notably, normal mtDNA levels were above the baseline level on most of the time points FIG. 10B (Pt.3) presents the change in heteroplasmy level as a function of time after MAT. It can be seen that there was a decrease in heteroplasmy (less deleted mtDNA) following MAT in patient 3 who had relatively low levels of heteroplasmy at baseline. This was ongoing throughout the follow-up period.

Altogether, the results presented hereinabove demonstrate that augmentation of autologous CD34+ HSPCs enriched with exogenous healthy functional mitochondria, even at low to moderate mitochondrial enrichment (14% as exemplified herein) may halt disease progression and may lead to improvement in many symptoms in patients with PS.

Example 10. Compassionate Treatment Using Autologous CD34+ Cells Enriched with MNV-BLD (Blood Derived Mitochondria) for a Juvenile with Kearns-Sayre Syndrome (KSS)

Patient 4 was a 14-years old, 19.5 kg female patient, diagnosed with Kearns-Sayre syndrome, experiencing tunnel vision, ptosis, ophthalmoplegia and retinal atrophy. The patient had vision problems, CPEO, epileptic seizures, pathologic EEG, sever myopathy with disability to sit or walk, cardiac arrhythmia. The patient had a 7.4 Kb deletion in her mitochondrial DNA, including the following genes: TK, NC8, ATP8, ATP6, CO3, TG, ND3, TR, ND4L, TH, TS2, TL2, ND5, ND6, TE, NC9 and CYB.

Mobilization of hematopoietic stem and progenitor cells (HSPC) as well as leukapheresis and CD34 positive selection were performed similar to patient 3 (Example 5). For MAT, the autologous CD34+ cells were incubated for 24 hours at R.T. with healthy mitochondria from the patient's mother ($1*10^6$ cells per amount of mitochondria having 4.4 milliunits of citrate synthase (CS)), in saline containing 4.5% HSA. The enrichment resulted in a 1.03 fold increase in the cells mitochondrial content (3% increase in mitochondrial content as demonstrated by CS activity).

Figure 13:
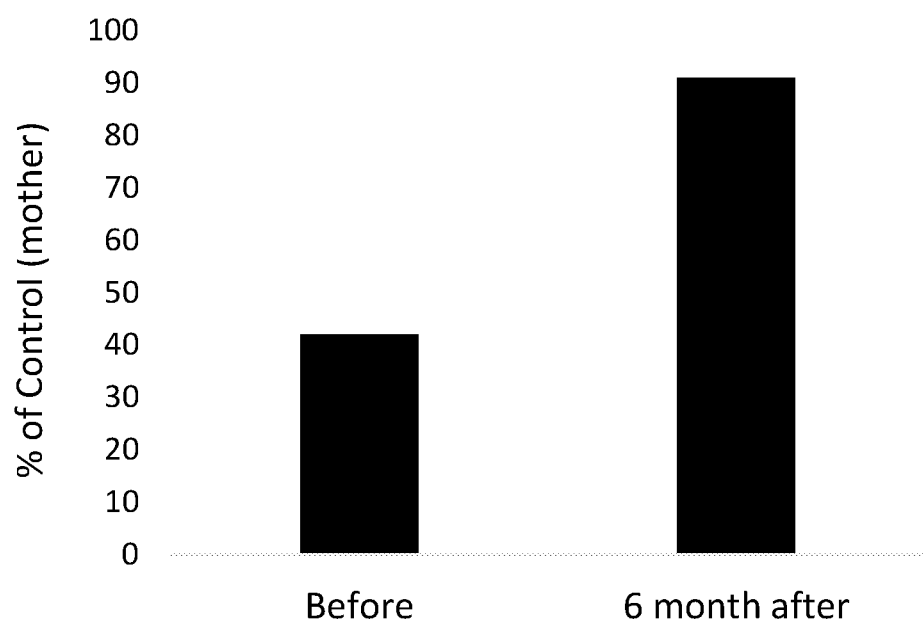
FIG. 13 is a bar graph illustrating the ATP content in the peripheral blood of a KSS patient treated by the methods provided in the present invention, before and after therapy.

Patient 4 was treated with $2.2*10^6$ autologous CD34+ cells enriched with healthy mitochondria per kilogram body weight, according to the timeline presented in FIG. 12A. Unexpectedly, 4 months after a single treatment with CD34+ that were enriched by only 3% with healthy mitochondria, the patient showed marked improvement in EEG with no epileptic seizures. 5 months after treatment the patient suffered disease-related atrioventricular (AV) block and a pacer was installed. The patient recovered and improvement continued. The ATP content in the peripheral blood was measured 6 months post-treatment, showing an increase of about 100% in ATP content compared to that before treatment, as shown in FIG. 13. 7 months after treatment, the patient could sit by herself, walk with assistance, talk, has better appetite and gained 3.6 KG.

Example 11. Treatment of Patients Afflicted with Mitochondrial Diseases Using Human Stem Cells Enriched with Human Mitochondria A patient is diagnosed with a mitochondrial disease, based on one or more mutation(s) in his mitochondrial or nuclear DNA, on the symptoms he is experiencing, or both.

Patient is treated with autologous or allogeneic human stem cells enriched with healthy functional mitochondria obtained and isolated from a healthy donor, according to a timeline to suit his age, weight and clinical status. The administered human stem cells are prepared by incubating naïve human stem cells with healthy functional mitochondria.

The patient's clinical status is monitored before, during and/or after therapy. The clinical status of the patient, physiological and/or cognitive, may be determined by one of the following tests: Wechsler preschool & primary scale of intelligence (WPPSI V3), international pediatric mitochondrial disease scale (IPMDS) questionnaire, physical tests, neuropsychology tests (for example: list memory test according to the developmental neuropsychological assessment, NEPSY II (NEPSY II—$2^{nd}$ Edition), digit span test according to Wechsler intelligence scales (WIS) for Children—$4^{th}$ Edition, and visual motor integration (VMI) according to the Beery-Buktenica developmental test of visual-motor integration: administration, scoring, and teaching manual (6th Edition) complete blood count, blood gases, blood biochemistry, manual differential blood test, urine biochemistry, weight gain, respiratory function, and normal mitochondrial DNA content.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

The invention claimed is:

1. A pharmaceutical composition for treating a primary mitochondrial disease or disorder associated with a mutation in mitochondrial DNA,
    wherein the mitochondrial disease or disorder is selected from the group consisting of Pearson syndrome (PS), Kearns-Sayre syndrome (KSS), Mitochondrial Encephalopathy, Lactic Acidosis, and Stroke-like episodes (MELAS), Leber's hereditary optic neuropathy (LHON), myoclonic epilepsy with ragged red fibers (MERRF), Neuropathy, ataxia, and retinitis pigmentosa (NARP), and Leigh Syndrome;
    wherein the pharmaceutical composition comprises mitochondrially-enriched human CD34+ stem cells in a pharmaceutically acceptable carrier;
    wherein the mitochondrially-enriched human CD34+ stem cells are obtained from a patient afflicted with a primary mitochondrial disease disorder associated with a mutation in mitochondrial DNA, which comprise endogenous mitochondria and are further enriched with human exogenous functional mitochondria without a pathogenic mutation in mitochondrial DNA;
    wherein the human exogenous functional mitochondria constitute at least 1% and less than 33% of total mitochondria in the mitochondrially-enriched human CD34+ stem cells; and
    wherein the total mitochondria is the endogenous mitochondria and the human exogenous functional mitochondria.

2. The pharmaceutical composition of claim 1, wherein the mitochondrially-enriched human CD34+ stem cells have a property selected from the group consisting of:
    (i) an increased total mitochondrial DNA content;
    (ii) an increased level of citrate synthase (CS) activity;
    (iii) an increased content of succinate dehydrogenase complex flavoprotein subunit A (SDHA) or cytochrome C oxidase (COX1);

(iv) an increased rate of $O_2$ consumption;
(v) an increased rate of adenosine triphosphate (ATP) production; and
(vi) any combination thereof,
relative to a corresponding level in the same human CD34+ stem cells prior to mitochondrial enrichment.

3. The pharmaceutical composition of claim 1, wherein the exogenous mitochondria constitute between 3% and 33% of the total mitochondria in the mitochondrially-enriched CD34+ stem cells.

4. The pharmaceutical composition of claim 1, wherein the exogenous mitochondria constitute between 1% and 5% of the total mitochondria in the mitochondrially-enriched human CD34+ stem cells.

5. The pharmaceutical composition of claim 1, wherein the human exogenous functional mitochondria are obtained from a healthy donor.

6. The pharmaceutical composition of claim 1, wherein the primary mitochondrial disease or disorder associated with a mutation in mitochondrial DNA is Pearson syndrome or Kearns-Sayre syndrome.

7. The pharmaceutical composition of claim 1, wherein the human exogenous functional mitochondria are obtained from the group consisting of placenta, placental cells grown in culture, and blood cells.

\* \* \* \* \*